US012386477B2

(12) United States Patent
Van Wie et al.

(10) Patent No.: US 12,386,477 B2
(45) Date of Patent: *Aug. 12, 2025

(54) SHARED VIRTUAL AREA COMMUNICATION ENVIRONMENT BASED APPARATUS AND METHODS

(71) Applicant: Sococo, LLC, Austin, TX (US)

(72) Inventors: David Van Wie, Eugene, OR (US); Paul J. Brody, Palo Alto, CA (US)

(73) Assignee: SOCOCO, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,265

(22) Filed: Jan. 29, 2024

(65) Prior Publication Data
US 2024/0295943 A1 Sep. 5, 2024

Related U.S. Application Data

(63) Continuation of application No. 17/246,843, filed on May 3, 2021, now Pat. No. 12,061,767, which is a
(Continued)

(51) Int. Cl.
G06F 7/00 (2006.01)
G06F 3/04815 (2022.01)
(Continued)

(52) U.S. Cl.
CPC ........ *G06F 3/04815* (2013.01); *G06F 3/0482* (2013.01); *G06F 16/9537* (2019.01);
(Continued)

(58) Field of Classification Search
CPC ............... G06F 3/04815; G06F 3/0482; G06F 16/9537; G06F 3/048; G06Q 10/10;
G06T 19/20; H04L 12/1813; H04L 12/1822; H04L 65/403; H04L 67/131; H04N 7/157
USPC ........ 707/723, 724, 726, 727, 769, 999.003, 707/999.005, E17.108, 716, E17.044; 715/706, 716, 733, 748, 752, 753, 757, 715/758, 788, 790, 810, 209, 233, 715,
(Continued)

(56) References Cited

U.S. PATENT DOCUMENTS 6,342,906 B1 * 1/2002 Kumar ................. G06F 3/1454
715/764
2002/0149617 A1 * 10/2002 Becker ................. G16H 80/00
725/80
(Continued)

OTHER PUBLICATIONS

Terminal Disclaimer Approved Jan. 8, 2024, filed in U.S. Appl. No. 17/246,843, p. 1.
(Continued)

*Primary Examiner* — Md I Uddin

(57) ABSTRACT

Improved systems and methods for navigating and interacting in virtual communication environments. At least some of these systems and methods provide a framework that includes one or more virtual areas and supports realtime communications between the communicants. At least some of these systems and methods provide an interface that includes navigation controls that enable a user to navigate virtual areas and interaction controls that enable the user to interact with other communicants in the one or more virtual areas.

16 Claims, 27 Drawing Sheets

Related U.S. Application Data continuation of application No. 15/228,807, filed on Aug. 4, 2016, now Pat. No. 11,023,092, which is a continuation of application No. 14/251,505, filed on Apr. 11, 2014, now Pat. No. 9,411,490, which is a continuation of application No. 13/422,757, filed on Mar. 16, 2012, now Pat. No. 8,732,593, which is a continuation of application No. 12/418,243, filed on Apr. 3, 2009, now Pat. No. 8,191,001.

(60) Provisional application No. 61/042,714, filed on Apr. 5, 2008.

(51) Int. Cl.
*G06F 3/0482* (2013.01)
*G06F 16/9537* (2019.01)
*G06Q 10/10* (2023.01)
*G06T 19/20* (2011.01)
*H04L 12/18* (2006.01)
*H04L 65/403* (2022.01)
*H04L 67/131* (2022.01)
*H04N 7/15* (2006.01)

(52) U.S. Cl.
CPC ............. *G06Q 10/10* (2013.01); *G06T 19/20* (2013.01); *H04L 12/1813* (2013.01); *H04L 12/1822* (2013.01); *H04L 65/403* (2013.01); *H04L 67/131* (2022.05); *H04N 7/157* (2013.01)

(58) Field of Classification Search
USPC ........ 715/730, 751, 756; 709/203, 204, 205, 709/206, 220, 223, 225, 227, 231, 238
See application file for complete search history.

(56) References Cited

U.S. PATENT DOCUMENTS

| | | | | |
|---|---|---|---|---|
| 2005/0234943 | A1* | 10/2005 | Clarke | H04L 67/131 |
| 2007/0044017 | A1* | 2/2007 | Zhu | G06F 40/166 |
| | | | | 715/209 |
| 2007/0075993 | A1* | 4/2007 | Nakanishi | A63F 13/87 |
| | | | | 345/419 |
| 2008/0215994 | A1* | 9/2008 | Harrison | H04L 67/131 |
| | | | | 715/757 |
| 2008/0268418 | A1* | 10/2008 | Tashner | G09B 7/00 |
| | | | | 715/706 |

OTHER PUBLICATIONS

Terminal Disclaimer filed Jan. 8, 2024, filed in U.S. Appl. No. 17/246,843, pp. 1-3.
Response to Final Office Action dated Jan. 8, 2024, filed in U.S. Appl. No. 17/246,843, pp. 1-12.
Final Office Action mailed Aug. 8, 2023, filed in U.S. Appl. No. 17/246,843, pp. 1-14.
Response to Non-Final Office Action dated Mar. 30, 2023, filed in U.S. Appl. No. 17/246,843, pp. 1-10.
Non-Final Office Action dated Nov. 30, 2022, filed in U.S. Appl. No. 17/246,843, pp. 1-5.

* cited by examiner

SHARED VIRTUAL AREA COMMUNICATION ENVIRONMENT BASED APPARATUS AND METHODS

CROSS-REFERENCE TO RELATED APPLICATIONS

Under 35 U.S.C. § 119(e), this application claims the benefit of U.S. Provisional Application No. 61/042,714, filed Apr. 5, 2008, the entirety of which is incorporated herein by reference.

This application also relates to the following patent applications, the entirety of each of which is incorporated herein by reference:
U.S. Patent application Ser. No. 12/354,709, filed Jan. 15, 2009;
U.S. patent application Ser. No. 11/923,629, filed Oct. 24, 2007; and
U.S. patent application Ser. No. 11/923,634, filed Oct. 24, 2007.

BACKGROUND

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in three-dimensional virtual spaces. What are needed are improved systems and methods for interfacing with virtual communication environments.

SUMMARY

In one aspect, the invention features a method in accordance with which interaction options are determined from results of querying at least one interaction database that includes interaction records describing respective interactions of a user in a virtual communication environment. The virtual communication environment includes virtual areas and supports realtime communications between the user and other communicants. Each of the interaction records includes a respective place attribute value that identifies a respective one of the virtual areas in which a respective one of the interactions occurred and one or more communicant identifier attribute values that identify respective ones of the communicants that participated in the interaction in the respective virtual area. On a display, a user interface is presented. The user interface includes graphic representations of the interaction options in association with a respective set of one or more user-selectable controls. In response to the user's selection of a respective one of the user-selectable controls, an interaction of the user in the virtual communication environment is initiated.

In another aspect, the invention features a method in accordance with which a representation of a virtual area in a virtual communication environment is displayed on a display. The virtual communication environment supports realtime communications between a user and other communicants. On the display, user-selectable controls that enable the user to manage interactions with the virtual area and ones of the other communicants are presented. A respective presence of the user is established in the virtual area in response to input received from the user via the user-selectable controls. On the display, a respective graphical representation of each of the communicants who has presence in the virtual area is depicted. In this process, each of the respective graphic representations of the communicants is rendered in a respective position in the virtual area and with a three-dimensional spherical body element supporting a directional graphic sight element that has a variable orientation indicating a direction of attentional focus of the user in the virtual area.

In another aspect, the invention features a method in accordance with which a representation of a virtual area in a virtual communication environment is displayed on a display. The virtual communication environment supports realtime communications between a user and other communicants. On the display, user-selectable controls that enable the user to manage interactions with the virtual area and ones of the other communicants are presented. In this process, an immersion control interface is displayed. The immersion control interface enables the user to select a level of interaction with the particular virtual area from a set of different interaction levels. A respective presence of the user is established in the virtual area in response to input received from the user via the user-selectable controls. On the display, a respective graphical representation of each of the communicants who has presence in the virtual area is depicted.

In another aspect, the invention features a method in accordance with which place attribute values are associated with realtime interactions of a user and other communicants operating on respective network nodes and sharing a virtual communication environment. The virtual communication environment includes one or more virtual areas and supporting realtime communications between the user and the other communicants. For each interaction involving a respective one of the communicants in a respective one of the one or more virtual areas, the process of associating place attribute values involves generating a respective interaction record that includes a respective place attribute value that identifies the virtual area in which the interaction occurred and one or more communicant identifier attribute values that identify respective ones of the communicants that participated in the interaction. The user and the other communicants are interfaced to the virtual communication environment based on the associated place attribute values.

In another aspect, the invention features a method in accordance with which at a predetermined time, an invitation to join a meeting and a control for accepting the invitation. The meeting is scheduled to occur in a virtual area of a virtual communication environment is presented on a display. The virtual communication environment supports realtime communications between a user and other communicants operating on respective network nodes. In response to the user's selection of the control, a respective presence of the user is established in the virtual area. On the display, a representation of a virtual area and a respective graphical representation of each of the communicants who has presence in the virtual area are depicted.

In another aspect, the invention features a method in accordance with which a representation of a virtual area in a virtual communication environment is displayed on a display. The virtual communication environment supports realtime communications between a user and other communicants operating on respective network nodes. On the display, user-selectable controls that enable the user to manage interactions with the virtual area and ones of the other communicants are presented. On the display, a respective graphical representation of each of the communicants who has a presence in the virtual area is depicted. In this process, respective locations of the objects in the virtual area are determined based on respective realtime differential motion streams that describe movement of the objects in the virtual area and are received from the network nodes. At least a particular one of the graphic representations of the communicants automatically is repositioned based on at least one of the determined position of the particular graphic representation in the virtual area and proximity of the particular graphic representation to at least one other graphic representation of the communicants in the virtual area.

In another aspect, the invention features a method in accordance with which a representation of a virtual area in a virtual communication environment is displayed on a display. The virtual communication environment supports realtime communications between a user and other communicants. On the display, user-selectable controls that enable the user to manage interactions with the virtual area and ones of the other communicants are presented. The user-selectable controls comprise a modification control that enables the user to initiate a modification of the virtual area on-demand. A respective presence of the user is established in the virtual area in response to input received from the user via the user-selectable controls. On the display, a respective graphical representation of each of the communicants who has presence in the virtual area is depicted.

In another aspect, the invention features a method in accordance with which place attribute values are associated with data files received from communicants operating on respective network nodes and sharing a virtual communications environment that includes one or more virtual areas and supports realtime communications between the communicants. For each of the data files shared by a respective one of the communicants in a respective one of the one or more virtual areas, the process of associating place attribute values includes generating a respective interaction record comprising a respective one of the place attribute values that identifies the respective virtual area in which the data file was shared and a respective data file identifier that identifies the respective data file. Sharing of the data files between the communicants is managed based on the associated place attribute values.

In another aspect, the invention features a method in accordance with which a graphic representation of a virtual area in a virtual communication environment is displayed on a display. The virtual communication environment supports realtime communications between a first communicant operating on a first network node and a second communicant operating on a second network node. A first software application that establishes a first realtime data stream connection between the first and second network nodes is executed on the first network node. The first realtime data stream connection is associated with a reference to the virtual area. Concurrently with the execution of the first software application, a second software application that establishes a second realtime data stream connection between the first network node and a third network node on which a third communicant is operating is executed on the first network node. The second realtime data stream connection is free of any reference to the virtual area. One or more integrated realtime data streams are produced from realtime data streams exchanged over the first and second realtime data stream connections.

In another aspect, the invention features a method in accordance with which a server network node is operated to perform operations including the following operations. An instance of a client software application is executed in association with a virtual area in a virtual communication environment supporting realtime communications between communicants operating on respective client network nodes. Realtime input data streams are received from respective ones of the client network nodes associated with the communicants interacting in the virtual area. A composite data stream is produced from the realtime input data streams. The composite data stream is inputted to the executing instance of the client software application. Respective instances of an output data stream are generated from output generated by the executing instance of the client software application at least in part in response to the inputting of the composite data stream. The instances of the output data stream are transmitted to respective ones of the client network nodes associated with communicants interacting in the virtual area.

In another aspect, the invention features a method in accordance with which a virtual area in a virtual communications environment is established. The virtual communication environment supports realtime communications between communicants operating on respective network nodes. A respective presence is created in the virtual area for each of one or more of the communicants. Information is transmitted between a file store associated with the virtual area and a wiki resource in response to input received from a respective one of the network nodes associated with a respective one of the communicants who has presence in the virtual area.

In another aspect, the invention features a method in accordance with which place attribute values are associated with realtime interactions of a user and other communicants operating on respective network nodes and sharing a virtual communication environment comprising at least one virtual area and supporting realtime communications between the user and the other communicants. Each of the user and the other communicants is associated with a respective object in the virtual area. The method additionally includes interfacing the user and the other communicants to the virtual communication environment based on the associated place attribute values.

The invention also features apparatus operable to implement the method described above and computer-readable media storing computer-readable instructions causing a computer to implement the method described above.

DETAILED DESCRIPTION

Figure 1:
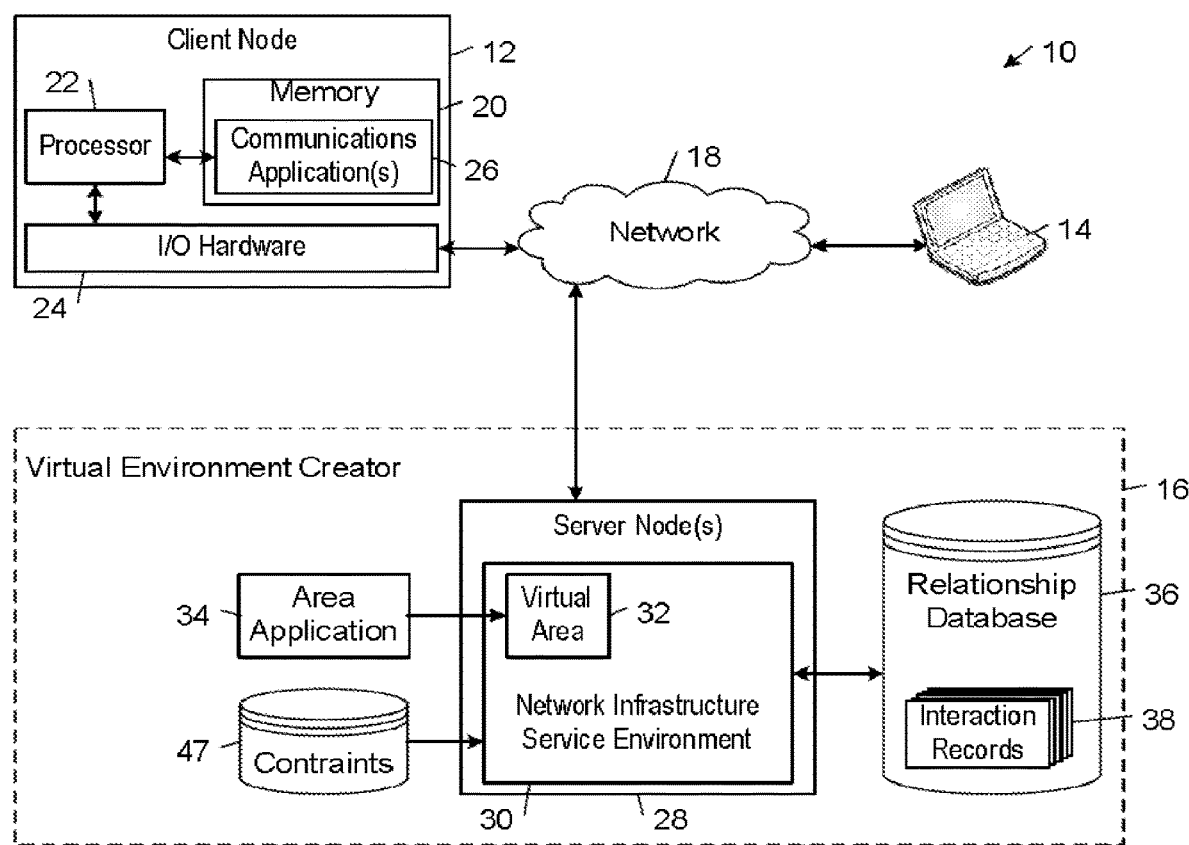
FIG. 1 is a diagrammatic view of an embodiment of a network communication environment that includes a first client network node, a second client network node, and a virtual environment creator.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes. A "realtime contact" of a user is a communicant or other person who has communicated with the user via a realtime communications platform.

A "communicant interaction" is any type of direct or indirect action or influence between a communicant and another network entity, which may include for example another communicant, a virtual area, or a network service. Exemplary types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity. When a communicant has presence in a particular virtual area, that communicant is said to be "in" that virtual area.

A "virtual communication environment" is a representation of a computer-managed space that includes at least one virtual area and supports realtime communications between communicants.

A "place attribute value" refers to a value that characterizes an aspect of a place within a virtual communication environment, where a "place" may refer to spatial aspects of the virtual communication environment, including but not limited to a set of virtual areas, a single virtual area, one or more rooms within a virtual area, a zone or other region within a room of a virtual area, or a particular position within a virtual area. A place identifier, for example, is a place attribute that denotes, identifies, or locates a place within a virtual environment.

The term "interfacing" means providing one or more facilities enabling a communicant to physically, functionally, or logically interact with a virtual communication environment. These facilities may include one or more of computer hardware, computer firmware, and computer software.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

A "window" is a visual area of a display that typically includes a user interface. A window typically displays the output of a software process and typically enables a user to input commands or data for the software process. A window that has a parent is called a "child window." A window that has no parent, or whose parent is the desktop window, is called a "top-level window." A "desktop" is a system-defined window that paints the background of a graphical user interface (GUI) and serves as the base for all windows displayed by all software processes.

A "network node" (also referred to simply as a "node") is a junction or connection point in a communications network. Exemplary network nodes include, but are not limited to, a terminal, a computer, and a network switch. A "server" network node is a host computer on a network that responds to requests for information or service. A "client" network node is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link. A "connection handle" is a pointer or identifier (e.g., a uniform resource identifier (URI)) that can be used to establish a network connection with a communicant, resource, or service on a network node. A "network communication" can include any type of information (e.g., text, voice, audio, video, electronic mail message, data file, motion data stream, and data packet) that is transmitted or otherwise conveyed from one network node to another network node over a network connection.

A "database" is an organized collection of records that are presented in a standardized format that can be searched by computers. A database may be stored on a single computer-readable data storage medium on a single computer or it may be distributed across multiple computer-readable data storage media on one or more computers.

A "file store" is a data file storage system that allows network access to data files that are stored on one or more nodes of the network.

A "multitrack recording" is a data file that stores multiple separable tracks (or layers) of data streams of the same or different data type (e.g., audio, motion, video, chat), where each of the tracks can be separately accessed and manipulated.

An "identifier" identifies an entity in a way that is locally unique or globally unique. A resource identifier identifies a resource and provides a handle for interacting with (e.g., acting on or obtaining) a representation of the resource. A "resource" refers to any type of information (e.g., a web page, a file, streaming data, and presence data) or service (e.g., a service that establishes a communications link with another user) that is accessible over a network. A resource may be identified by a uniform resource identifier (URI). A "handle" is a pointer or identifier (e.g., a uniform resource identifier (URI)) that can be used to establish a network connection with a communicant, resource, or service on a network node.

A "data source" (referred to herein simply as a "source") is any of a device, part of a device (e.g., a computer), or software that originates data.

A "data sink" (referred to herein simply as a "sink") is any of a device, part of a device (e.g., a computer), or software that receives data.

A "switching rule" is an instruction that specifies one or more conditions that must be satisfied in order to connect or disconnect one or more real-time data sources and one or more real-time data sinks.

A "stream mix" is a combination of two or more real-time data streams of the same or semantically consistent type (e.g., audio, video, chat, and motion data). For example, a set of voice streams might be mixed into a single voice stream or a voice stream might be mixed into the audio portion of a video stream.

A "stream handling topology" is the organization of network routes over which real-time data streams (each of which may be a mixed stream or an unmixed stream) are delivered to one or more network nodes.

A "wiki" is a website or similar online resource that allows users to add and edit content collectively. In the case of a website based wiki, users typically collaborate using respective web browser applications.

A "real-time data stream" is data that is structured and processed in a continuous flow and is designed to be received with no delay or only imperceptible delay; real-time data streams include digital representations of voice, video, user movements, facial expressions and other physical phenomena as well as data within the computing environment that may benefit from rapid transmission, rapid execution, or both rapid transmission and rapid execution, including for example, avatar movement instructions, text chat, real-time data feeds (e.g., sensor data, machine control instructions, transaction streams and stock quote information feeds), and file transfers.

A "virtual area" (also referred to herein as an "area" or a "place") is a representation of a computer-managed space or scene. Virtual areas may be two-dimensional or three-dimensional representations. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A switching rule controls the switching (e.g., routing, connecting and disconnecting) real-time data streams between network nodes communicating through a shared virtual area. A governance rule control a communicant's access to a resource (e.g., an area, a region of an area, or the contents of that area or region), the scope of that access, and follow-on consequences of that access (e.g., the requirement that audit records relating to that access be recorded).

In the context of a virtual area, an "object" is any type of discrete element in a virtual area that may be usefully treated as separate from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

A "position" in a virtual area refers to a location of a point or an area or a volume in the virtual area. A point typically is represented by a single set of two-dimensional or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "statistic" is a quantity that is calculated in a statistical analysis from data in a sample and characterizes an aspect of the sample. The term "statistical analysis" refers to a process of analyzing data for the purpose of making generalizations or inferences, determining values of variables of a predictive model, determining one or more metrics that summarize the data, or classifying one or more aspects or subjects of the data.

A "third party" refers to an entity that is not affiliated with the entity that owns or controls Sococo platform. A third party typically is independent of any contract between a communicant and the owner of the Sococo platform.

As used herein, the term "includes" means includes but not limited to, the term "including" means including but not limited to, and "based on" means based at least in part on.

II. Overview

A. An Exemplary Operating Environment

1. Introduction

The embodiments that are described herein provide improved systems and methods for navigating and interacting in virtual communication environments.

These embodiments provide an interface that includes navigation controls that enable a user to navigate virtual areas and interaction controls that enable the user to interact with other communicants in the virtual areas.

FIG. 1 shows an embodiment of an exemplary network communications environment 10 that includes a first client network node 12, a second client network node 14, and a virtual environment creator 16 that are interconnected by a network 18. The first client network node 12 includes a computer-readable memory 20, a processor 22, and input/output (I/O) hardware 24. The processor 22 executes at least one communications application 26 that is stored in the memory 20. The second client network node 14 typically is configured in substantially the same way as the first client network node 12. The virtual environment creator 16 includes at least one server network node 28 that provides a network infrastructure service environment 30. The communications application 26 and the network infrastructure service environment 30 together provide a platform (referred to herein as "the platform") for creating a spatial virtual communication environment (also referred to herein simply as a "virtual environment").

In some embodiments, the network infrastructure service environment 30 manages sessions of the first and second client nodes 12, 14 in a virtual area 32 in accordance with a virtual area application 34. The virtual area application 34 is hosted by the virtual area 32 and includes a description of the virtual area 32. The communications applications 26 operating on the first and second client network nodes 12, 14 present respective views of the virtual area 32 in accordance with data received from the network infrastructure service environment 30 and provide respective interfaces for receiving commands from the communicants. The communicants typically are represented in the virtual area 32 by respective avatars, which move about the virtual area 32 in response to commands that are input by the communicants at their respective network nodes. Each communicant's view of the virtual area 32 typically is presented from the perspective of the communicant's avatar, which increases the level of immersion experienced by the communicant. Each communicant typically is able to view any part of the virtual area 32 around his or her avatar. In some embodiments, the communications applications 26 establish realtime data stream connections between the first and second client network nodes 12, 14 and other network nodes sharing the virtual area 32 based on the positions of the communicants' avatars in the virtual area 32.

The network infrastructure service environment 30 also maintains a relationship database 36 that contains records 38 of interactions communicants in virtual areas. Each interaction record 38 describes the context of an interaction between one or more communicants in a virtual area.

2. Network Environment

The network 18 may include any of a local area network (LAN), a metropolitan area network (MAN), and a wide area network (WAN) (e.g., the internet). The network 18 typically includes a number of different computing platforms and transport facilities that support the transmission of a wide variety of different media types (e.g., text, voice, audio, and video) between network nodes.

The communications application 26 (see FIG. 1) typically operates on a client network node that includes software and hardware resources which, together with administrative policies, user preferences (including preferences regarding the exportation of the user's presence and the connection of the user to areas and other users), and other settings, define a local configuration that influences the administration of realtime connections with other network nodes. The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. application Ser. Nos. 11/923,629 and 11/923,634, both of which were filed on Oct. 24, 2007.

3. Network Infrastructure Services

The network infrastructure service environment 30 typically includes one or more network infrastructure services that cooperate with the communications applications 26 in the process of establishing and administering network connections between the client nodes 12, 14 and other network nodes (see FIG. 1). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 30 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 10.

Area Service

The area service administers virtual areas. In some embodiments, the area service remotely configures the communications applications 26 operating on the first and second client network nodes 12, 14 in accordance with the virtual area application 34 subject to a set of constraints 47 (see FIG. 1). The constraints 47 typically include controls on access to the virtual area. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area subject to the capabilities of the requesting entities, maintains global state information for the virtual area, and serves as a data server for the client network nodes participating in a shared communication session in a context defined by the virtual area 32. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 32 on the client network node in accordance with the virtual area application 34. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

Interaction Service

The interaction service maintains the relationship database 36 that contains the records 38 of interactions between communicants. For every interaction between communicants, one or more services of the network infrastructure service environment 30 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared.

The interaction service also supports queries on the relationship database 36 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database 36 can be combined with other searches. For example, queries on the relationship database may be combined with queries on contact history data generated for interactions with contacts using a communication system (e.g., Skype, Facebook, and Flickr) that is outside the domain of the network infrastructure service environment 30.

4. Virtual Areas

The communications application 26 and the network infrastructure service environment 30 typically administer the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

In some embodiments, the spatial virtual communication environment is modeled as a spatial hierarchy of virtual areas (also referred to herein as "places" or "locations") and objects. The spatial hierarchy includes an ordered sequence of levels ranging from a top level to a bottom level. Each of the places in a successive one of the levels of the spatial hierarchy is contained in a respective one of the places in a preceding one of the levels. Each of the objects in the spatial hierarchy is contained in a respective one of the places. The levels of the spatial hierarchy typically are associated with respective visualizations that are consistent with a geographical, architectural, or urban metaphor, and are labeled accordingly. The zones of each virtual area are defined by respective meshes, some of which define elements of a physical environment (e.g., spaces, such as rooms and courtyards, that are associated with a building) that may contain objects (e.g., avatars and props, such as view screen objects and conferencing objects).

As explained above, communicants typically are represented by respective avatars in a virtual area that has an associated visualization. The avatars move about the virtual area in response to commands that are input by the communicants at their respective network nodes. In some embodiments, the communicant's view of a virtual area instance typically is presented from the perspective of the communicant's avatar, and each communicant typically is able to view any part of the visual virtual area around his or her avatar, increasing the level of immersion that is experienced by the communicant.

Figure 2:
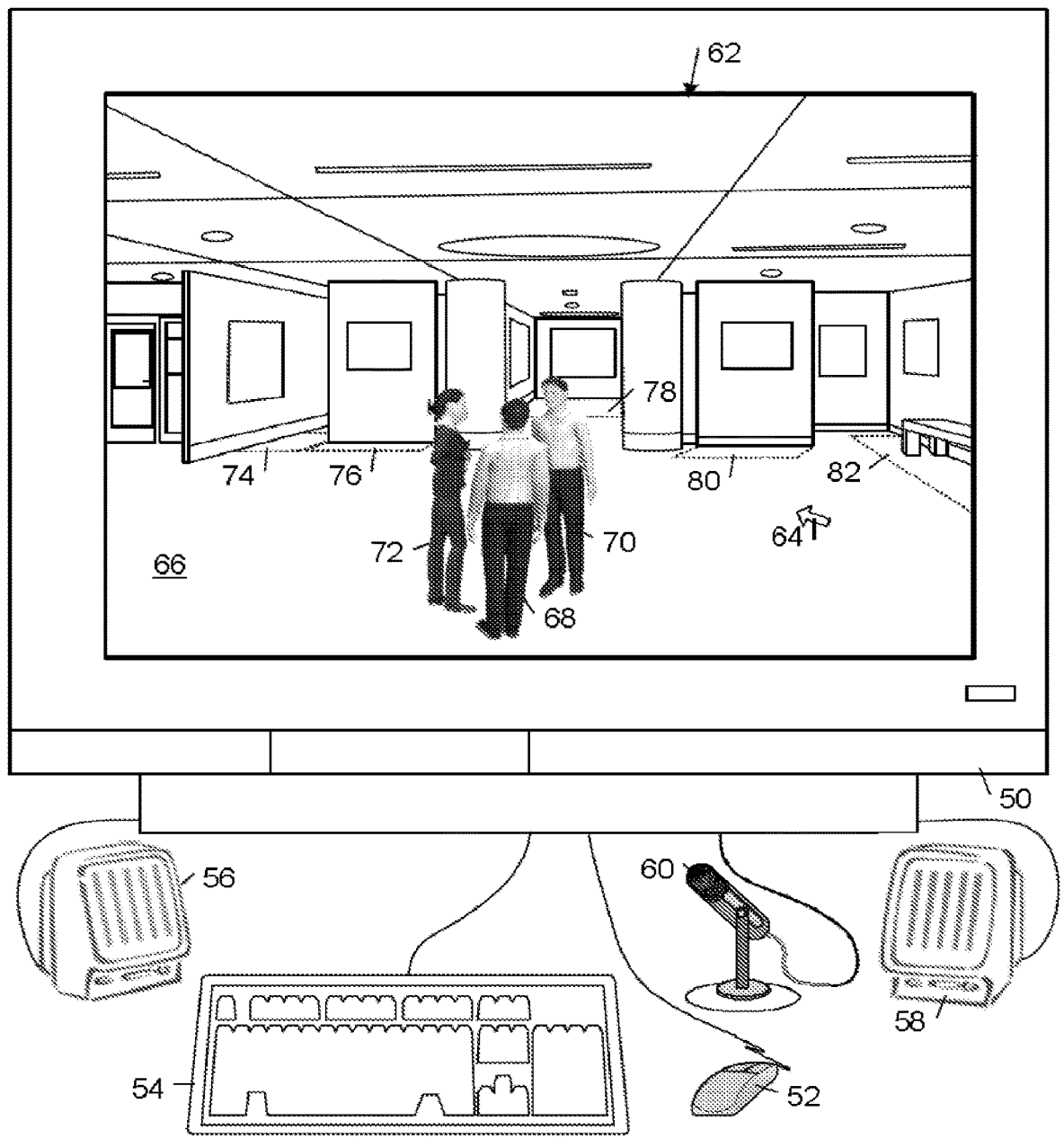
FIG. 2 is a diagrammatic view of an embodiment of a network node that includes a graphical user interface presenting a depiction of a virtual area.

FIG. 2 shows an embodiment of an exemplary network node that is implemented by a computer system 48. The computer system 48 includes a display monitor 50, a computer mouse 52, a keyboard 54, speakers 56, 58, and a microphone 60. The display monitor 50 displays a graphical user interface 62. The graphical user interface 62 is a windows-based graphical user interface that can include multiple windows, icons, and a pointer 64. In the illustrated embodiment, the graphical user interface 62 presents a two-dimensional depiction of a shared virtual area 66 that is associated with a three-dimensional visualization representing an art gallery. Communicants are represented in the virtual area 66 by respective avatars 68, 70, 72, each of which may have a respective role (e.g., a curator, an artist, and a visitor) in the context of the virtual area 66.

As explained in detail below, the virtual area 66 includes zones 74, 76, 78, 80, 82 that are associated with respective rules that govern the switching of realtime data streams between the network nodes that are represented by the avatars 68-72 in the virtual area 66. (During a typical communication session, the dashed lines demarcating the zones 74-82 in FIG. 2 are not visible to the communicants although there may be visual cues associated with such zone boundaries.) The switching rules dictate how local connection processes executing on each of the network nodes establishes communications with the other network nodes based on the locations of the communicants' avatars 68-72 in the zones 74-82 of the virtual area 66.

A virtual area is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions within the virtual area, and objects within the virtual area. In some embodiments, the geometric elements of the virtual area are described in accordance with the COLLADA-Digital Asset Schema Release 1.4.1 Apr. 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. Application Nos. 61/042,714 (which was filed on Apr. 4, 2008), Ser. No. 11/923,629 (which was filed on Oct. 24, 2007), and Ser. No. 11/923,634 (which was filed on Oct. 24, 2007).

5. Client Node Architecture

A communicant typically connects to the network 18 from a client network node. The client network node typically is implemented by a general-purpose computer system or a dedicated communications computer system (or "console", such as a network-enabled video game console). The client network node executes communications processes that establish realtime data stream connections with other network nodes and typically executes visualization rendering processes that present a view of each virtual area entered by the communicant.

Figure 3:
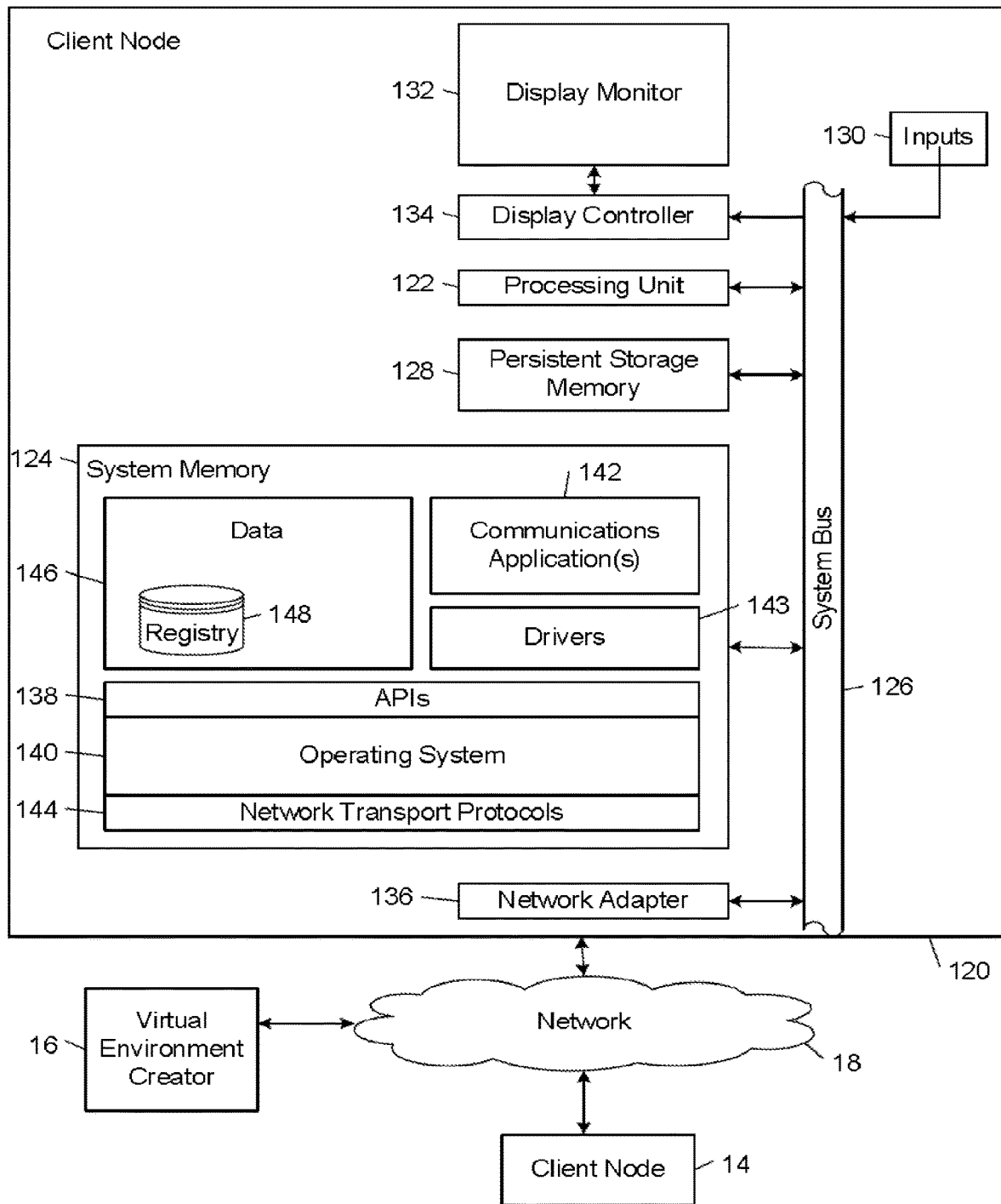
FIG. 3 is a block diagram of the network communication environment of FIG. 1 that shows components of an embodiment of a client network node.

FIG. 3 shows an embodiment of a client network node that is implemented by a computer system 120. The computer system 120 includes a processing unit 122, a system memory 124, and a system bus 126 that couples the processing unit 122 to the various components of the computer system 120. The processing unit 122 may include one or more data processors, each of which may be in the form of any one of various commercially available computer processors. The system memory 124 includes one or more computer-readable media that typically are associated with a software application addressing space that defines the addresses that are available to software applications. The system memory 124 may include a read only memory (ROM) that stores a basic input/output system (BIOS) that contains start-up routines for the computer system 120, and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A communicant may interact (e.g., input commands or data) with the computer system 120 using one or more input devices 130 (e.g. one or more keyboards, computer mice, microphones, cameras, joysticks, physical motion sensors such Wii input devices, and touch pads). Information may be presented through a graphical user interface (GUI) that is presented to the communicant on a display monitor 132, which is controlled by a display controller 134. The computer system 120 also may include other input/output hardware (e.g., peripheral output devices, such as speakers and a printer). The computer system 120 connects to other network nodes through a network adapter 136 (also referred to as a "network interface card" or NIC).

A number of program modules may be stored in the system memory 124, including application programming interfaces 138 (APIs), an operating system (OS) 140 (e.g., the Windows XP® operating system available from Microsoft Corporation of Redmond, Washington U.S.A.), an embodiment 142 of the communications application 26, drivers 143 (e.g., a GUI driver), network transport protocols 144 for transmitting and receiving real-time data streams, and data 146 (e.g., input data, output data, program data, a registry 148, and configuration settings).

The operating system 140 includes an executive that provides the base operating system services (e.g., memory management, process and thread management, security, input/output, and interprocess communication) for creating a run-time execution environment on the computer system. The registry 148 typically contains the following information: parameters needed to boot and configure the system; system-wide software settings that control the operation of operating system 140; a security database; and per-user profile settings. A native operating system (OS) application programming interface (API) exposes the base operating system services of the executive to the communications application 142 and other user applications. As used herein, the term "service" (or "service module") refers to a component of an operating system that provides a set of one or more functions.

In some embodiments, the communications application 142 includes processes that control the presentation of a respective view of a virtual area and objects in the virtual area on the display monitor 132 and processes that control the switching of real-time data streams between the client network node 120, the client network node 14, and the virtual environment creator 16. The communications application 142 interfaces with the GUI driver and the user input 130 to present the views of the virtual area and to allow the communicant to control the operation of the communications application 142.

Embodiments of the communications application 142 may be implemented by one or more discrete modules (or data processing components) that are not limited to any particular hardware, firmware, or software configuration. In general, these modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components. In some implementations, process instructions (e.g., machine-readable code, such as computer software) for implementing the methods that are executed by the embodiments of the communications application 142, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM. Embodiments of the communications application 142 may be implemented in any one of a wide variety of electronic devices, including personal computing devices (e.g., desktop computers, mobile computers, and communications devices), network devices (e.g., server computers, routers, switches, and hubs), game consoles, cable TV and hybrid set-top boxes, and modems.

In some embodiments, communications over the network 18 are conducted in accordance with the Transmission Control Protocol/Internet Protocol (TCP/IP). The TCP portion of the protocol provides the transport function by breaking a message into smaller packets, reassembling the packets at the other end of the communication network, and re-sending any packets that get lost along the way. The IP portion of the protocol provides the routing function by assigning to the data packets addresses for the destination network and the target node at the destination network. Each data packet that is communicated using the TCP/IP protocol includes a header portion that contains the TCP and IP information. The IP protocol provides no guarantee of packet delivery to the upper layers of the communications stack. The TCP protocol, on the other hand, provides a connection-oriented, end-to-end transport service with guaranteed, in-sequence packet delivery. In this way, the TCP protocol provides a reliable, transport layer connection.

In other embodiments, communications over the network 18 may be conducted in accordance with the User Datagram Protocol/Internet Protocol (UDP/IP). UDP may be used in place of TCP in conditions when a reliable delivery is not required. For example, UDP/IP may be used for real-time audio and video traffic where lost data packets are simply ignored because of any of the following reasons: there is no time to retransmit or any degradation of overall data quality is acceptable.

Some embodiments may use the Java Media Framework (JMF), which supports device capture, encoding, decoding, rendering, and the Real-Time Transport Protocol (RTP). A variety of network protocols may be used in transmitting and receiving RTP data between the area client network nodes 52-56, including peer-to-peer networking frameworks, a centralized server using TCP sockets alone or in combination with UDP, or multicast protocols.

The execution environment also includes hardware link level and access protocols, which may correspond to the Data link and Physical layers of the Open System Interconnection (OSI) reference model.

In the illustrated embodiments, communications between the client network nodes 120, 14 and the virtual environment creator 16 are conducted in accordance with the TCP/IP protocol. In these embodiments, the computer system determines an IP address for each of its network interfaces before it communicates using TCP/IP. This process may involve contacting a server to dynamically obtain an IP address for one or more of its network interfaces. The computer system may use a Dynamic Host Configuration Protocol (DHCP) to issue a request for an IP address to a DHCP server. In this regard, the computer system broadcasts a DHCP request packet at system start up requesting allocation of an IP address for an indicated network interface. Upon receiving the DHCP request packet, the DHCP server allocates an IP address to the computer system for use with the indicated network interface. The computer system then stores the IP address in the response from the server as the IP address to associate with that network interface when communicating using an IP protocol.

6. Server Node Architecture

In some embodiments, the one or more server network nodes of the virtual environment creator 16 are implemented by respective general-purpose computer systems of the same type as the client network node 120, except that each server network node typically includes one or more server software applications.

In other embodiments, the one or more server network nodes of the virtual environment creator 16 are implemented by respective network devices that perform edge services (e.g., routing and switching).

7. System Database and Storage Facility

The system database and storage facility stores various kinds of information that is used by the platform. Exemplary information that typically is stored by the storage facility includes the presence database, the relationship database, an avatar database, a real user id (RUID) database, an art cache database, and an area application database. This information may be stored on a single network node or it may be distributed across multiple network nodes.

8. File Association and Storage

The network infrastructure service environment 30 associates data files with places. A Sococo place may have arbitrary data (i.e. files and streams) associated with it. If a user shares a document in a Sococo place, the file is associated with the room and will persist there until it is deleted by an authorized user.

Figure 4:
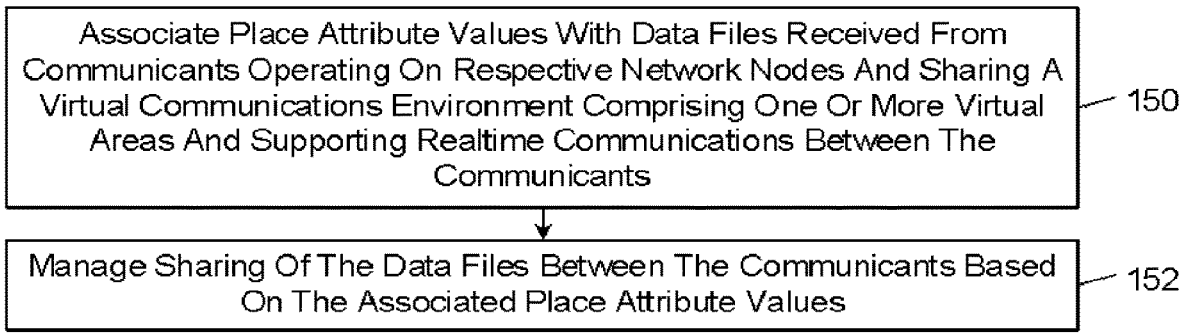
FIG. 4 is a flow diagram of an embodiment of a method by which the network infrastructure service environment 30 handles shared data files.

FIG. 4 shows an embodiment of a method by which the network infrastructure service environment 30 handles shared data files. In accordance with the method of FIG. 4, the interaction service associates place attribute values with data files received from communicants operating on respective network nodes and sharing a virtual communications environment comprising one or more virtual areas and supporting realtime communications between the communicants (FIG. 4, block 150). In this process, for each of the data files shared by a respective one of the communicants in a respective one of the one or more virtual areas, the interaction service generates a respective interaction record that includes a respective one of the place attribute values that identifies the respective virtual area in which the data file was shared and a respective data file identifier that identifies the respective data file. The network infrastructure service environment 30 manages sharing of the data files between the communicants based on the associated place attribute values (FIG. 4, block 152).

In some embodiments, the network infrastructure service environment 30 associates a file stored on a user's network node with a virtual area in response to receipt of an indication by the user to share the file with ones of the other communicants in the virtual area.

A document can be shared in a variety of ways. In a first exemplary case, a document is shared by a user by directing a document to a view screen in a virtual area (also referred to herein as a Sococo place) that is being shared with another user. In a second exemplary case, a document is shared by viewing the document in the shared Sococo place, where the document is being presented by a server process running a shared application program (e.g., a Microsoft Office application program, such as Word, Excel, PowerPoint) on the area server. In a third exemplary case, a document is shared by uploading the document to a file store that is associated with the shared Sococo place. In a fourth exemplary case, a document is shared by uploading the document to the file store and everybody who is in the shared Sococo place at that time receives a copy of the shared document automatically (similar to a direct file share); everyone then has their own copy of the document. Multiple ones of these four exemplary cases described can be mixed and matched to produce hybrid document sharing cases.

In the first case described in the preceding paragraph, there is not a persistent association of the document with the shared Sococo place unless a separate explicit recording of the interaction was made. In each of the other cases described in the preceding paragraph, the Sococo platform automatically stores a persistent copy of the shared document in association with the shared Sococo place. In this process, the network infrastructure service environment 30 copies the shared file from the user's network node to another data storage location that is indexed with an attribute value identifying the virtual area. At any future time, a user may reenter the Sococo place and browse the repository of files associated with that space-assuming the user has appropriate permissions.

In some embodiments, governance rules are associated with a shared Sococo place to control who has access to the place, who has access to its contents, what is the scope of that access to the place's contents (e.g., what can a user do with the contents), and what are the follow-on consequences of accessing the place's contents (e.g., record keeping, such as audit logs, and payment requirements).

In some embodiments, an entire Sococo place or a region of the Sococo place is associated with a "governance mesh." In some embodiments, a governance mesh is implemented in a way that is analogous to the way in which the zone mesh described in U.S. application Ser. Nos. 11/923,629 and 11/923,634 are implemented. A governance mesh enables a developer to associate governance rules with a Sococo place or a region of a Sococo place. This avoids the need for the creation of individual permissions for every file in a place or deal with the complexity that potentially could arise when there is a need to treat the same document differently depending on the context.

In some embodiments, a Sococo place is associated with a governance mesh that associates one or more regions (or zones) of the place with a digital rights management (DRM) function. The DRM function controls access to one or more of the place or one or more regions within the place or objects within the place. The DRM function is triggered every time a communicant crosses a governance mesh boundary within the Sococo place. The DRM function determines whether the triggering action is permitted and, if so, what is the scope of the permitted action, whether payment is needed, and whether audit records need to be generated.

In an exemplary implementation of a Sococo place, the associated governance mesh is configured such that if a communicant is able to enter the place he or she is able to perform actions on all of the documents associated with the room, including manipulating the documents, viewing the documents, downloading the documents, deleting the documents, modifying the documents and re-uploading the documents.

Thus, each Sococo place can become a repository for information that was shared and discussed in that room.

9. Recordings

A Sococo realtime communications session may be recorded. In this process, the Sococo platform stores a multitrack recording on at least one computer-readable medium. The multitrack recording includes realtime data streams of different data types that are transmitted over one or more network connections with one or more of the network nodes in connection with an interaction of one or more of the communicants in a particular one of the virtual areas, where the multitrack recording includes a respective track for each of the different data types of the realtime data streams. In some embodiments, the Sococo platform stores the multitrack recording in accordance with a recording rule that is described in a specification of the particular virtual area that includes a description of geometric elements of the particular virtual area. In some cases, a recording captures all the realtime streams (audio streams, realtime motion—as vector data, file sharing, etc.) and archives it with the Sococo place where the interaction took place. In this process, the Sococo platform generates an interaction record that includes a respective one of the place attribute values that identifies the particular Sococo place, and a respective data file identifier that identifies the multitrack recording.

The Sococo platform plays back the multi-track streams of audio, motion, chat and so forth in a recreation of what happened in an area. In this process, the Sococo platform replays the individual streams, which is distinctly different from playing a movie (i.e., a single homogenized stream) of the recorded interaction from a fixed vantage point. For example, the multi-track playback allows users to experience what a meeting was like in immersive detail from any position and vantage point (camera angle) within the place. It also allows user to navigate to other parts of an area (e.g. the breakout session at the seminar you didn't attend) beyond what a single user could experience simultaneously.

The multi-track recording and multi-track playback capabilities of the Sococo platform are especially useful for meetings in corporate settings. For example, a meeting can be recorded for later viewing by any other user who was unable to participate. These capabilities also can be used to produce recordings for training, distance learning, news, sports and entertainment. In these cases, the recordings are a recorded set of produced or scripted realtime streams (e.g., scripted avatar motions and interactions within a Sococo place).

A user with appropriate permissions can enter a Sococo place and browse/view any recordings associated with that Place and play them. In some embodiments, the Sococo platform transmits the realtime data streams of the multi-track recording to a particular one of the network nodes as separable data streams that are individually manipulable by the particular network node.

10. Pseudo File System

The Sococo platform associates files and recordings with an area using interactions records. In some embodiments, the Sococo platform manages the sharing of the data files between the communicants based on the results of queries on the interaction records. In some embodiments, the Sococo platform stores and organizes the interaction records using a pseudo file system (or restated, a database system for locating files). The records of this database include references to one or more areas, users present when the file was uploaded or created, and timestamp information. The Sococo platform can then retrieve files based on location within an area (e.g. a room, or a virtual table top), or based on a user (creator/uploader, communicant present or either) or time (specific or range). The Sococo platform also can use the traditional file name. The pseudo file system can be queried in ways that show all of the files that are associated with one or more of an area, a region of an area, a user, or time. In this process, the interaction records can be queried based on one or more of: a time attribute value associated with one or more of the data files; a place attribute value associated with one or more of the data files; and a communicant identifier associated with one or more of the data files. The pseudo file system enables a database query approach to locating files, rather than a traditional folder/file model. Details of the pseudo file system are described below.

The pseudo file system allows a user of the Sococo platform to find information stored by the platform (e.g. uploaded files or recordings) using multiple possible strategies. For example, a user may ask to see a list of all the files uploaded to a particular area by a particular user, and then select one of those files to download to their own computer. Alternatively, a user may ask to see all the files that were uploaded to a portion of an area while that user and another user were together in that portion of the area. Alternatively, a user may ask to see all the files that were uploaded to an area today, or last week. The user may then want to show only those files uploaded while certain other users were present.

For example, Alice may remember that she was with Bob in Charlie's virtual office when a file she is attempting to locate was uploaded to the Sococo platform. Finding many possible files to choose from, she begins listening to recordings of voice audio made at the same time various files were uploaded to refresh her memory of the context in which those files were uploaded. The pseudo file system makes it possible to perform this type of query and review, followed by further relational queries if needed, to refine a search for a particular piece of information. Specific information can be located by several different routes depending on what the user recalls about the context in which the information was stored by the Sococo Platform.

The traditional technique for locating a bit field uses the following identification syntax:

//hostname/drive/path/name.ext where the syntax elements are specified as follows:

| | |
|---|---|
| hostname | A simple string uniquely associated with a particular computer |
| drive | A simple string uniquely associated with a virtual hard disk within the set contained by hostname |
| path | A formatted string identifying a hierarchy of folders within the set contained by drive |
| name | A simple string associated with each element of the set of bit fields contained by path |
| ext | A restricted vocabulary string hinting at the type of a bit field, and also uniquely identifying the bit field within a name set (i.e. each name: ext pair is unique) |

In this discussion, the term "bit field" refers to the binary content of the specified file (content is typically stored separately from the filename and other metadata related to the content in a traditional filesystem). An example of a code implementation of this approach uses the C programming language command fopen as follows:

fopen("//hostname/drive/path/name.ext");

Execution of this command opens a stream of, for example, 8, 16 or 32 bit, words that can be read into a buffer, processed out of the buffer, and that process repeated until the stream is exhausted or closed.

Embodiments of the Sococo platform incorporate a new pseudo file system technique that introduces a relational database in place of the traditional//hostname/drive/path/name.ext parser and associated bit field locator. In these embodiments, the pseudo file system provides an alternate technique for locating bit fields (the content normally associated with a filename in a traditional filesystem). These embodiments use the following identification syntax:

//hostname:dbname "query"

where//hostname is as above, and dbname is an optional database name on that host. If the specified database is absent, the query is directed to the host-configured default database. The "query" string has relational database semantics (e.g., SQL semantics). In some embodiments, the schema is based on the following:

| | |
|---|---|
| time start and end absolute times | Each bit field record includes a range of absolute times. A query that specifies a single time returns all of the bit field records whose range includes that time. A query that specifies a range may return one of three sets: the set of all bit fields whose range includes any time within the specified range, those bit fields that are entirely contained within the query range, or those bit fields that are exactly the extent of the range. |
| people list of globally unique identifiers | Each bit field record is associated with one or more people. A query that specifies a unique user identifier returns all of the bit field records whose people list includes that identifier. |
| place list of globally unique identifiers | Each bit field record is associated with one or more places. A query that specifies a unique place identifier returns all of the bit field records whose place list includes that identifier. |

| | |
|---|---|
| source locally unique identifier | Each bit field record is associated a source, which is an identifier of a local source of a data stream or other data. The source allows multiple data streams from the same network node to be distinguished from one another. A query that specifies a source returns all of the bit field records whose source matches that identifier. The source identifier need only be locally unique (only one per place at a given time). Source identifiers are typically strings. |
| name locally unique identifier | A simple string associated with a bit field. May include an ext, in which case it becomes a formatted string. A query based on a name or portion of a name returns the bit field records that generate hits based on text search criteria. |
| location unique value | A locator for the bit field in physical storage |

An example of a code implementation of these embodiments uses the C programming language command fopen as follows:

popen("//hostname:dbname 'unique query'")

Execution of this command opens a stream of, for example, 8, 16 or 32 bit, words that can be read into a buffer, processed out of the buffer, and that process repeated until the stream is exhausted or closed. In these embodiments, a query of a single time, a single place, a single source or name is always unique if it exists (i.e. it returns zero or one records). Any other query returns zero or more records. If there are multiple candidate bit fields, the returned record set may be parsed and processed, records displayed to a user and picked from a list, or the query further refined based on the time, people, place or source fields. Once uniqueness is achieved, the location value can be handed to the storage system and provide a stream to the caller, or deliver the entire bit field as a unit.

The Sococo platform can retrieve a particular one of the data files based on results of a query on the interaction records requested by a particular client node. In response to the client node request, the Sococo platform may transmit a storage location identifier associated with the particular data file to the particular network node, or it may transmit information derived from one or more of the interaction records identified in a result of the querying to the particular network node.

B. Exemplary Communication Session

Referring back to FIG. 2, during a communication session, each of the communicant network nodes generates a respective set of real-time data streams (e.g., motion data streams, audio data streams, chat data streams, file transfer data streams, and video data streams). For example, each communicant manipulates one or more input devices (e.g., the computer mouse 52 and the keyboard 54) that generate motion data streams, which control the movement of his or her avatar in the virtual area 66. In addition, the communicant's voice and other sounds that are generated locally in the vicinity of the network node 48 are captured by the microphone 60. The microphone 60 generates audio signals that are converted into a real-time audio stream. Respective copies of the audio stream are transmitted to the other network nodes that are represented by avatars in the virtual area 66. The sounds generated locally at these other network nodes are converted into real-time audio signals and transmitted to the network node 48. The network node 48 converts the received locally generated audio streams into audio signals that are rendered by the speakers 56, 58. The motion data streams and audio streams may be transmitted from each of the communicant nodes to the other communicant network nodes either directly or indirectly. In some stream handling topologies, each of the communicant network nodes receives copies of the real-time data streams that are transmitted by the other communicant network nodes. In other stream handling topologies, one or more of the communicant network nodes receives one or more stream mixes that are derived from real-time data streams that are sourced (or originated) from other ones of the network nodes.

Figure 5A:
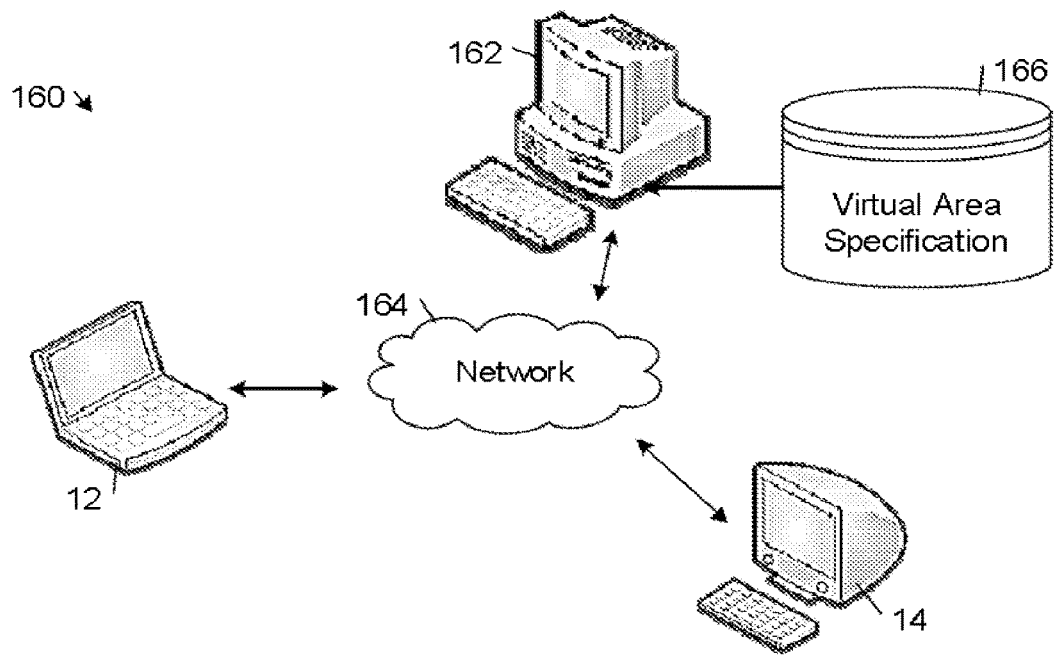
FIG. 5A is diagrammatic view of an embodiment of a shared virtual area communication environment in which network nodes communicate in a peer-to-peer architecture.

FIG. 5A is diagrammatic view of an embodiment of a shared virtual area communication environment 160 in which three network nodes 162, 12, 14 are interconnected by an embodiment 164 of the communications network 18 in a peer-to-peer architecture. The communications network 164 may be a local area network (LAN) or a global communication network (e.g., the Internet). The network nodes 162, 12, 14 are represented by respective computers.

In this architecture, each of the network nodes 162, 12, 14 transmits state changes, such as avatar movements in the virtual area, to each of the other network nodes. One of the network nodes (typically the network node that initiates a communication session) operates as an area server. In the illustrated embodiment, the network node 162 has assumed the role of the area server. The area server network node 162 maintains global state information and serves as a data server for the other network nodes 12, 14. The global state information includes a list of all of the objects that are in the virtual area and their respective locations in the virtual area. The area server network node 162 periodically sends the global state information to the other network nodes 12, 14. The area server network node 162 also registers and transmits initialization information to other network nodes that request to join the communication session. In this process, the area server network node 162 transmits to each joining network node a copy of a virtual area specification 166, which may be stored in a local or remote database. The area server network node 162 also ensures that other network nodes 12, 14 can synchronize to a global state if a communications fault occurs.

As explained in detail above, the virtual area specification 166 includes a description of geometric elements of the virtual area and one or more switching rules governing real-time stream connections between the network nodes. The description of the geometric elements allows respective communications applications operating on the network nodes 162, 12, 14 to present respective views of the virtual area to the communicants on respective display monitors. The switching rules dictate how connection processes executing on each of the network nodes 162, 12, 14 establish communications with the other network nodes based on the locations of the communicants' avatars in the virtual area.

Figure 5B:
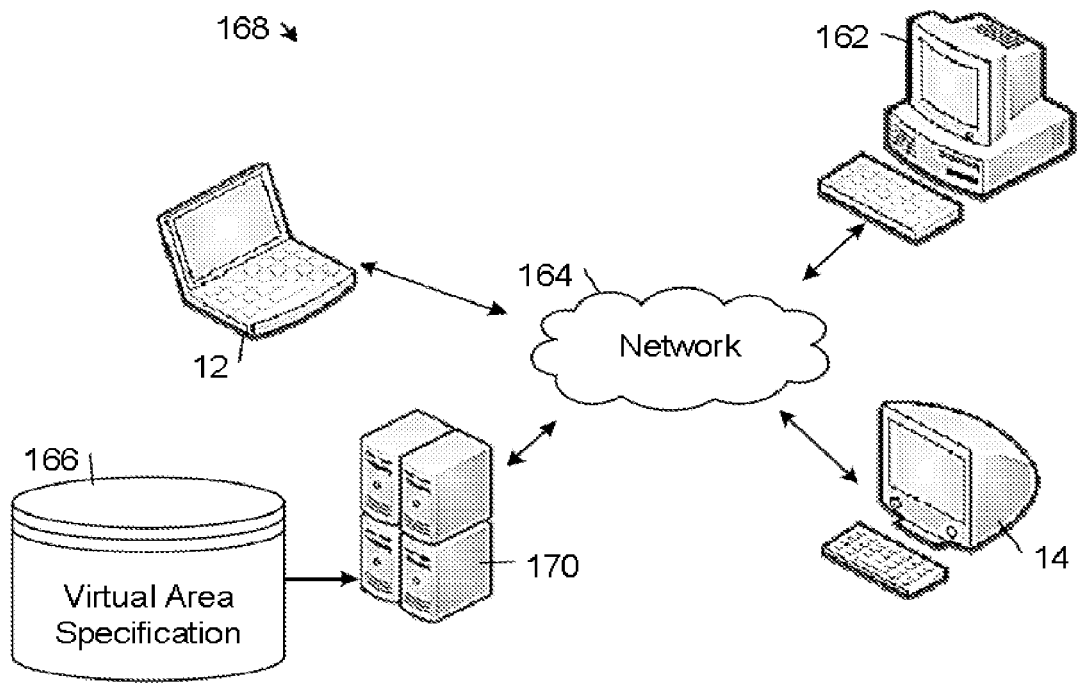
FIG. 5B is a diagrammatic view of an embodiment of a shared virtual area communication environment in which network nodes communicate in a server-mediated architecture.

FIG. 5B is a diagrammatic view of an embodiment of a shared virtual area communication environment 168 in which the network nodes 162, 12, 14 (referred to as "area client network nodes" in this architecture) communicate in an architecture that is mediated by an area server 170. In this embodiment, the area server 170 assumes the area server functions that were performed by the network node 162 in the peer-to-peer architecture embodiment shown in FIG. 5A. In this regard, the area server 170 maintains global state information and serves as a data server for the area client network nodes 162, 12, 14. As explained in detail in U.S. application Ser. Nos. 11/923,629 and 11/923,634, this architecture allows the real-time data stream switching between the area client nodes 162, 12, 14 to be handled in a variety of topologies, including a peer-to-peer topology, a fully server-mediated topology in which the area server 170 operates as a communications broker between the network nodes 162, 12, 14, and a hybrid topology that combines aspects of the peer-to-peer topology and the fully server-mediated topology.

Figure 6:
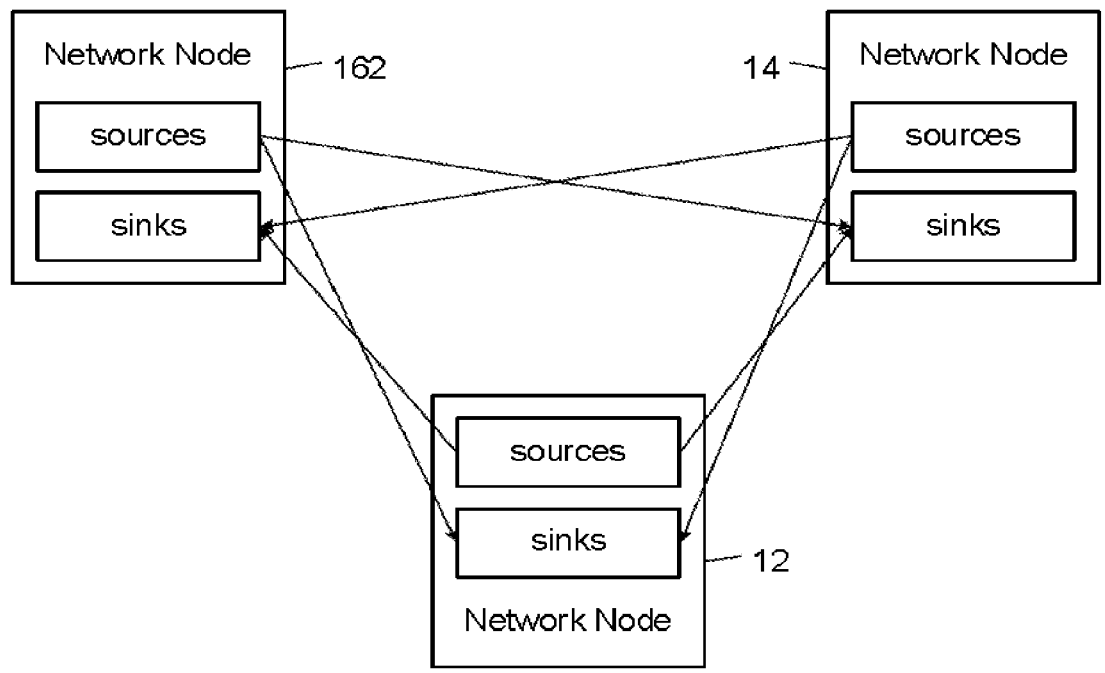
FIG. 6 is a block diagram of an embodiment of a shared virtual area communication environment that includes an exemplary set of real-time data stream connections between the sources and sinks of three network nodes.

FIG. 6 shows exemplary sets of real-time data stream connections between the sources and sinks of the three network nodes 162, 12, 14 in an embodiment of a shared virtual area communication environment. For ease of illustration, each of the arrows in FIG. 6 represents a respective set of one or more real-time data streams. In accordance with embodiments described herein, the connections shown in FIG. 6 are established based on the switching rules defined in the specification of the shared virtual area, the locations of the communicants' avatars in the shared virtual area, and the particular sources and sinks that are available on each of the network nodes 162, 12, 14.

Figure 7:
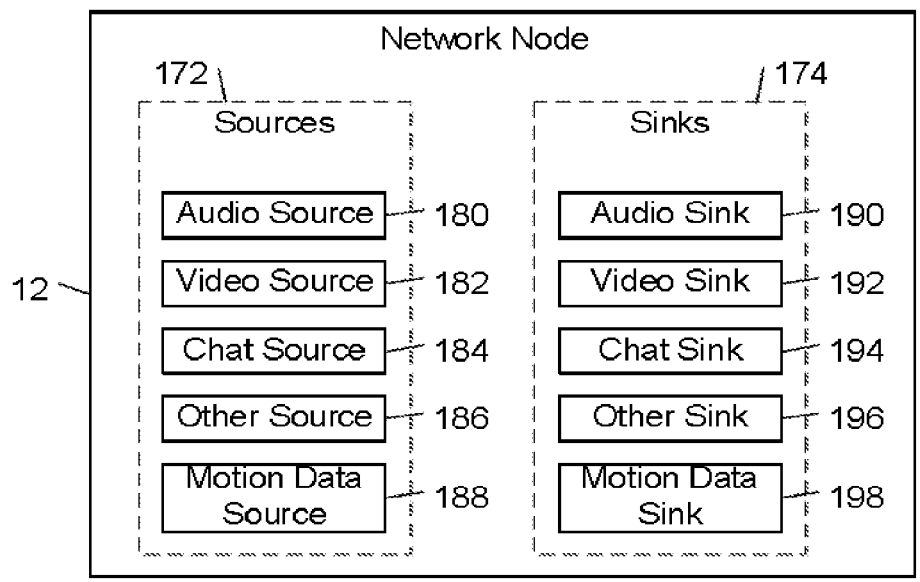
FIG. 7 shows a block diagram of an embodiment of a network node that includes an exemplary set of sources and an exemplary set of sinks.

FIG. 7 shows an exemplary embodiment of the network node 12 that includes an exemplary set 172 of sources and an exemplary set 174 of sinks. Each source is a device or component of the network node 12 that originates data and each sink is a device or component of the network node 12 that receives data. The set 172 of sources includes an audio source 180 (e.g., an audio capture device, such as a microphone), a video source 182 (e.g., a video capture device, such as a video camera), a chat source 184 (e.g., a text capture device, such as a keyboard), a motion data source 186 (e.g., a pointing device, such as a computer mouse), and an "other" source 188 (e.g., file sharing source or a source of a customized real-time data stream). The set 174 of sinks includes an audio sink 190 (e.g., an audio rendering device, such as a speaker or headphones), a video sink 192 (e.g., a video rendering device, such as a display monitor), a chat sink 194 (e.g., a text rendering device, such as a display monitor), a motion data sink 196 (e.g., a movement rendering device, such as a display monitor), and an "other" sink 198 (e.g., a printer for printing shared files, a device for rendering real-time data streams different from those already described, or software that processes real-time streams for analysis or customized display).

As exemplified by the network node embodiment shown in FIG. 7, each of the network nodes potentially has available a wide variety of sources and sinks. By enabling an area designer to control how the connections are established between the sources and sinks, the embodiments that are described herein provide the area designer with much control over the sensory experiences of the communicants as they communicate and otherwise interact in the virtual area. In this way, the area designer is able to optimize the virtual area for a particular communication purpose or for a particular communication environment (e.g., art gallery, concert hall, auditorium, conference room, and club house).

III. Exemplary System Architecture Embodiments

A. Server-Mediated System Overview

Communicants typically access a shared virtual area communication environment from respective network nodes. Each of these network nodes typically is implemented by a general-purpose computer system or a dedicated communications computer system (or "console"). Each network node executes communications processes that present a respective view of the virtual area at each network node and establish real-time data stream connections with other network nodes.

Figure 8:
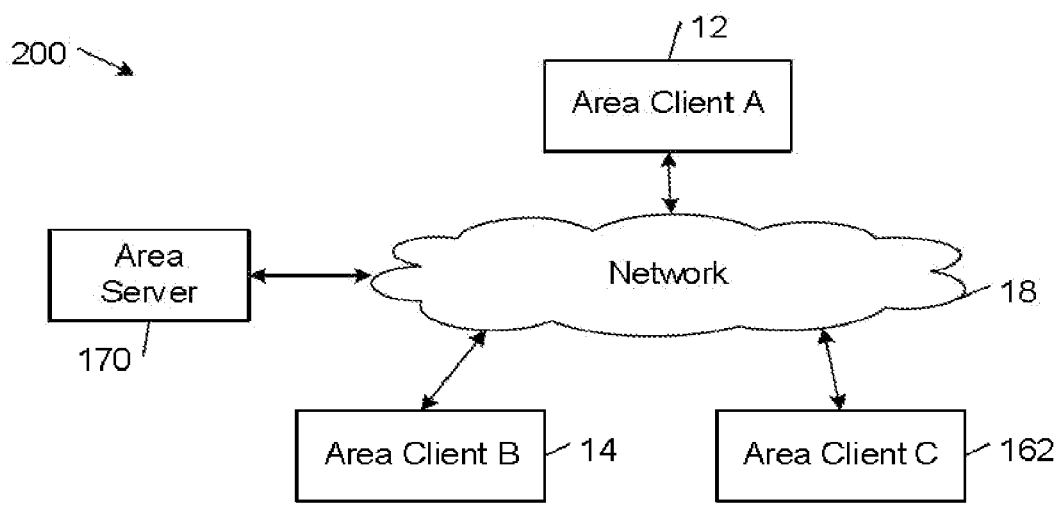
FIG. 8 is a block diagram of an embodiment of an area client network node connected to an area server network node and two other area client network nodes in an embodiment of a shared virtual area communication environment.

FIG. 8 shows an embodiment 200 of the server-mediated, shared virtual area communication environment 168 of FIG. 5B in which the network nodes 162, 12, 14 (referred to as "area client network nodes" or simply "area clients" in this architecture) and the area server 170 are interconnected by the communications network 18. In this embodiment, each of the area client network nodes 162, 12, 14 is implemented by a respective computer system of the type described below in connection with area client network node 12; the area server 170 also is implemented by a general purpose computer system of the same type described below.

B. Exemplary System Architecture

Figure 9:
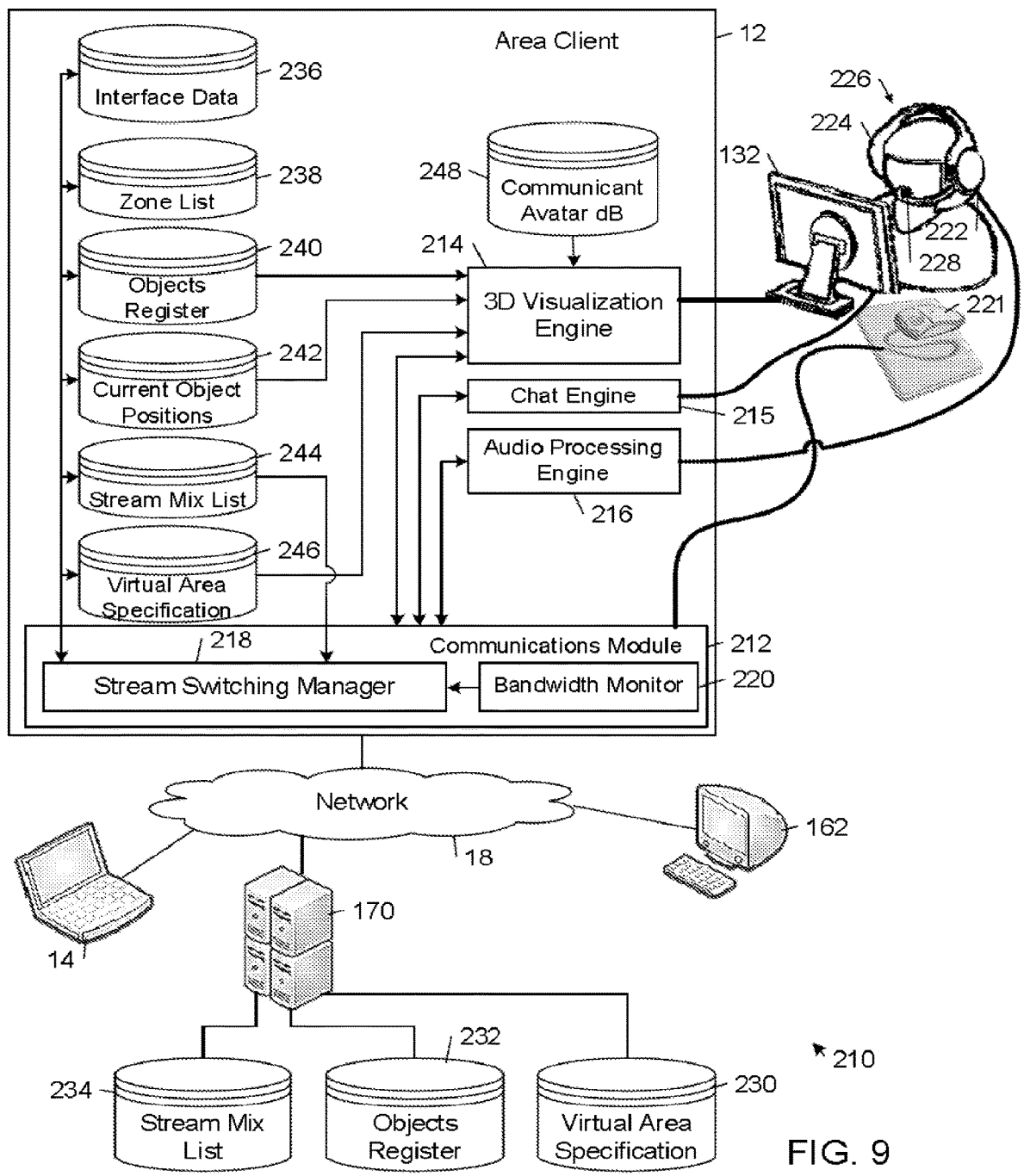
FIG. 9 is a diagrammatic view of an embodiment of the shared virtual area communication environment shown in FIG. 8.

FIG. 9 shows an embodiment 210 of the server-mediated, shared virtual area communication environment 200 shown in FIG. 8, where the area client network nodes 12, 14, 162 communicate in an architecture that is mediated by the area server 170.

The area server 170 maintains global state information and serves as a data server for the area client network nodes 12, 14, 162. Among the global state information that is maintained by the area server are a current specification 230 of the virtual area, a current register 232 of the objects that are in the virtual area, and a list 234 of any stream mixes that currently are being generated by the area server 170.

The objects register 232 typically includes for each object in the virtual area a respective object identifier (e.g., a label that uniquely identifies the object), connection data (e.g., an IP address) enabling a network connection to be established with a network node that is associated with the object, and interface data identifying the real-time data sources and sinks that are associated with the object (e.g., the sources and sinks of the network node that is associated with the object). The objects register 232 also typically includes for each object one or more optional role identifiers, which may be assigned explicitly to the objects by either the communicants or the area server 170, or may be inferred from other attributes of the objects. In some embodiments, the objects register 232 also includes the current position of each of the objects in the virtual area as determined by the area server 170 from an analysis of the real-time motion data streams received from the area client network nodes 12, 14, 162. In this regard, the area server 170 receives real-time motion data streams from the area client nodes 12, 14, 162, tracks the communicants' avatars and other objects that enter, leave, and move around in the virtual area based on the motion data. The area server 170 updates the objects register 232 in accordance with the current locations of the tracked objects.

In the embodiment shown in FIG. 9, the area client network node 12 includes an embodiment of the communications application 142 (see FIG. 1) that includes a communications module 212, a three-dimensional visualization engine 214, a chat engine 215, and an audio processing engine 216. Each of the other network nodes 14, 162 typically includes an embodiment of a communication application 142 that is that the same or similar to the one described in connection with area client network node 12.

The communications module 212 controls the switching of real-time data streams between the area client network node 12 and the other area client network nodes 14, 162 and the area server 170. The communications module 212 includes a stream switching manager 218 and a bandwidth monitor 220. The stream switching manager 218 handles the entry and exit of avatars and other objects associated with the area client network node 12 to and from a virtual area. The stream switching manager 218 also automatically determines how to switch (e.g., route, connect and disconnect) real-time data streams between the area client network node 12 and the other area client network nodes 14, 162 and the area server 170. The steam switching manager 228 makes these determinations based on the switching rules contained in the virtual area specification, the current locations of the avatars and other objects in the virtual area, and the real-time data stream types that are associated with the avatars and other objects in the virtual area. In some embodiments, the stream switching manager 218 also factors into these determinations upload and download bandwidth constraints of any of the area client network node 12, other network nodes 14, 162, or the area server 170. In addition, the stream switching manager 218 re-evaluates the current set of connections either in response to events (e.g., upload or download bandwidth faults, and requests to enter or exit a virtual area), periodically, or both in response to events and periodically. As a result of the re-evaluation of the current connections, the stream switching manager 218 may, for example, take any of the following actions: request stream mixes from the area server 170, drop stream mixes from the area server, break one or more direct links with one or more of the other area client network nodes 14, 162, or form one or more direct links with one or more of the other area client network nodes 14, 162.

In the course of managing the switching of real-time data stream connections the stream switching manager 218 maintains a set of configuration data, including interface data 236, a zone list 238, and the positions 242 of the objects that currently are in the virtual area. The interface data 236 includes for each object associated with the area client network node 12 a respective list of all the sources and sinks of real-time data stream types that are associated with the object. The zone list 238 is a register of all the zones in the virtual area that currently are occupied by the avatar associated with the area client network node 12. When the communicant first enters a virtual area, the stream switching manager 218 typically initializes the current object positions database 242 with position initialization information that is downloaded from the area server 170. Thereafter, the stream switching manager 218 updates the current object positions database 242 with the current positions of the objects in the virtual area as determined from an analysis of the real-time motion data streams received from, for example, one or more of the computer mouse 221, the area client network nodes 14, 162, and the area server 170. In some embodiments, the object positions 242 are incorporated into the objects register 240. The configuration data that are maintained by the stream switching manager 218 also includes copies 240, 242, 246 of the objects register 232, the stream mix list 234, and the virtual area specification 30, respectively; these copies 240, 244, and 246 typically are downloaded from the area server 170 and represent a local cache of these data.

The three-dimensional visualization engine 214 presents on the display monitor 132 a view of the virtual area and any objects that are in the virtual area. In this process, the three-dimensional visualization engine 214 reads the virtual area specification data 246, the objects register 240, and the current object positions database 242. In some embodiments, the three-dimensional visualization engine 214 also reads a communicant avatar database 248 that contains images needed for rendering the communicant's avatar in the virtual area. Based on this information, the three-dimensional visualization engine 214 generates a perspective representation (i.e., an image) of the virtual area and the objects in the virtual area from the point of view (position and orientation) of the communicant's avatar in the virtual area. The three-dimensional visualization engine 214 then renders the perspective representation of the virtual area on the display monitor 132. In some embodiments, three-dimensional visualization engine 214 determines the visibility of the communicant's avatar in order to limit the amount of data that has to be exchanged, processed and rendered to the portion of the virtual area that is visible on the display monitor 132.

In some embodiments, the three-dimensional visualization engine 214 additionally is operable generate a plan-view representation of the virtual area. In these embodiments, the communicant may direct the three-dimensional visualization engine 214 to render one or both of the perspective representation of the virtual area and the plan-view representation of the virtual area on the display monitor 132.

The communicant can control the presented view of the virtual area or the position of the avatar in the virtual area by transmitting commands to the communications module 212 from an input device (e.g., the computer mouse 221). The three-dimensional visualization engine 214 updates the view of the virtual area and the positions of the objects in the virtual area in accordance with updated positions in the current object positions database 242 and re-renders an updated version of the graphic representation of the virtual area on the display monitor 132. The three-dimensional visualization engine 214 may update the rendered image periodically or only in response to movement of one or more of the objects in the virtual area.

The chat engine 215 provides an interface for outgoing chat (text) messages that are received from a local text input device (e.g., a keyboard) of the area client network node 12 and incoming chat streams that are received from the other area client network nodes 14, 162. The chat engine 215 converts the chat (text) messages that are input by the communicant through the text input device into real-time chat streams that can be transmitted to the other network nodes 14, 162. The chat engine 215 also converts the incoming chat streams into text signals that can be rendered on the display monitor 132.

The audio processing engine 216 generates audio signals, which are rendered by the speakers 222, 224 in the communicant's headset 226, and converts the audio signals that are generated by the microphone 228 in the headset 226 into real-time audio streams that can be sent to the other area client network nodes 14, 162.

C. Automated Switching of Real-Time Data Streams

As explained above, a shared virtual area is defined by a specification that includes a description of geometric elements of the virtual area and one or more switching rules governing real-time stream connections between the network nodes. The switching rules typically include a description of conditions for connecting sources and sinks of real-time data streams in terms of positions in the virtual area. Each rule typically includes attributes that define the real-time data stream type to which the rule applies and the location or locations in the virtual area where the rule applies. In some embodiments, each of the rules optionally may include one or more attributes that specify a required role of the source, a required role of the sink, a required priority level of the stream, and a required or preferred stream topology.

The switching rules are implicated upon object entry into a virtual area, movement of an object within the virtual area, and object exit from the virtual area.

Additional details regarding the automated switching of real-time data streams are described in U.S. application Ser. Nos. 11/923,629 and 11/923,634, both of which were filed on Oct. 24, 2007.

IV. Sococo Platform Architecture

Figure 10:
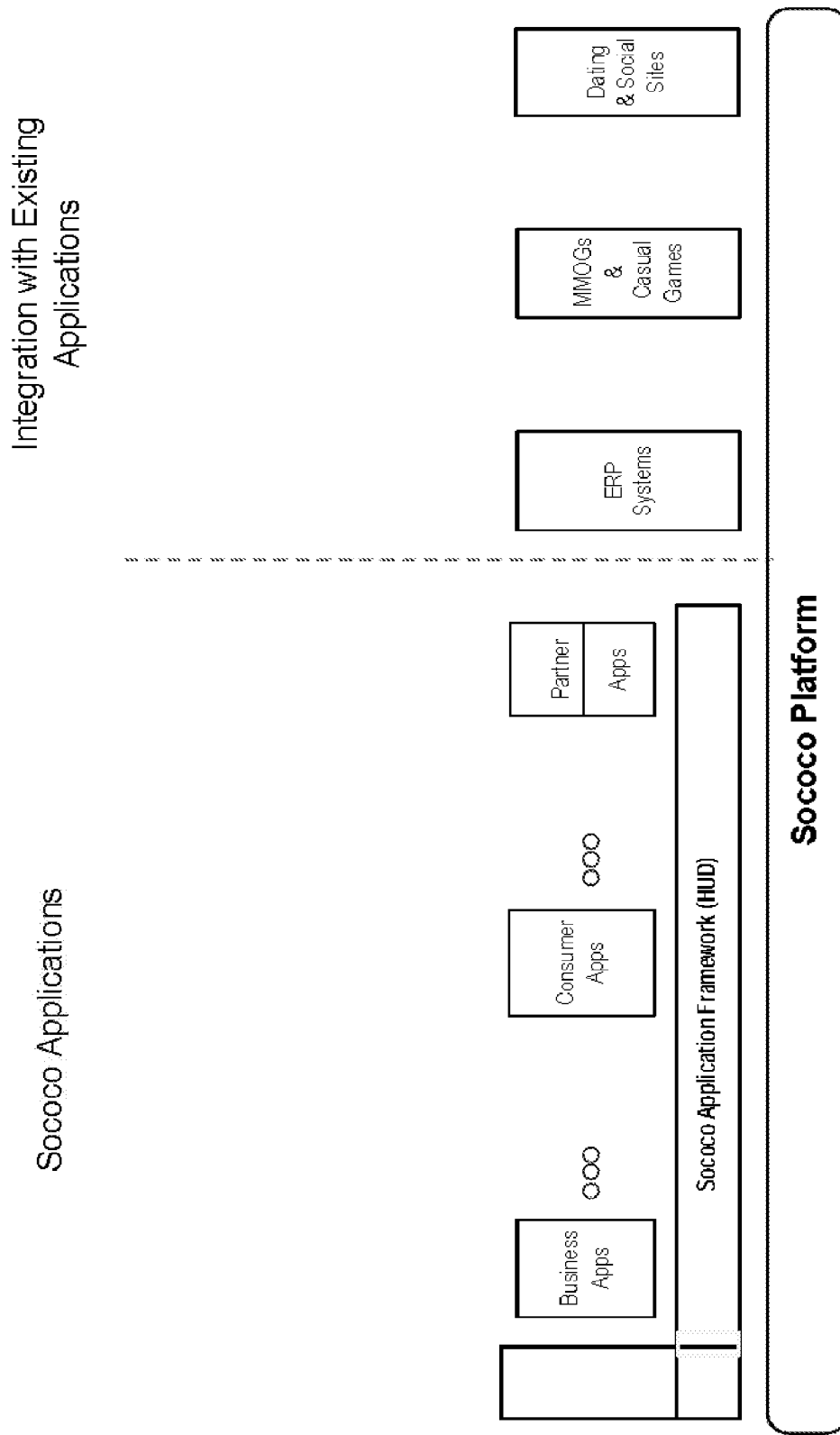
FIG. 10 shows an embodiment of a system architecture supporting realtime communicant interactions in a virtual environment.

FIG. 10 shows an embodiment of a system architecture that supports realtime communicant interactions in a virtual environment. The system architecture includes a Sococo platform (also referred to as the "Virtual Environment Creator"), a Heads-up Display (HUD), and a number of applications. In some embodiments, the Sococo platform corresponds to the communication application 142 (see FIG. 3).

The HUD interfaces a variety of different business and consumer applications to the Sococo platform. Among the wide variety of different applications that are enabled by the system architecture are ad hoc communications applications, online sales applications, seminar applications, training applications, realtime group collaboration applications, content sharing applications (e.g., photo and video sharing applications), and group study applications.

The Sococo platform additionally integrates with other systems (e.g., ERP systems, gaming systems, and social networking systems) to support a wide variety of other applications, including but not limited to enterprise data collaboration applications, guild room applications, singles space applications, picture gallery applications, and chat room applications.

V. Interfacing with a Virtual Communication Environment

A. Introduction

In addition to the local Human Interface Device (HID) and audio playback devices, the So3D graphical display, avatar, and physics engine, and the system database and storage facility, the communications application 26 also includes a graphical navigation and interaction interface (referred to herein as a "heads-up display" or "HUD") that interfaces the user with the virtual communication environment. The HUD includes navigation controls that enable the user to navigate the virtual environment and interaction controls that enable the user to control his or her interactions with other communicants in the virtual communication environment. The navigation and interaction controls typically are responsive to user selections that are made using any type of input device, including a computer mouse, a touch pad, a touch screen display, a keyboard, and a video game controller. The HUD is an application that operates on each client network node. The HUD is a small, lightweight interface that a user can keep up and running all the time on his or her desktop. The HUD allows the user to launch virtual area applications and provides the user with immediate access to realtime contacts and realtime collaborative places (or areas). The HUD is integrated with realtime communications applications and/or realtime communications components of the underlying operating system such that the HUD can initiate and receive realtime communications with other network nodes. A virtual area is integrated with the user's desktop through the HUD such that the user can upload files into the virtual environment created by the virtual environment creator 16, use files stored in association with the virtual area using the native client software applications independently of the virtual environment while still present in a virtual area, and more generally treat presence and position within a virtual area as an aspect of their operating environment analogous to other operating system functions rather than just one of several applications.

B. Viewing Contacts and Places

Figure 11:
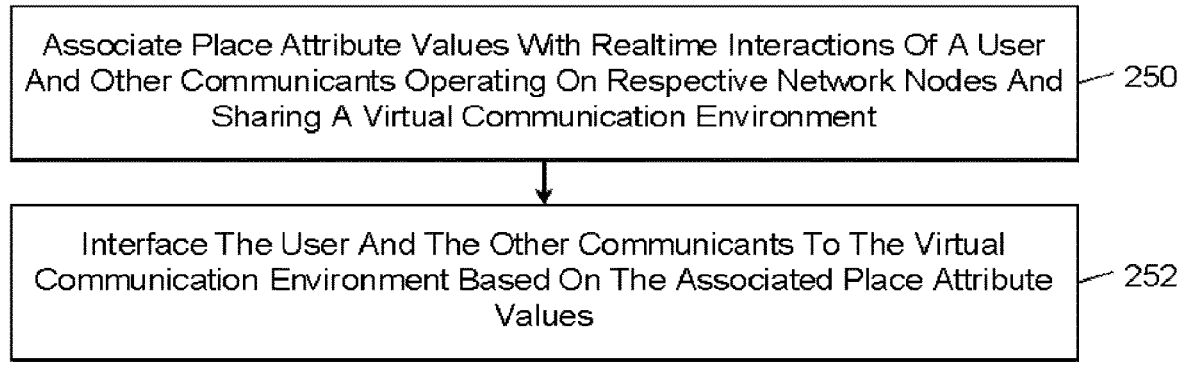
FIG. 11 is a flow diagram of an embodiment of a method by which a network infrastructure service environment interfaces a user with a spatial communication environment.

FIG. 11 shows an embodiment of a method by which the network infrastructure service environment 30 interfaces the user with the virtual communication environment.

In accordance with the method of FIG. 11, the interaction service associates place attribute values with realtime interactions of a user and other communicants operating on respective network nodes and sharing the virtual communication environment, which includes one or more virtual areas and supports realtime communications between the user and the other communicants (FIG. 11, block 250). As explained above, in the illustrated embodiments, the interaction service maintains the relationship database 36, which contains the records 38 of interactions between communicants. For each interaction involving a respective one of the communicants in a respective one of the one or more virtual areas, the interaction service generates a respective interaction record that includes a respective place attribute value that identifies the virtual area in which the interaction occurred and one or more communicant identifier attribute values that identify respective ones of the communicants that participated in the interaction. The interaction service also typically incorporates one or more of the following additional information into an interaction record of a particular interaction: start and end times of the respective interaction; an identification of any data streams shared during the respective interaction; and any hierarchical information relating the place where the respective interaction occurred to a larger domain.

The network infrastructure service environment 28 interfaces the user and the other communicants to the virtual communication environment based on the associated place attribute values (FIG. 11, block 252). As explained above, in the illustrated embodiments, the interaction service supports queries on the relationship database 36 subject to the capabilities of the requesting entities. In response to requests from the client network nodes, the interaction service queries the interaction records and transmits results of the querying to the requesting ones of the network nodes.

In response to some requests to view realtime contacts, the interaction service queries the interaction records for one or more of the other communicants with whom the user has interacted in the virtual communication environment, and then transmits to the requesting network node a list of identified ones of the other communicants with whom the user has interacted. The interaction service typically ranks the identified other communicants based on an evaluation of the interaction records describing the interactions between the user and the respective ones of the identified other communicants, and orders the identified ones of the other communicants in the list by rank. In this process, the interaction service typically determines a respective relevance score for each of the other communicants based on at least one statistic that is derived from the interaction records. The interaction service then orders the identified ones of the other communicants in the list in an order reflecting the respective relevance scores. In some cases, the relevance scores measure frequency of interaction between the user and ones of the other communicants. In other cases, the relevance scores measure recentness of interaction between the user and ones of the other communicants.

In response to some requests to view places, the interaction service queries the interaction records for one or more of the virtual areas in which the user has interacted, and transmits to the requesting network node a list of identified ones of the virtual areas in which the user has interacted. The interaction service typically ranks the identified virtual areas based on an evaluation of the interaction records describing the interactions between the user and the respective ones of the identified virtual areas, and orders the identified ones of the virtual areas in the list by rank. In this process, the interaction service typically determines a respective relevance score for each of the virtual areas based on at least one statistic derived from the interaction records. The interaction service then orders the identified ones of the virtual areas in the list in an order reflecting the respective relevance scores. In some cases, the relevance scores measure frequency of interaction between the user and ones of the other virtual areas. In other cases, the relevance scores measure recentness of interaction between the user and ones of the other virtual areas.

Figure 12:
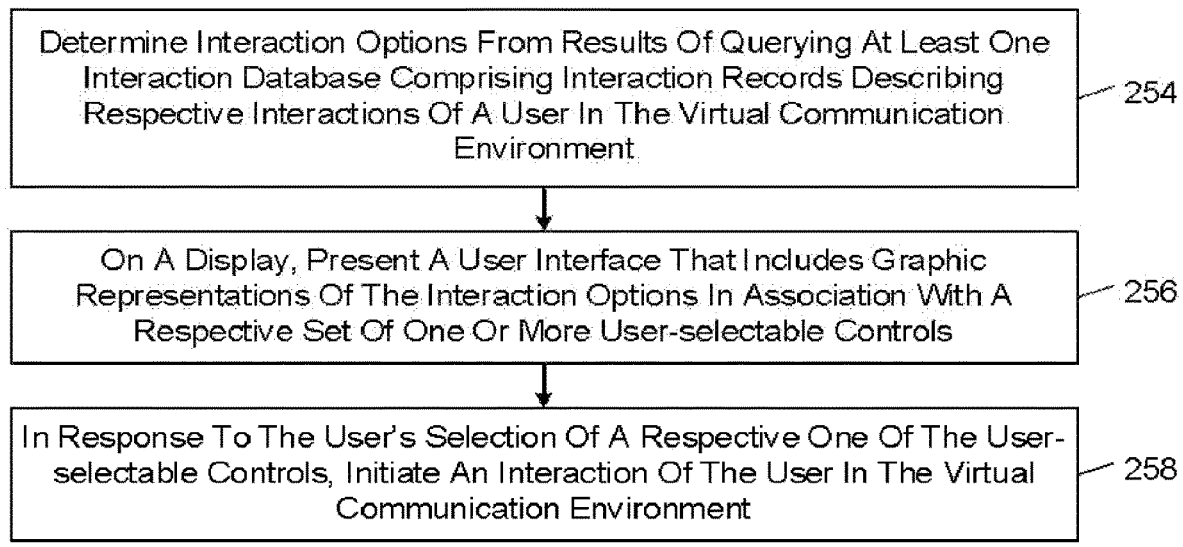
FIG. 12 is a flow diagram of an embodiment of a method by which a communication application interfaces a user with a spatial communication environment.

FIG. 12 shows an embodiment of a method by which the communications application 26 interfaces the user with the virtual communication environment.

In accordance with the method of FIG. 12, the communications application 26 determines interaction options from results of querying at least one interaction database that includes interaction records describing respective interactions of a user in the virtual communication environment (FIG. 12, block 254). On a display, the communications application 26 presents a user interface that includes graphic representations of the interaction options in association with a respective set of one or more user-selectable controls (FIG. 12, block 256). In response to the user's selection of a respective one of the user-selectable controls, the communications application 26 initiates an interaction of the user in the virtual communication environment (FIG. 12, block 258). This process may involve, for example, moving a graphic representation of the user into a particular one of the virtual areas in response to the user's selection of a graphic representation of the particular virtual area or in response to the user's selection one of the graphic representations of the other communicants who has presence in the particular virtual area.

Exemplary interaction options include options for interacting with contacts and options for interaction with places.

In some cases, the communications application 26 identifies one or more of the other communicants with whom the user has interacted in the virtual communication environment, and displays in the user interface a respective graphic representation of each of the identified other communicants in association with at least one respective user-selectable control for interacting with the respective other communicant. In one example, the communications application 26 identifies one or more of the other communicants with whom the user has interacted in a particular one of the virtual areas, and displays graphic representations of the identified other communicants in association with a graphic representation of the particular virtual area. The respective graphic representations of the identified other communicants may be displayed in an array adjacent the graphic representation of the particular virtual area. The graphic representations of the communicants typically are sorted based on a ranking of the identified other communicants that is derived from an evaluation of the interaction records describing the interactions between the user and the respective ones of the identified other communicants.

The communications application 26 identifies one or more of the virtual areas in which the user has interacted, and displays in the user interface a respective graphic representation of each of the ascertained virtual areas in association with at least one user-selectable control for interacting with the respective virtual area. The respective graphic representations of the identified virtual areas may be displayed in an array. The graphic representations of the virtual areas typically are sorted based on a ranking of the ascertained virtual areas that is derived from an evaluation of the interaction records describing the interactions between the user and the respective ones of the ascertained virtual areas. In some embodiments, for each of one or more of the ascertained virtual areas, a respective two-dimensional graphic representation the virtual area is displayed, and a respective graphic representation of each of the communicants that has presence in the virtual area is depicted in the respective two-dimensional graphic representation. In some of these embodiments, each of the respective graphic representations of the communicants provides context information from which the user can infer a respective activity currently performed by the respective other communicant in the respective virtual area. The context information may include, for example, one or more of: information describing respective positions of the one or more other communicants in terms of virtual area identifiers; information describing respective locations of the one or more other communicants within the virtual area; and information describing respective orientations of the one or more other communicants. The communications application typically presents at least one user-selectable control in association with each of the graphic representations of the ascertained virtual areas, where the control enables the user to establish a presence in the respective virtual area.

In some cases, the communications application 26 displays a graphic representation of a particular one of the virtual areas in which the user has presence on the display. The graphic representation of the particular virtual area may be a three-dimensional graphic representation or a two-dimensional graphic representation. In the embodiments illustrated the drawings discussed below, the HUD includes a two-dimensional graphic representation of the particular virtual area, which is displayed in a lower right corner of the desktop interface window that is rendered on the user's display. The HUD also includes an immersion control interface that enables the user to select a level of interaction with the particular virtual area from a set of different interaction levels (e.g., a three-dimensional graphic interface mode of interaction with the virtual area, a two-dimensional graphic interface mode of interaction with the virtual area, and a non-graphic interface mode of interaction with the virtual area).

Figure 13:
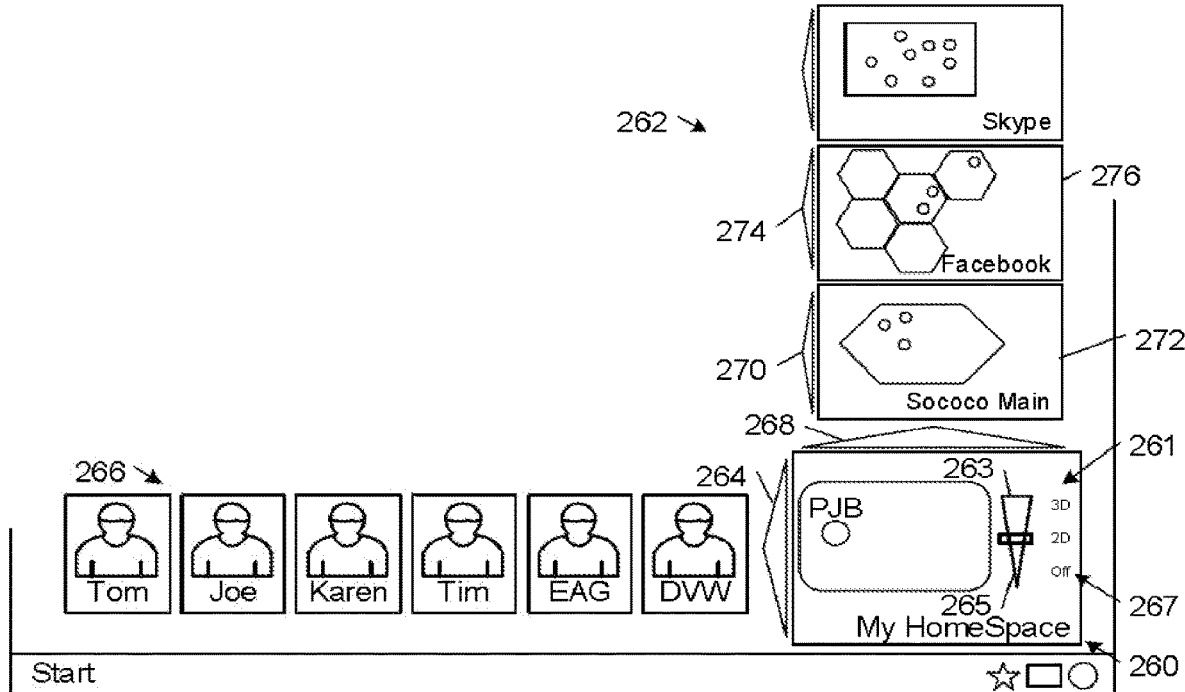
FIG. 13 shows an embodiment of a heads-up display (HUD) graphical user interface for viewing contacts and places.

FIG. 13 shows an embodiment 260 of the HUD that provides users with immediate access to their realtime contacts and the virtual places where realtime collaboration occurs. The HUD 260 allows navigation through areas based on the locations of people as well as views into places. These places can be accessed in a variety of different ways including: most frequently used, most recently used, or an application specific way.

The HUD 260 includes an immersion control interface 261 that enables each user to control his or her visualization. The immersion control interface 261 includes a graphical immersion level indicator 263, a user-manipulable immersion level controller (or slider) 265, and a textual immersion level indicator 267 that labels the different immersion levels corresponding to the different positions of the slider 265 along the graphical immersion level indicator 263. The user can move the slider 265 along the graphical immersion level indicator 263 with an input device (e.g., a computer mouse) to select a level of interaction with the particular virtual area from a set of different interaction levels. For example, in the illustrated embodiments, a user can choose voice-only (corresponding to the "off" of bottom position of the immersion level indicator 263), a two-dimensional (2D) overhead view (correspond to the "2D" or middle position of the immersion level indicator 263), or a three-dimensional view of an area (e.g., a realistic 3D simulation of a physical area) (corresponding to the "3D" or top position of the immersion level indicator 263). In particular, the immersion control interface 261 enables the user to change the level of interaction by selectively changing between ones of a three-dimensional graphic interface mode of interaction with the virtual area ("3D" mode), a two-dimensional graphic interface mode of interaction with the virtual area ("Desktop" mode), and a non-graphic interface mode of interaction with the virtual area ("Off" mode). In the three-dimensional graphic interface mode of interaction, the respective graphic representations of the communicants are depicted as three-dimensional avatars; in the two-dimensional graphic interface mode of interaction, the respective graphic representations of the communicants are depicted as two-dimensional presence icons or sprites; and in the non-graphic interface mode, the respective graphic representations of the communicants are omitted (i.e., not shown).

In the two-dimensional visualization mode, each of the communicants who has presence in a virtual area is represented by a respective two-dimensional presence icon. In some embodiments, the appearance of the presence icons changes in response to receipt of input realtime data streams from the respective communicants. For example, in some embodiments, the appearance of the presence icons alternates between two different modes (e.g., a visual feature, such as the brightness level, alternates between a high level and a low level, or the appearance of a presence icon changes from a filled-in view to an outline view) at a fixed rate. In some embodiments, the triggering input realtime data streams correspond to realtime data streams generated by respective input devices (e.g., computers keyboards or microphones) at the respective network nodes at which the communicants are operating. In this way, the HUD 260 provides a visual indication when a particular communicant is interacting (e.g., chatting or talking) in the virtual area.

The HUD 260 shows an ordered set of place tiles 262. Clicking on one of the place tiles 262 brings the user to the virtual area represented by the selected place tile. For people, the Sococo platform has a basic metaphor of Go (to the communicant's area) and Get (bring them to the user's area). This is refined in the HUD 260 by allowing communicants to queue requests to go or get, as well as communicate with people via text or voice without "moving." The system notifies the user when each communication request is received from another communicant. The user can accept the request, ignore it, or add it to a communications queue. In this way, users can respond to non-priority communications at a later time. For example, a user can queue communications received during a time when the user is busy (e.g., engaged in a current communications session) and, after the user is free, the user can respond to communication requests in the communications queue.

As explained above, the Sococo platform maintains a relationship database that records who the user meets with and where. For every interaction of the user with a realtime contact, the system generates one or more respective interaction records in the relationship database. Each interaction record contains a description of the context of the interaction. For example, in some embodiments, an interaction record contains an identifier for the user, an identifier for the contact, an identifier for the place of interaction (e.g., a room of HomeSpace), a description of the hierarchy of the interaction place (e.g., a description of how the interaction room relates to the larger area), start and end times of the interaction, and a list of all files and other streams shared during the interaction. Thus, for each realtime interaction the system tracks when it occurred, where it occurred, and what happens during the interaction in terms of communicants involved (e.g., entering and exiting), objects that are activated/deactivated, and the files that were shared. The system then is able to present the results of queries on this information in a sorted order (e.g., most frequent or most recent) based on place.

In some embodiments, the system may be configured to show the user a sorted list of Skype contacts that are associated with a particular place (e.g., the Skype place); the list can be presented in a variety of different ways (e.g., by frequency of interaction on Skype or Sococo or both, by total number of minutes interacted on Skype or Sococo or both, or most recent interactions on Skype or Sococo or both). For example, the information stored in the interaction records can be used to drive a frequency sort of who the user met in which areas, as well as sorts of who the user has met with regardless of area and areas the user frequents most often. This data typically is used in the HUD 260, but it also may be used by application developers as part of a heuristic system (e.g. a rule that permits people who have visited the user's HomeSpace more than five times to enter without knocking by default, or people who were present in an area at a particular time to modify and delete files created by another communicant there at the same time).

Each of the places (represented by tiles 262 in the HUD 260) is tied to queries on the relationship database 36. With respect to each place, the interaction service does a query on the relationship database 36 for all of the contacts the user has met with in that area. The interaction service typically presents the identified contacts in a list that is sorted either by frequency or by recentness of interaction (e.g., who the user interacted with last). In other embodiments, the contacts may be sorted in some other application-dependent way.

Queries on the relationship database can be combined with other searches. For example, queries on the relationship database may be combined with queries on contact history data generated for interactions with contacts using another communication system (e.g., Skype, Facebook, and Flickr). In one example, a Skype place may be associated with a query on a user's relationship data associated with the Skype place and the user's Skype history data to produce a sorted list of realtime contacts of the user that are associated with the Skype place.

Figure 14:
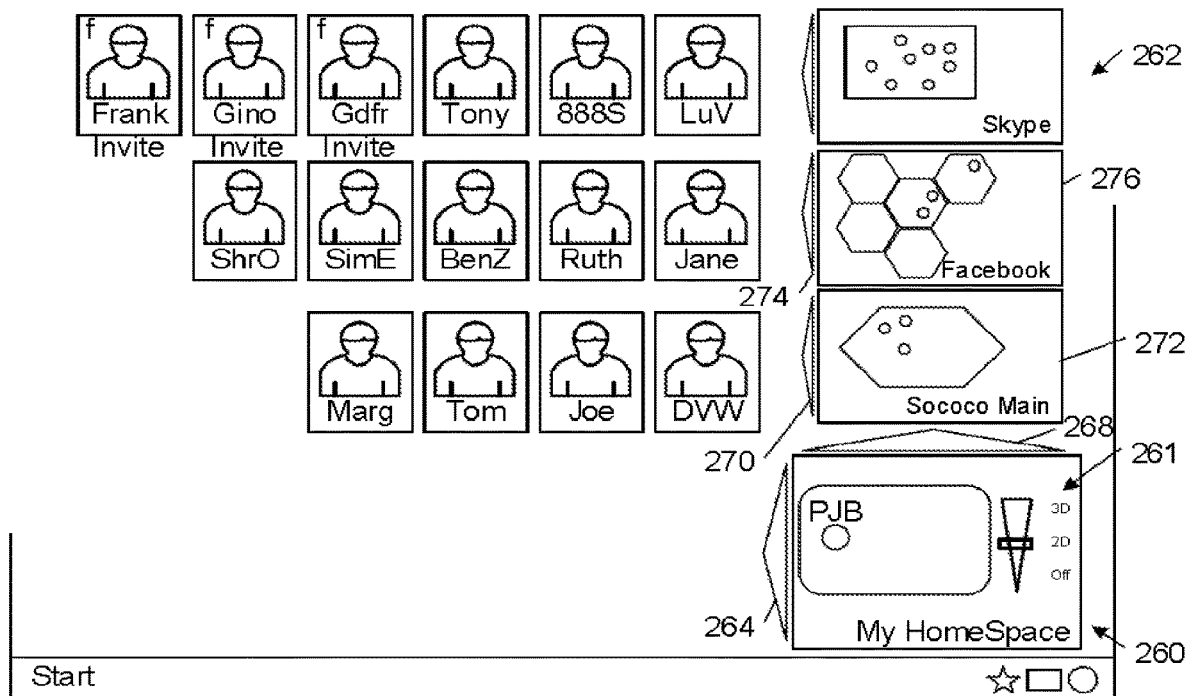
FIG. 14 shows the HUD graphical user interface of FIG. 13 displaying contacts by places.

FIGS. 13 and 14 show the basic navigation of people and places in the HUD 260. Clicking on the left-facing arrow 264 displays a list 266 of realtime contacts sorted by frequency of interaction, in the associated place (i.e., My HomeSpace). For example, the default state of the HUD 260 is a minimized interface occupying the lower right-hand real-estate of a user's desktop. For a new user, the HUD 260 will display the user's HomeSpace. HomeSpace is a Sococo application for a user's personal collaboration (i.e. it is their personalized collaboration space). HomeSpace is described in greater detail in the following sections. Clicking on the left-facing arrow 264 displays the realtime contacts the user communicates with most frequently, in his or her HomeSpace. The list of names is sorted by frequency. The first name in the list (DVW in this example) represents the communicant that the user (PJB in this example) collaborates with most frequently in HomeSpace, followed by EAG, Tim, etc. Clicking on the upward-facing arrow 268 displays a list of all the realtime places the user has visited sorted by frequency, recentness, or user defined ordering, as shown in FIG. 14. The list of places shows the realtime activity occurring in that place at any instant. For example, DVW, Kim, and Joe are all present in the Sococo Main place and are having a realtime conversation in the Sococo place represented by the Sococo main place tile 272. Similarly, Jeff, Ann, and Jane are all in the Facebook place represented by the Facebook place tile 276.

Should any user exit a particular place or enter a particular place, the presence indicators (i.e., the "sprites" shown by circles with associated names or other identifiers) in the place tile representing that particular place will automatically be updated in realtime. This feature demonstrates the ability of an application designer to put application-specific realtime data into a place tile. The place tile may appear either associated with a communicant, or with the user's places. For example, a game developer may export a map of where a communicant is in their game environment such that other people that are connected to that communicant through the relationship database records will receive a realtime data stream feed of that communicant's current activities. They can then use this place tile to navigate to that communicant, communicate with them, or get them. The HUD 260 is able to manage this interface to people and places for many different applications simultaneously.

The realtime data used in the HUD place tiles 262 is provided by an interface designed for this purpose in the area server hosting the relevant area represented by the place tile. Area servers may provide different HUD place tile data feeds to users based on that user's permission to view the virtual area. For example, if a communicant enters a virtual area that the user does not have permission to view, the HUD place tile may show limited or no detailed information. In addition, the HUD place tile data feed provided by the area server may be customized by the application provider operating that area server to present an application-specific view of the area to subscribing HUDs.

C. Viewing Contacts by Place

FIG. 14 shows how a user can sort his or her realtime contacts by place. In some embodiments, the places also are sorted by frequency of interaction, by most recent interaction, or some other interaction-based sort criteria. Clicking on the upward facing arrow 268 displays the places a user interacts with (e.g., communicates in) most frequently. For any of these places, a user may click the respective left facing arrow (e.g., the arrow 270 associated with the Sococo Main place tile 272) to display the list of realtime contacts that the user communicates with most frequently, in that place. The listing of users varies from place to place—although there may likely be overlap between lists.

For example, clicking on the left facing arrow 270 associated with the tile 272 representing the Sococo Main room, displays a list of realtime contacts (DVW, Joe, Tom, Margaret) that represent the people the user communicates with in the Sococo Main room. Clicking on the left facing arrow 274 for the Facebook place tile 276, displays a different set of realtime contacts-those that the users communicates with in the Facebook application. In generating this list of contacts, the system queries the user's Facebook relationship grid data. In particular, the system performs a synthesis (or aggregation) of a place-based Sococo query on the Sococo relationship database 36 and a query on the Facebook relationship grid data to pull out the user's Facebook contacts that are not in the Sococo relationship database 36. In FIG. 14, the "f" icons indicate that the leftmost three contacts associated with the Facebook place are Facebook contacts that are not yet Sococo contacts; and the "Invite" icons are associated with controls for sending to those Facebook contacts invitations to become members of Sococo.

The view of realtime contacts that is shown by the HUD 260 in FIG. 14 reveals how the Sococo platform allows a user to create an inferred Social Network. Traditional Social Network services (LinkedIn, Facebook, MySpace, etc) require the user to push information into the network service (send and invite to a friend and explicitly describe whether that communicant is a work colleague, friend, or casual acquaintance). The Sococo platform, on the other hand, infers the relationship between realtime contacts. For example, "I know that DVW is a work associate because I communicate with him in Sococo Main-a work place." The Sococo platform presents this inferred relationship information back to the user in meaningful ways.

D. Going to a Place

The Sococo platform provides an always-on continuous communications environment. Unlike traditional transactional forms of communications (such as the telephone or Skype, where a user has to dial a number and wait for a connection to be established), the Sococo platform allows a user with appropriate permissions to simply enter a place and begins talking or interacting to whomever is present.

Figure 15:
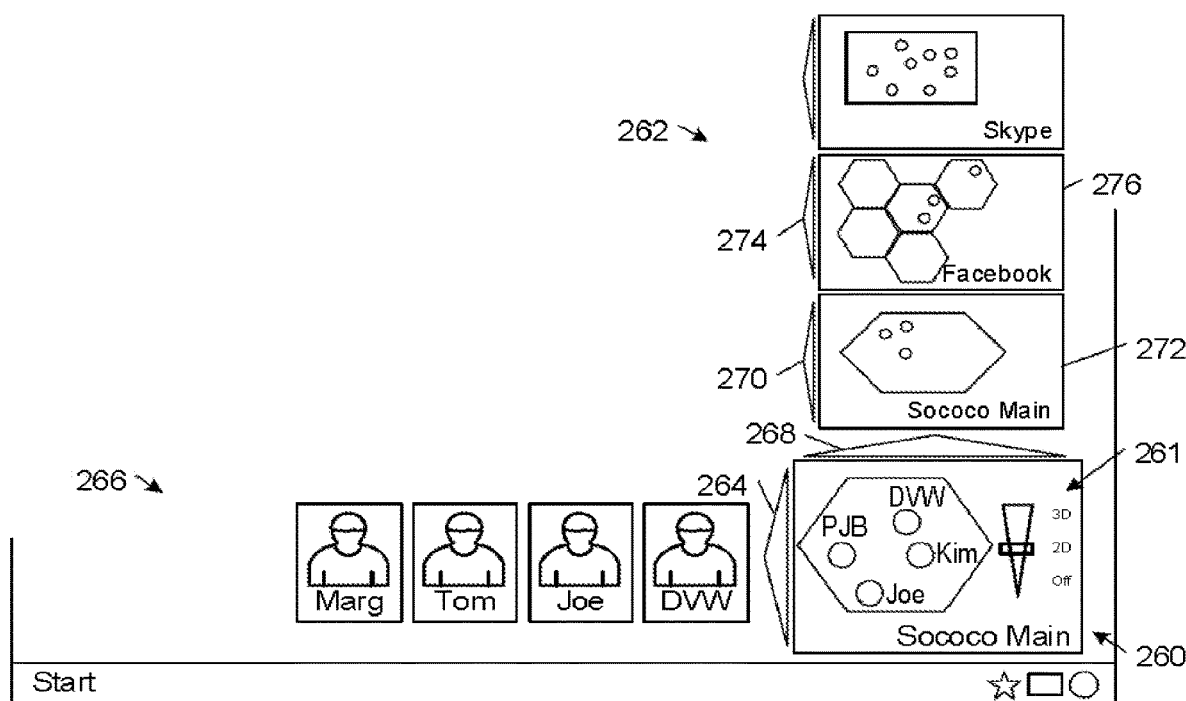
FIG. 15 shows the HUD graphical user interface of FIG. 13 displaying contacts in a place (i.e., Sococo Main) that has been entered by a user by clicking on the corresponding place tile shown in FIG. 14.

FIG. 15 shows the basic connection metaphor for Sococo. The user clicks on Sococo Main place tile 272 to enter the Sococo Main place. At that point, the HUD interface shows the user (PJB) located in the Sococo Main place with the other communicants (DVW, Kim, and Joe) who already were present in the Sococo Main place. Based on the switching rules established by the area designer, the Sococo platform multiplexes the specified realtime streams (e.g., streams from the microphones and speakers) of all the communicants currently in the Sococo Main place so that, for example, they can both see each others' sprites or avatars and communicate with (e.g., speak to and hear) each other.

E. Contact History and Connecting with People

Figure 16:
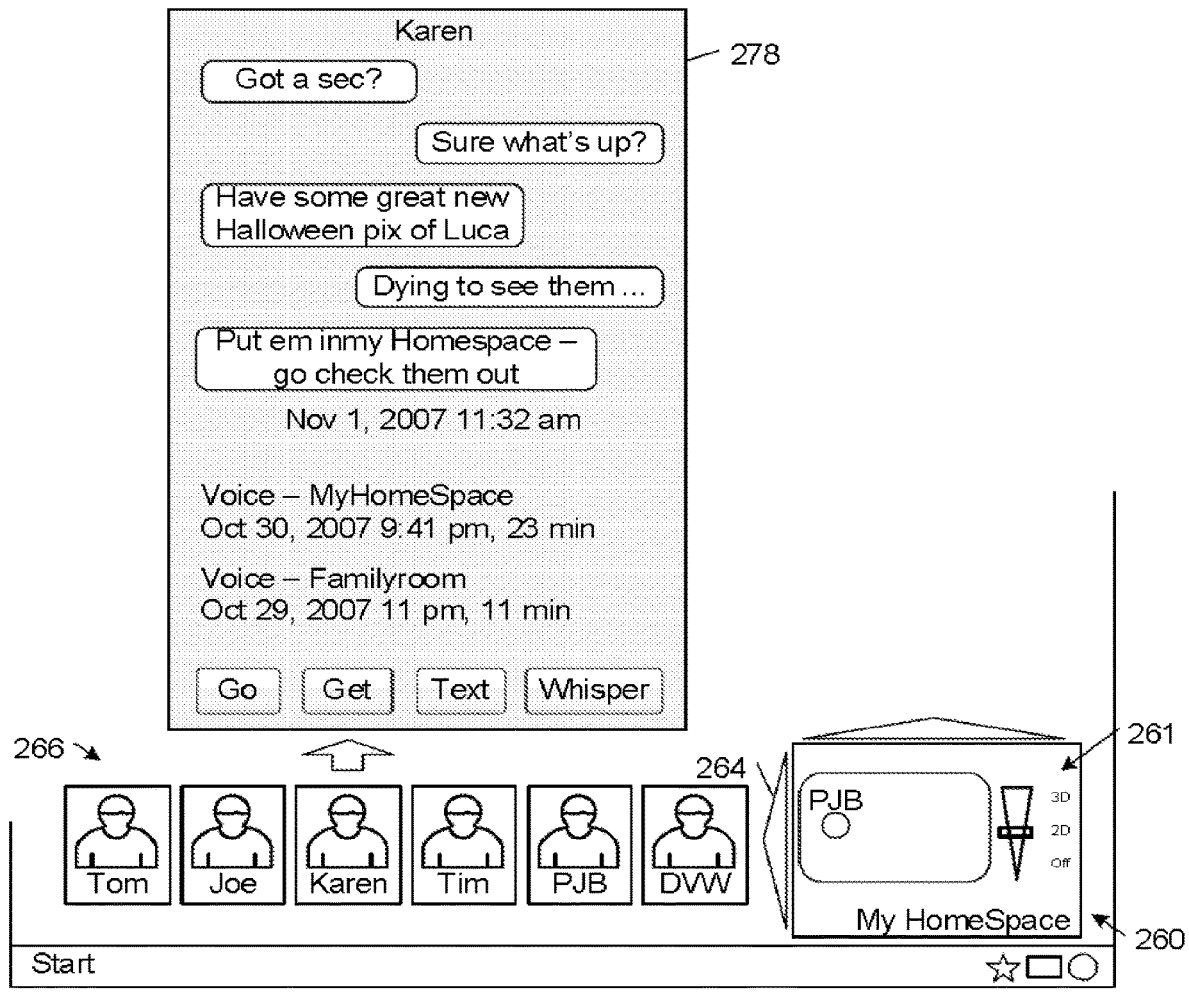
FIG. 16 shows the HUD graphical user interface of FIG. 13 displaying data associated with a first selected one of a user's realtime contacts that was extracted based on queries on the user's Skype history.

The Sococo platform and the HUD 260 allow a user to view his or her communication history with any of his or her realtime contacts. In some embodiments, the Sococo platform displays all the recent communications history with that communicant (e.g., text chat, voice conversations, files shared etc) in response to the positioning of the user's mouse pointer over a particular one of the tiles representing the user's contacts. For example, FIG. 16 shows an interface 278 that contains a recent text chat with Karen in which the messages between the user and Karen are listed vertically in chronological order, with the user's messages displayed in left-shifted message blocks and Karen's messages displayed in right-shifted message blocks. The interface 278 also displays the basic methods for connecting the with another communicant on the Sococo platform:

Go-takes the user to the place where that contact is

Get-brings that communicant into the place the user is in

Text-sends an instant message

Whisper-sends a short voice message (scrap of voice) that is mixed into a contact's headset such that only the contact can hear it. The HUD shows the user where the contact is and what the contact is doing and, thereby, provides the user with useful context information that can inform the user's selection of the content of the voice message.

The system typically includes smart defaults such that the user can Go or Get people that the user communicates with continuously, but might have to ask permission to Go to or Get a communicant that is a more casual contact.

Figure 17:
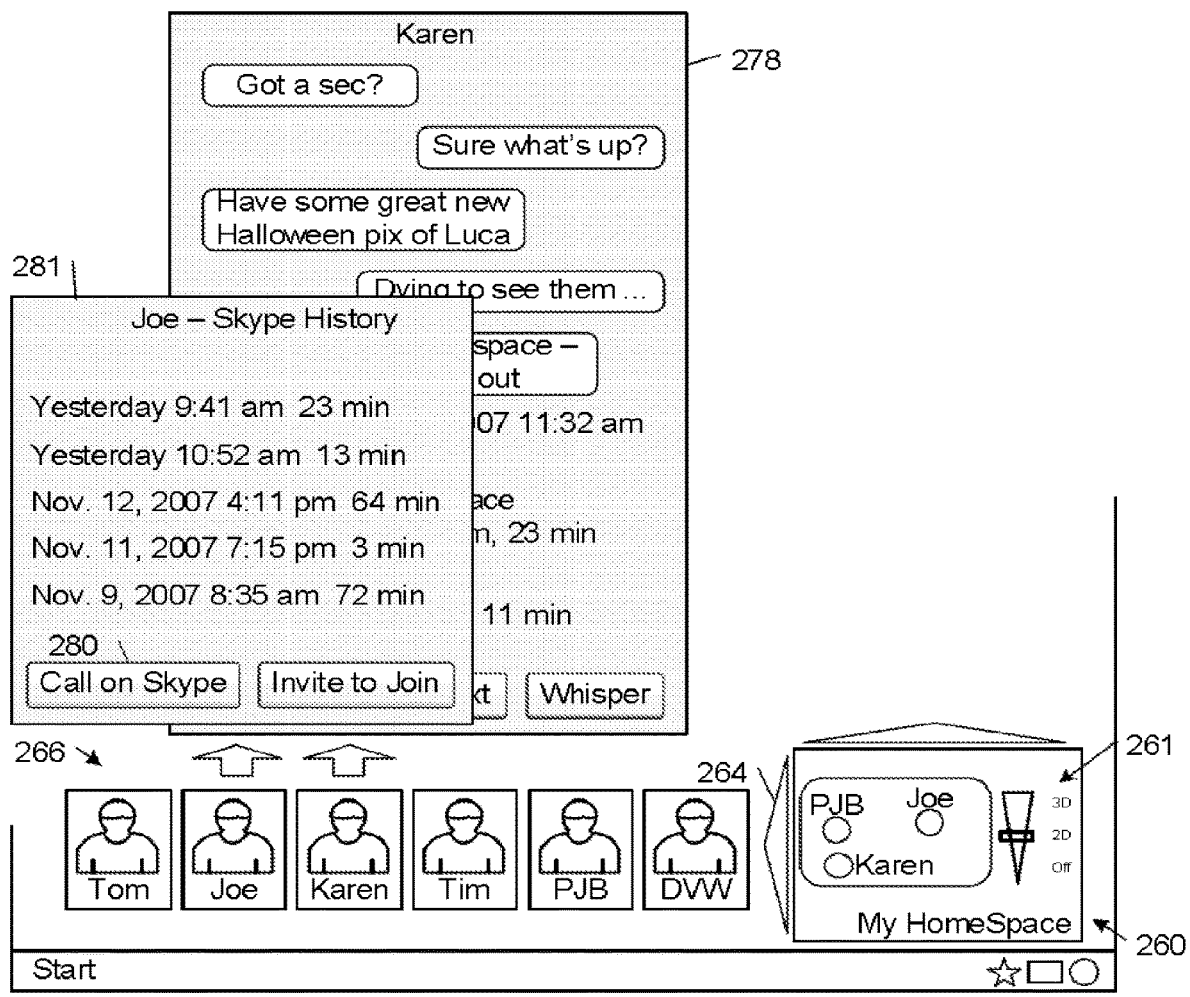
FIG. 17 shows the HUD graphical user interface of FIG. 13 displaying data associated with a second selected one of a user's realtime contacts that was extracted based on queries on the user's Skype history.

The Sococo platform and the HUD 260 also allow users to connect with the contacts they have through other communication applications (e.g., Skype contacts), but who are not necessarily Sococo users. For example, in FIG. 17, Joe is a Skype contact of the user, but he is not a Sococo user. By integrating with the programmatic interfaces of Skype, the Sococo platform gets and displays a user's Skype contacts directly in the HUD 260. Clicking on the control 280 (labeled "Call on Skype) in the Skype history interface 281, for example, initiates a call to Joe using Skype. The Sococo platform takes that audio stream and multiplexes it into the streams it is mixing with the other users in the current room (e.g., My HomeSpace in the example shown in FIG. 17). Hence Joe can participate in a Sococo conversation albeit with only an audio experience as provided by Skype. An exemplary embodiment of communication infrastructure that enables people to communicate with Sococo platform users via different communication applications (e.g., Skype) is described below in connection with FIG. 36.

F. Viewing a Contact's Current Location

The Sococo platform allows developers to extract data (e.g., multimedia content data and relationship data, such as the user's friends and the user's friends' friends) from third party web sites via exposed APIs that allow searches on metadata associated with that data. In particular, the Sococo platform includes a variety of programmatic interfaces that allow developers to integrate existing data stores (which may be operated and managed independently of either Sococo or the area application designer) into a Sococo realtime interactive communication environment (i.e., a Sococo place).

Figure 18:
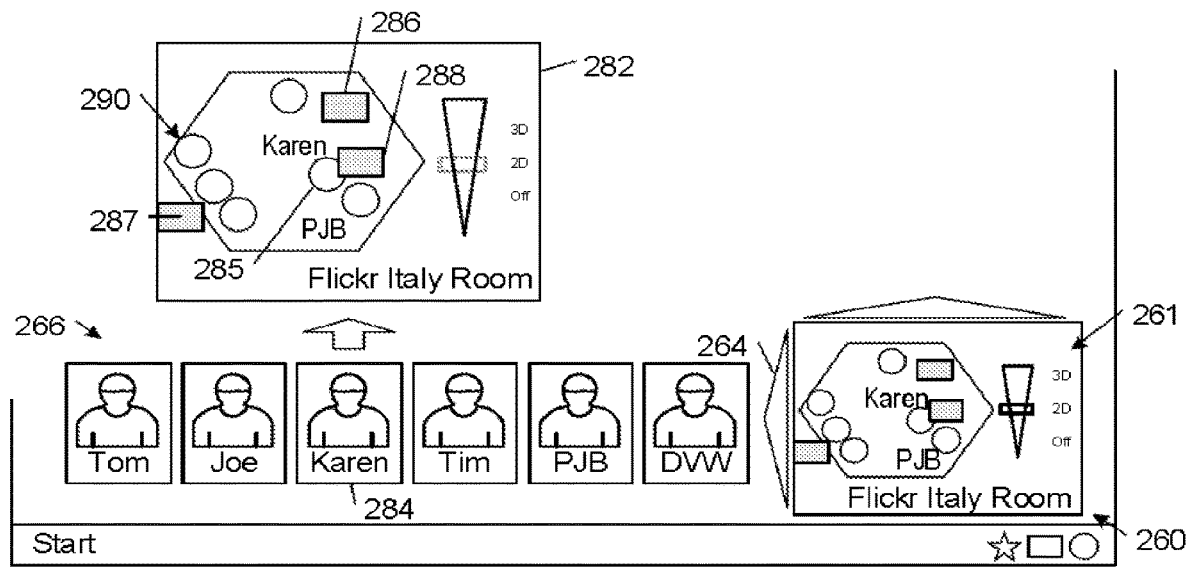
FIG. 18 shows the HUD graphical user interface of FIG. 13 displaying a two-dimensional representation of the Sococo place in which a selected one of a user's realtime contacts has presence.

FIG. 18 shows how a user can determine the current location of a given contact. In response to the positioning of a mouse pointer over the graphic representation 284 of a realtime contact (i.e., Karen), the Sococo platform displays that contact's current location by a sprite 285 in a minimap view 282. In this example the contact, Karen, has presence in a realtime room entitled Flickr Italy Photos. Flickr is a popular community-oriented photo sharing site where users are encouraged to post and comment on the photos posted by others. The Sococo platform integrates with such services to obtain realtime information about the users, for example what photos they are looking at right now. The Flickr Italy Photos room has been configured to extract from the Flickr databases photos that are labeled with Italy metadata tags. The photos then are arranged within the Flickr Italy Photos room based on other metadata that is associated with the photos (e.g., by photographer).

The user can see that Karen is looking at photos (shown by thumbnails 286, 287, and 288 in FIG. 18) in the Flickr Italy room along with five other communicants, also denoted by sprites 290 in FIG. 18, by presenting the place tile 282 that is associated with the area. Clicking on the Flickr Italy room, takes the user directly to the location of his/her realtime contacts (as shown in the HUD interface), where the user can instantly initiate a voice or text chat conversation. The user can change the progressive immersion control 261, denoted by the vertically oriented progression immersion control slider 265 on the right-hand side of the HUD 260. For example, changing the slider from its current position (labeled "2D") to the position labeled "3D", changes the visual display of the Flickr Italy photo room from the 2D minimap view 282 that is shown in FIG. 18 to a 3D representation 290 that is shown in FIG. 19.

Figure 19:
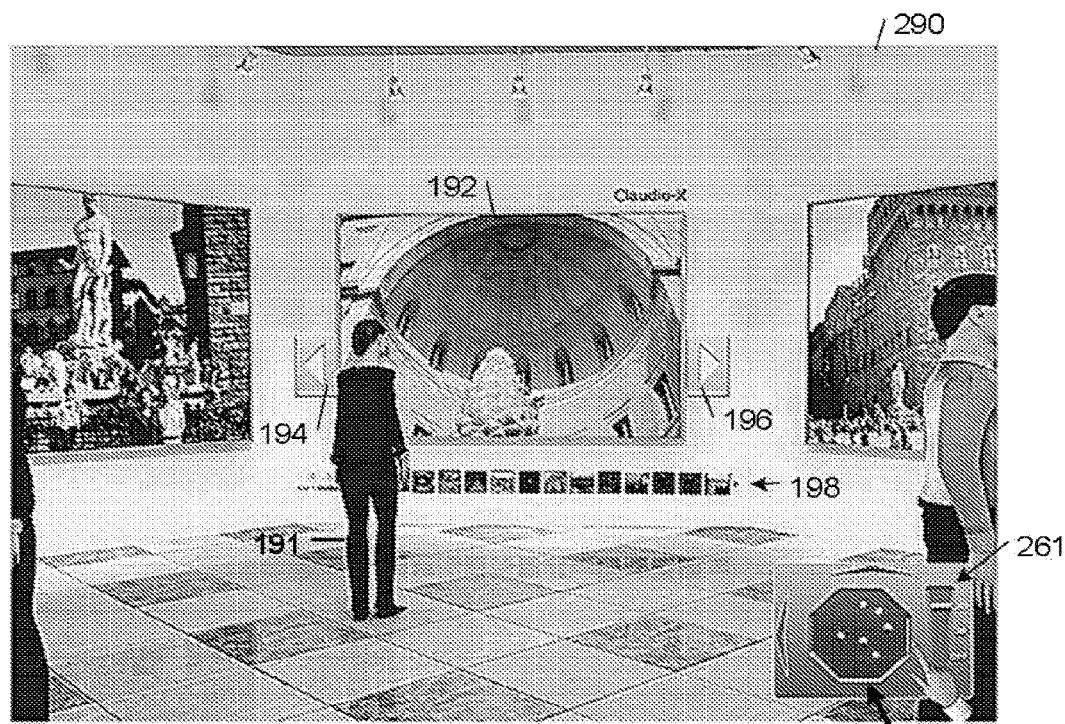
FIG. 19 shows the HUD graphical user interface of FIG. 18 displaying a three-dimensional representation of the Sococo place current occupied by the selected one of a user's realtime contacts.

In FIG. 19, Karen is represented by an avatar 291 in the 3D representation 290 of the Flickr Italy Room viewing a photo 292 by the photographer Claudio-X. The room includes controls 294, 296 that allow the user to view previous/next photos in a sequence of images shown as an array of thumbnail images 298 below the current photo displayed on the view screen. As shown in FIGS. 18 and 19, the Sococo platform allows users to have realtime interactions in a two- or three-dimensional immersive experience for navigating/browsing photos. The Sococo platform allows developers to configure realtime communication environments (i.e., Sococo places) to retrieve asynchronous data (e.g., Flickr photos) amassed by users and their contacts. These places can then be used by users to interact and communicate with their realtime contacts about their photos and other content. In this way, the Sococo platform enhances a user's experiences with his or her asynchronous data and other existing data stores. The Sococo platform and the HUD 260 allow users to stay in constant contact with their realtime contacts from a variety of different places.

Figure 20:
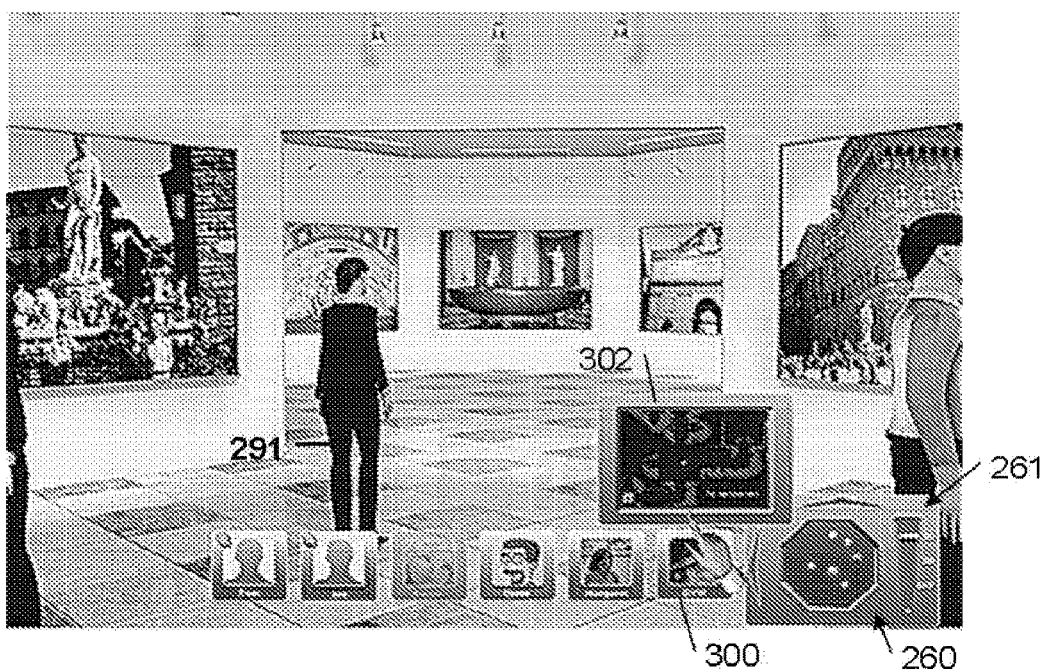
FIG. 20 shows the HUD graphical user interface of FIG. 19 in which the user is interacting with a first realtime contact in a shared Sococo place while interacting with a second realtime contact who currently is playing an online game represented by the MMOG minimap.

In FIG. 20, the user has joined Karen, his realtime contact, in the Flickr Italy Photo room. In this embodiment, the user is represented by a hand pointer 297. A second realtime contact (e.g., DVW who is represented by the contact tile 300), initiates a voice conversation with the user directly from the HUD 260. DVW happens to be in an MMOG (massively multi-user online role playing game) when he initiated contact with the user. In this example, DVW requests that the user join him in the MMOG, which is shown in a minimap view 302. The user views the minimap location view 302, and clicks into the exact location of DVW. In these embodiments, the game servers that provide the backbone infrastructure for the MMOG export place information to the HUD 160. Based on the integration between the Sococo platform and the MMOG, the Sococo platform can directly launch the MMOG client software and place the user in exactly the same location of his realtime contact. In these embodiments, Sococo libraries are integrated into the MMOG client software so that it can be launched just like any traditional application, yet access and use the Sococo Platform.

Figure 21:
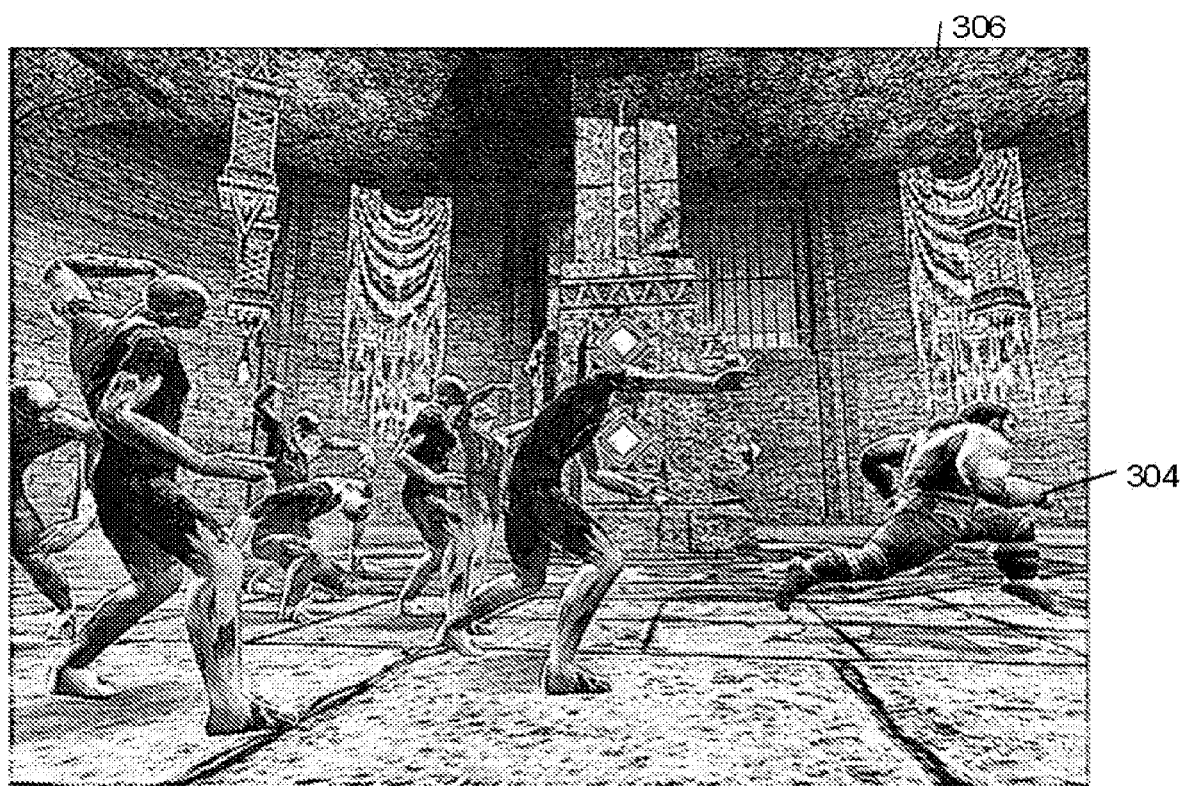
FIG. 21 shows an embodiment of a three-dimensional visualization of the current game environment experienced by the second realtime contact with whom the user is interacting in FIG. 20 via the HUD.

FIG. 21 shows a graphic representation 304 of the user in the MMOG location 306 (i.e., a zombie-filled dungeon) where user had requested to enter the MMOG via the minimap view 302 shown in FIG. 20. This example also illustrates a HUD place tile that is generated by an application server managing a non-Sococo "area" (i.e. the MMOG). This example illustrates how an existing application server can export an interface to the HUD 260 such that Sococo users can monitor the state of their realtime contacts from outside that application. Indeed, they may be able to monitor the state of those contacts even if they have never used the application themselves. If such a user initiates a Go request to their Sococo platform via the HUD 260, it creates a subscriber acquisition opportunity for that application provider. In addition, this HUD data feed can be used as a place tile in users' place tile lists in their respective HUDs.

G. HomeSpace Application

As described above, HomeSpace is a Sococo application built on the Sococo platform. It is provided to all users by default when they first register to get the service. HomeSpace is a user's personal collaboration space. The user can:

Customize HomeSpace with photos, videos, music or any form of rich media

Figure 22:
FIG. 22 shows an embodiment of a three-dimensional visualization of a user's HomeSpace place.

Select different visual themes or geometries/architecture to personalize their space, or create their own Decorate the space with virtual objects of their own creation or that they have obtained or purchased from Sococo or other users . . . or a variety of other personalization options FIG. 22 shows an example of how a user's HomeSpace may be customized. In this example, a user is able to interact with a scheduling application via an interface 310 that is presented on a wall 32 in a room 314 of the HomeSpace area. The interface 310 includes a graphic representation 316 of a week view of the user's schedule and a set of control buttons 318 that allows the user to navigate/control the scheduling application.

H. Office Space Application

1. Introduction

OfficeSpace is a Sococo application built on the Sococo platform. OfficeSpace is a realtime communications application for the corporate market. It is built on the Sococo realtime platform. OfficeSpace provides a survey of the technologies and user experiences provided by applications on the platform.

Figure 23:
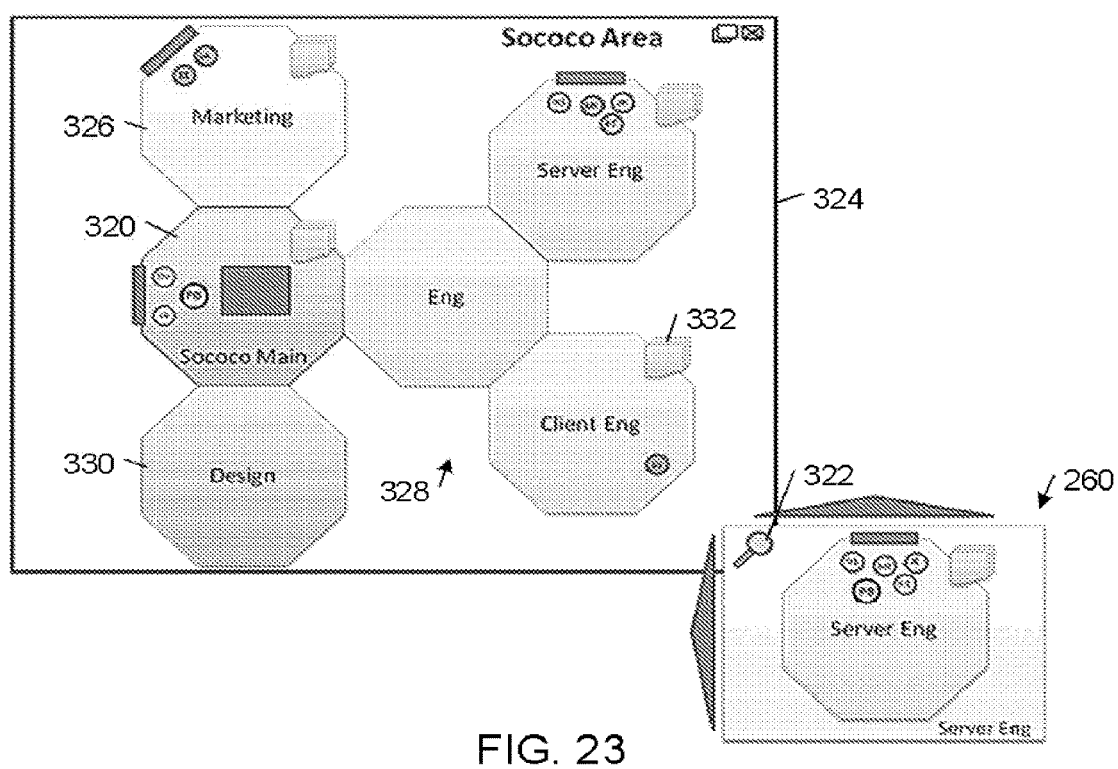
FIG. 23 shows an embodiment of a two-dimensional visualization of an OfficeSpace place.

FIG. 23 shows how OfficeSpace could be launched and used from the HUD 260. In this example, a common virtual area contains several other virtual areas in accordance with a hierarchical arrangement of the virtual areas. The HUD 260 includes a visualization control (i.e., magnifying icon 322) that has a first visualization mode in which the graphic representation of the particular virtual area in which the user has presence (e.g., the Sococo Main room 320) is displayed alone and a second visualization mode in which graphic representations of all of the virtual areas that are contained by the common virtual area are displayed in a spatial layout. In this example, the HUD 260 initially displays only the Sococo Main room 320 where there are three realtime contacts present (DV, JA, and PB). Clicking on the magnifying icon 322 shows an entire area view 324 of the Office Space application. The area view 324 shows all the realtime rooms that are contained by the current instance of the OfficeSpace application, including the Sococo Main room 320 and five other rooms that are associated with that instance of the OfficeSpace application. In this example, the illustrated instance of the OfficeSpace application is organized functionally-rooms for Marketing 326, Engineering 328, and Design 330. The individual rooms of the OfficeSpace application have files associated with them, as denoted by the file icons 332, which are visually connected to the associated virtual areas. The graphical depictions of these rooms also show realtime presence information—i.e. which realtime contacts are present right now in each room. The user can click into any room of the OfficeSpace application that he or she has permissions to enter and begin collaborating in realtime (voice, files, visualization, etc) with the other communicants who are present in that room.

The following description is based on the following exemplary scenario. Three colleagues are meeting virtually to prepare for a presentation with their boss in the morning. The three colleagues are in different locations but in front of their PCs—they will be meeting in a Sococo virtual place.

2. Heads-Up Display

Figure 24A:
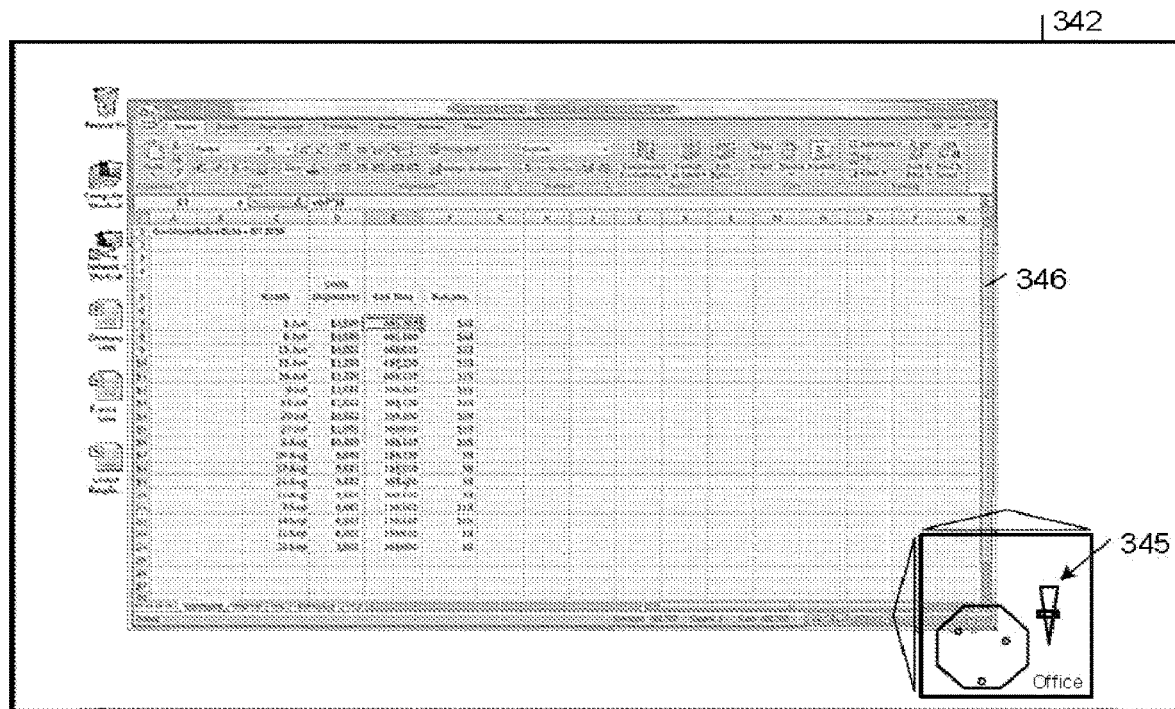
FIG. 24A shows an embodiment of a heads-up display (HUD) graphical user interface in a desktop mode of operation.
Figure 24B:
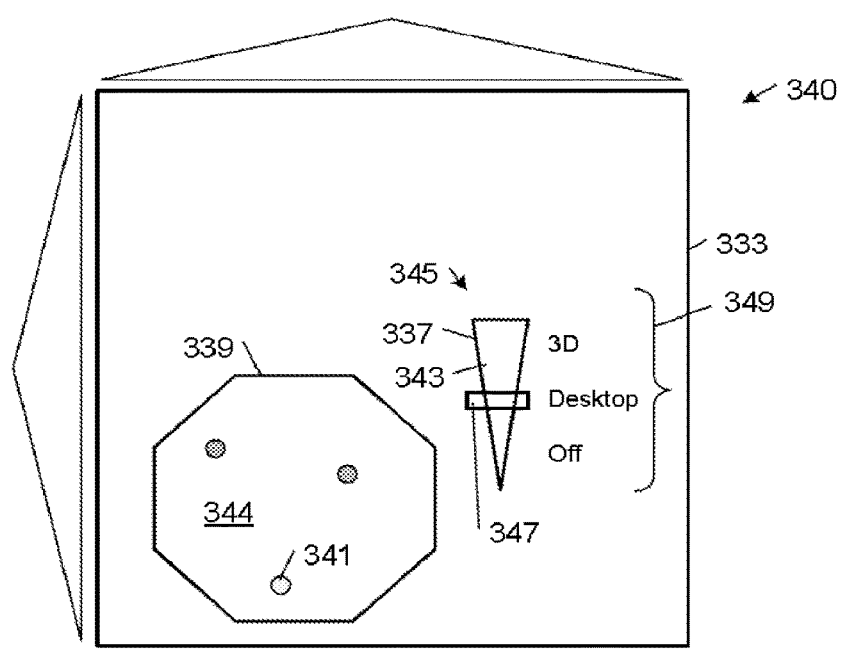
FIG. 24B shows an enlarged view of the HUD shown in FIG. 24A.

FIGS. 24A and 24B show another embodiment 340 of the Heads-up Display (HUD) that is implemented by a translucent user interface that is docked in the lower right hand of the user's desktop 342. The HUD 340 is the application interface to the Sococo platform. Characteristics of the HUD 340 include:

the HUD 340 is small, lightweight application that is intended to be running all the time on the user's desktop; and the HUD 340 provides the user with an easy interface to see and interact with contacts as well as the Sococo places where interaction occurs.

In this embodiment, the HUD 340 is implemented by a substantially transparent (semi-translucent) user interface overlay that provides a persistent interface and access to controls. In the embodiment shown in FIG. 24A, the HUD 340 is transparent except for a limited set of one or more of the following semi-translucent elements of the interface:

the outline 337 of a progressive immersion control 345;

the outline of user's current location 344, which is represented by the unfilled area within the semi-translucent octagonal place boundary 339;

the sprites 341 representing realtime contacts in the Sococo place 344; and the line 333 demarcating the border of the HUD 340.

In this way, the HUD 340 is designed to serve as a true interface that displays information and provides access to controls with only minimal obscuration of the underlying parts of the user's display screen. The HUD 340 efficiently shows:

the ones of the user's realtime contacts that currently are online, where the user and the user's realtime contacts currently are "located" (e.g., where the user currently is located in Sococo space and where the user's realtime contacts are located in the spatial virtual environment), a progressive immersion control interface 345 that controls the visualization of the places (realtime interaction environments) within the associated virtual area, and navigation controls that enable the user to quickly connect to a particular place.

The immersion control interface 345 includes an unfilled semi-translucent graphical immersion level indicator 343, a semi-translucent immersion level controller (or slider) 347, and a semi-translucent textual immersion level indicator 349 that labels the different immersion levels corresponding to the different positions of the slider 347 along the graphical immersion level indicator 343. The user can move the slider 347 along the graphical immersion level indicator 343 with an input device (e.g., a computer mouse) to select a desired level of interaction with the associated virtual area from a set of different interaction levels. For example, in the illustrated embodiments, the immersion control interface 345 enables the user to change the level of interaction by selectively changing between ones of a three-dimensional graphic interface mode of interaction with the virtual area ("3D" mode), a two-dimensional graphic interface mode of interaction with the virtual area ("Desktop" mode), and a non-graphic interface mode of interaction with the virtual area ("Off" mode). In the three-dimensional graphic interface mode of interaction, the respective graphic representations of the communicants are depicted as three-dimensional avatars; in the two-dimensional graphic interface mode of interaction, the respective graphic representations of the communicants are depicted as two-dimensional sprites; and in the non-graphic interface mode, the respective graphic representations of the communicants and the virtual area are omitted (i.e., not shown).

In the illustrated OfficeSpace application embodiment, the user has the HUD 340 defaulted to show the Sococo place (i.e., the Office) where the meeting will take place. The Sococo place is represented by an octagonal conference room 344 that is displayed in the HUD 340. Initially, the conference room 344 is empty since none of the participants have joined the meeting.

3. Desktop Integration

As shown in FIG. 24A, the user is able to work in his or her normal Windows environment while the Sococo platform and HUD are running and ready to initiate realtime communications sessions. For example, the user may work with other applications, such as Microsoft Excel, to create information (e.g., the Excel spreadsheet 346 shown in FIG.

24A) that can later be shared in a realtime communications session on the Sococo platform. A virtual area is integrated with the user's desktop 342 such that the user can (i) drag and drop files into the environment, (ii) use files stored in the area using their native client applications independently of the area environment while still present in an area, and (iii) more generally treat presence and position within an area as an aspect of their operating environment analogous to other operating system functions rather than one of several applications.

4. Prescheduled Meetings

Figure 25:
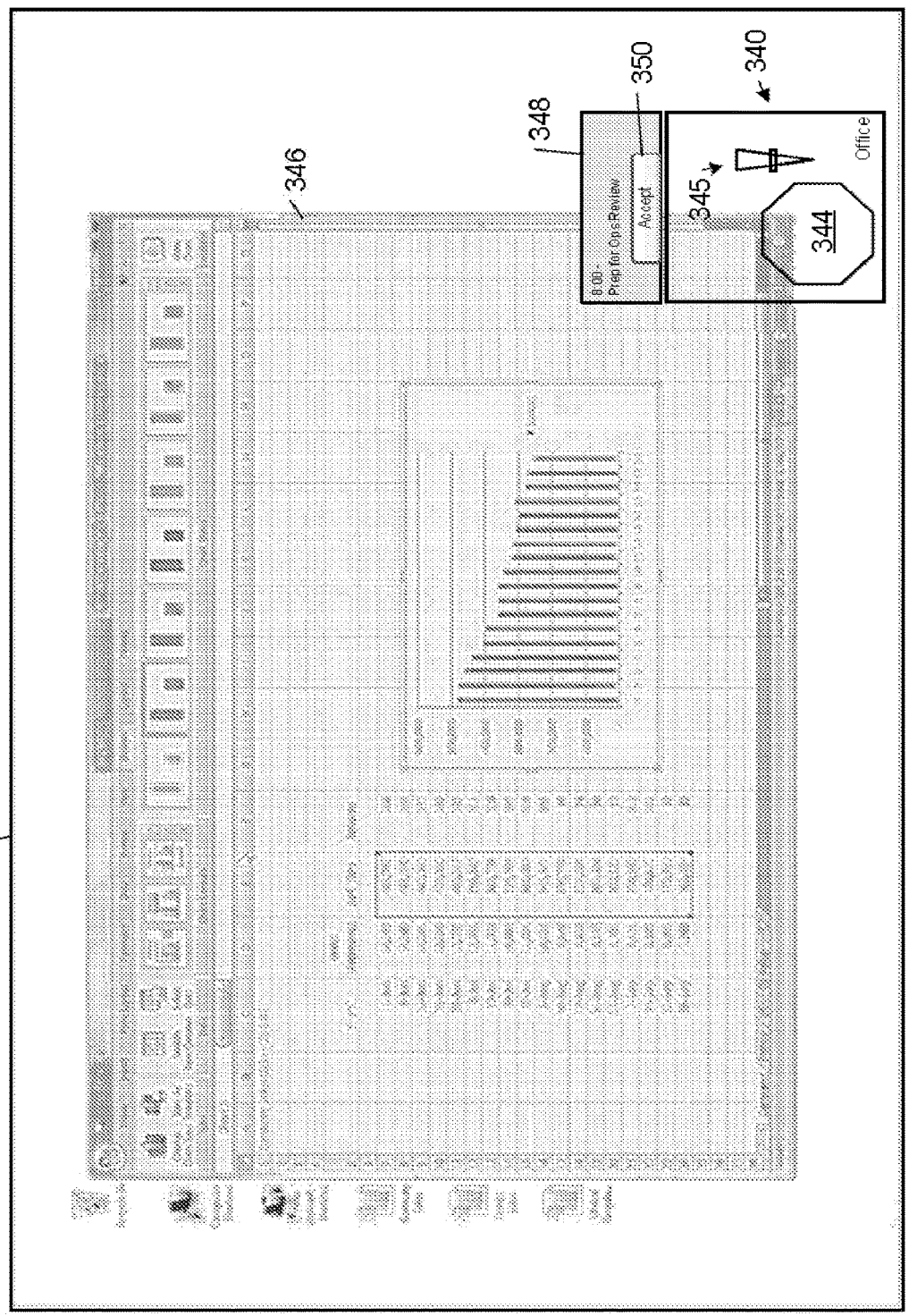
FIG. 25 shows the HUD graphical user interface of FIG. 24A displaying an alert for a pre-scheduled meeting (i.e., "8 am-Pre for Ops Review").
Figure 26:
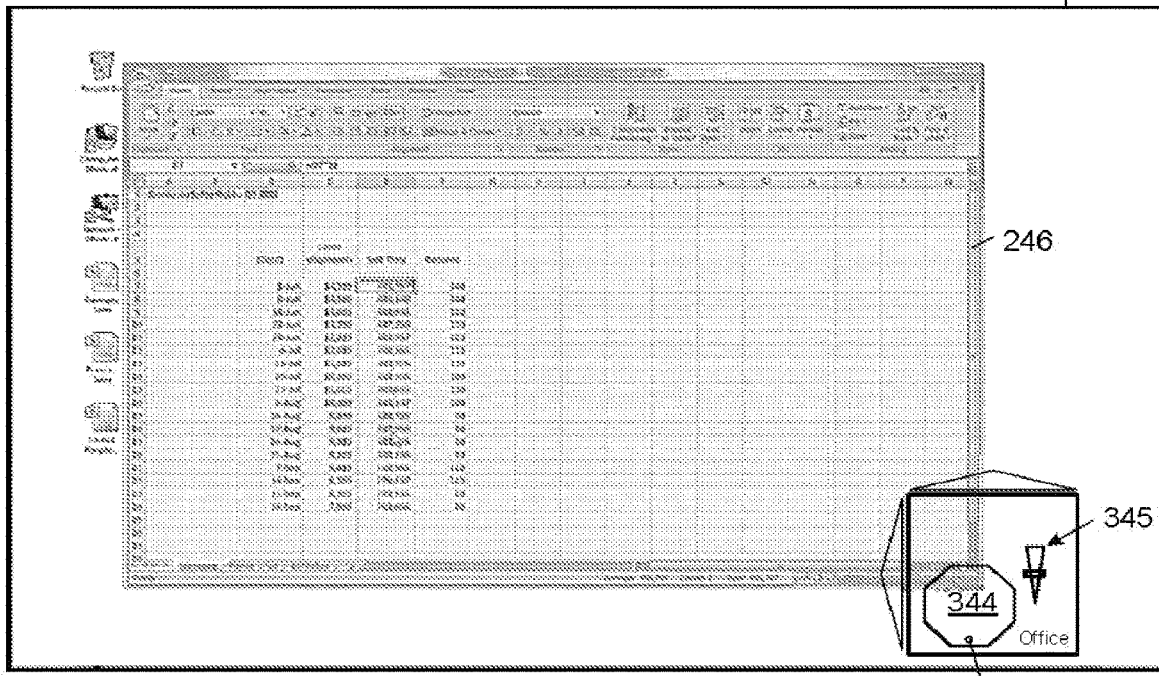
FIG. 26 shows the HUD graphical user interface of FIG. 24A in a desktop mode of visualization after the user has entered a Sococo place, where the user currently is the only communicant in the place.

The Sococo platform allows for either ad hoc or pre-planned meetings. For a pre-planned meeting the Sococo platform issues an alert to the user. For example, in the embodiment shown in FIG. 25, an alert 348 entitled "8:00 am-Prep For Ops Review" is displayed in the HUD 340 to notify the user that a meeting is about to begin and an "Accept" button 350 is presented to the user to enable the user to join the review meeting. Clicking on the alert (i.e., "Accept") connects the user into the Sococo place (octagonal virtual conference room). In the Sococo place, the user is represented by a small, bright circle 352 termed a "sprite," which indicates to the user that the user is present in the conference room 344 (see FIG. 26). From a realtime communications perspective, the user is now in that virtual Sococo place and is able converse with anyone else in that same place because the stream switching rules in this embodiment of OfficeSpace specify that all users in a given room are connected in that way.

Figure 27:
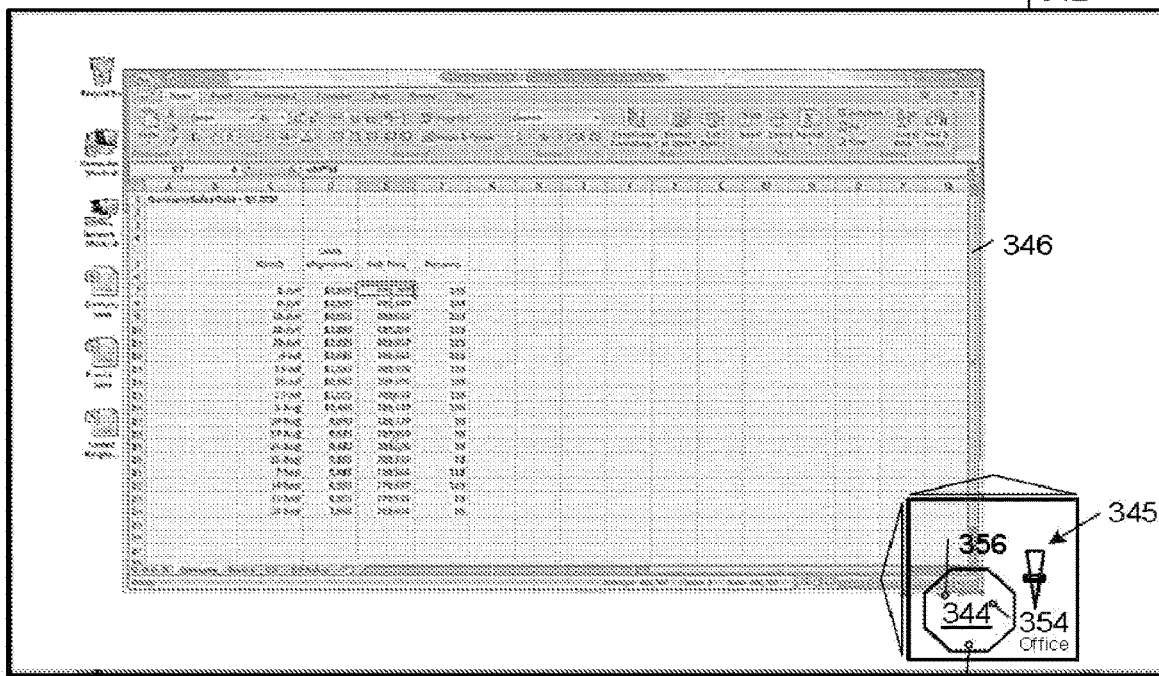
FIG. 27 shows the HUD graphical user interface of FIG. 26 in a desktop mode of visualization after two additional communicants have entered the Sococo place.

As shown in FIG. 27, two colleagues join the user in the conference room place 344. Both of these colleagues are similarly denoted by respective sprites 354, 356 in the Sococo place 344. All the communicants now are able to see each other's presence in the room (e.g., see each other's sprites) as well as hear each other. In this regard, the Sococo platform is multiplexing the microphones and speakers of all the participants together. Anyone in that Sococo place is capable of seeing or hearing anyone else in that place.

5. Progressive Immersion

Figure 28:
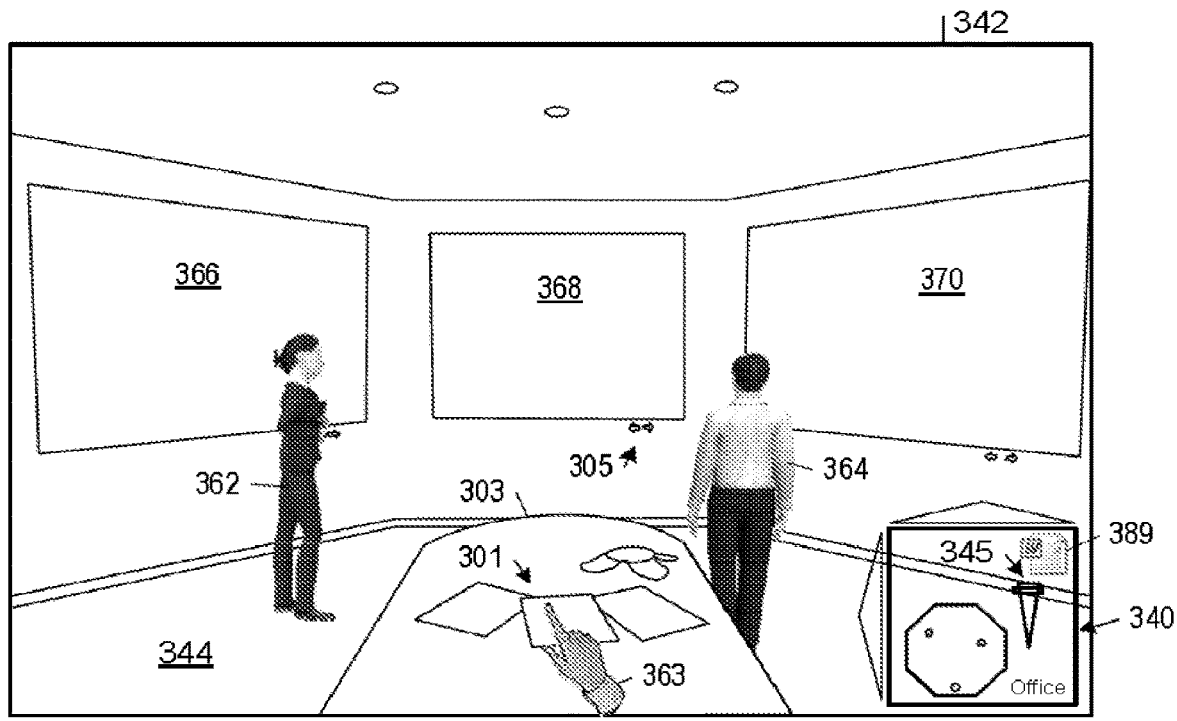
FIG. 28 shows the HUD graphical user interface of FIG. 27 in a three-dimensional mode of visualization just before the user has entered the place.

While the communicant interacts in the virtual area 344, the HUD 340 provides the user with independent control over his or her desired visualization. For example, the user may display a minimized view of the Sococo place (minimized to the lower right-hand corner of the desktop) and participate in an audio conversation while working in different application such as Microsoft Excel. The user then may elect to change his visualization schema and enter into a more immersive three-dimensional rendering of the Sococo place. This is accomplished by changing the setting of the progressive immersion slider 347 in the HUD 340 from Desktop (as shown in FIGS. 27) to 3D (as shown in FIG. 28). Once in the 3D visualization mode, the user's desktop displays a 3D rendition of the shared Sococo place 344. The communicants (sprites in the Desktop mode) now take the form of 3D avatars 362, 363 (corresponding to a hand pointer), 364, as shown in FIG. 28.

Any data that is associated with the Sococo place 344 can be displayed on view screens 366, 368, 370. A view screen is a generic data rendering component that can be used to render any arbitrary data. Examples of the types of data that can be rendered on a view screen include:

Microsoft PowerPoint presentation
Video
output of a Webcam
realtime data that comes directly from an organization's ERP system Sococo leverages 3D visualization technologies to enhance the communications experience where appropriate. In the illustrated embodiments, the Sococo places are designed as octagons such that information can be displayed on three adjacent walls and easily viewed in a single glance without panning from wall to wall (or between tiled windows in a strictly 2D display). In other embodiments, Sococo places may be in the form of any type of geometric shape (e.g., rectangles, circles, pentagons, and arbitrary shapes). Geometry selection is up to the application designer.

6. Social Processors

The Sococo platform includes capabilities that enable developers to define social processors and deliver them via plug-ins. A social processor is a set of instructions that automatically gets executed when a specific event or occurs or a specific condition is satisfied (e.g., automatic motion triggered by at least one of proximity to other avatars, position in an area, and change in state of the area, e.g., by entry or exit of a communicant). Social processors can be any arbitrary programmatic routine to control the motion of users or objects in a Sococo place. For example, in some embodiments, if an avatar approaches a view screen, the social processor automatically will snap the avatar to grid and center the avatar in front of the screen so that the user can easily see the contents of the screen. This feature of the social processor eliminates the need for complex manipulation of movement of the character.

Figure 29:
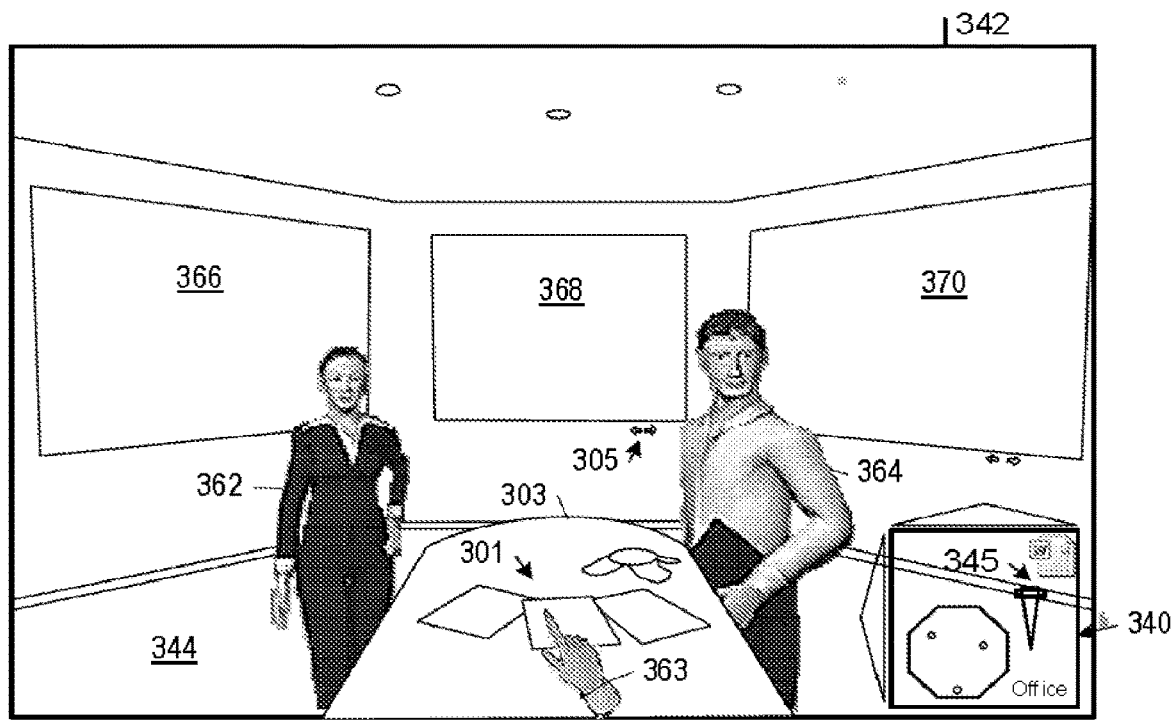
FIG. 29 shows the HUD graphical user interface of FIG. 27 in a three-dimensional mode of visualization after the user has entered the place and after the avatars representing communicants currently in the place automatically have been turned to face the user.

Other examples of Social Processors include the ability for an avatar to automatically pivot and turn to acknowledge the presence of another user. For example, FIG. 29 shows two avatars that turn from facing each other in FIG. 28 to facing the user in response to the user entering the Sococo place. The users associated with these two avatars did not have to manipulate their Avatars manually; instead, the Social Processor automatically rotated their heads to acknowledge the new user.

In the embodiment shown in FIGS. 28 and 29, a file icon 389 is displayed in the HUD 340 to signify to the user that there are files (e.g., documents) associated with that space. In the 3D visualization, the user can use the hand pointer 363 to pickup one of the documents 301 shown in the table 303 by clicking on the document. The user then can associate the document with one of the view screens 366-370 by moving the document to the selected view screen and clicking with the hand pointer 363. The Sococo platform interprets this action as a command to present the document on the selected view screen. In some embodiments, the Sococo platform will render the document on the view screen using an application program (e.g., Microsoft Excel) running on the area server. Control buttons 305 are provided under each view screen 366-370 to allow anyone in the Sococo place to control the presentation of the document being rendered on the associated view screen (e.g., scroll up/down, page up/down, next/previous slide, etc). Thus, the Sococo platform associates control buttons with the content rendering surfaces (e.g., view screens) of the 3D visualization.

7. Dynamic Spaces

The Sococo platform allows for the creation of dynamic spaces (i.e., virtual Sococo places that are created on demand by user actions). This process typically involves changing an area definition by adding or removing regions of a virtual space. Application designers can define templates (e.g. virtual rooms) with a variety of shapes and stream handling characteristics to make it easy to add to an area based on a desired usage pattern. For example, in an area designed for virtual conference calling, the application developer may define a room type designed for a breakout session with a subset of the attendees, and another room type for presenting detailed information from slides, spreadsheets and realtime feeds. When the area is first used, it comes up with a basic set of one or more rooms, and during a realtime session the attendees can add rooms to the space for one or both purposes based on their needs during the session. In some embodiments, the added rooms persist for use later. In other embodiments, the added rooms are deleted either explicitly by users who are finished with them or automatically by the system as part of garbage collection.

Figure 30:
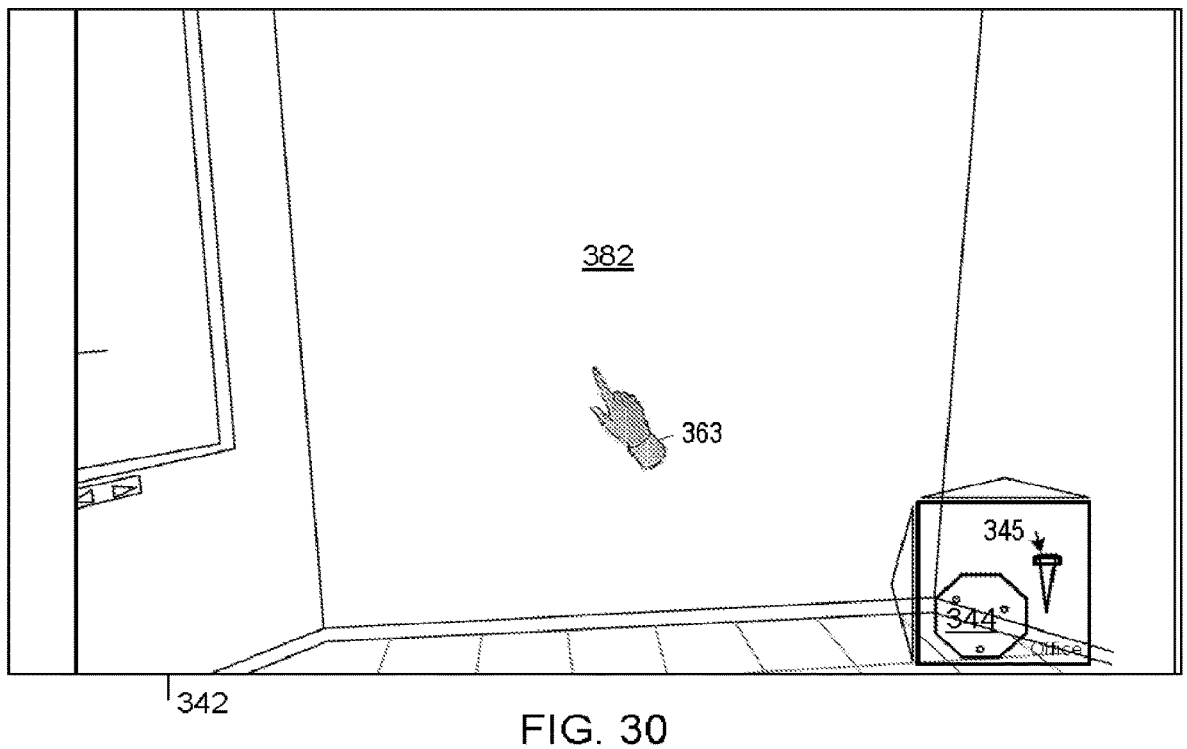
FIG. 30 shows the HUD graphical user interface of FIG. 29 just before the user has modified the place definition by clicking on a wall of the place to add a new room to the Sococo place.
Figure 31:
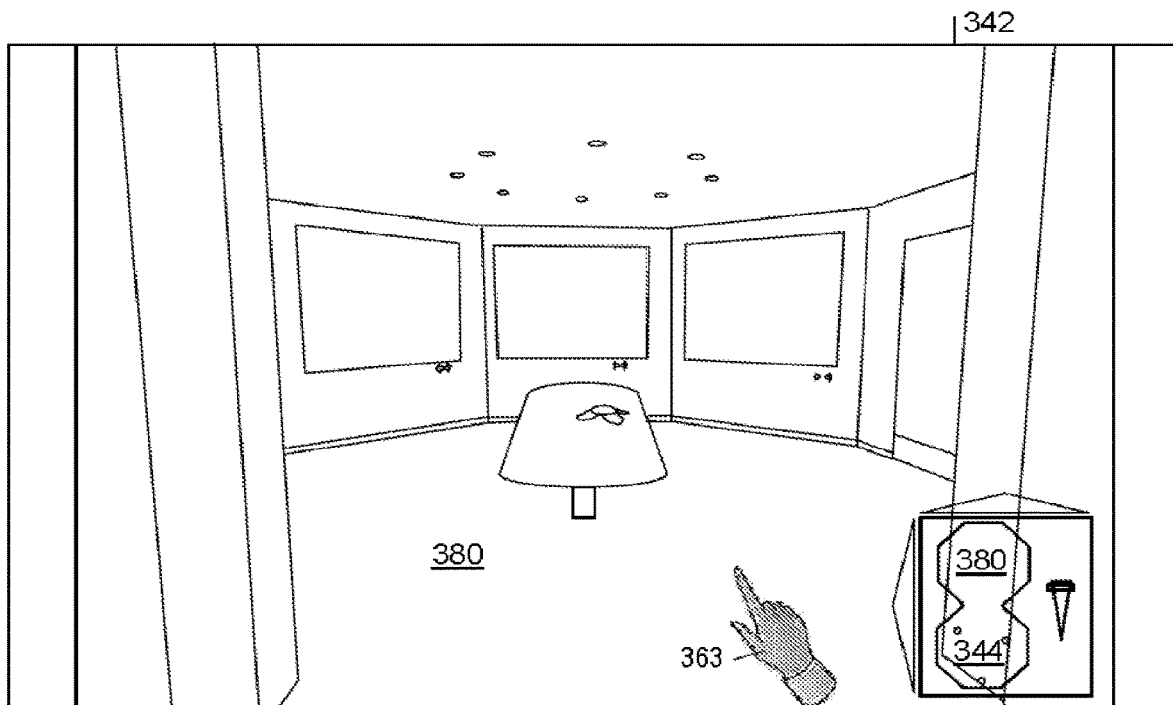
FIG. 31 shows the HUD graphical user interface of FIG. 30 just after the user has added the new room to the Sococo place.
Figure 32:
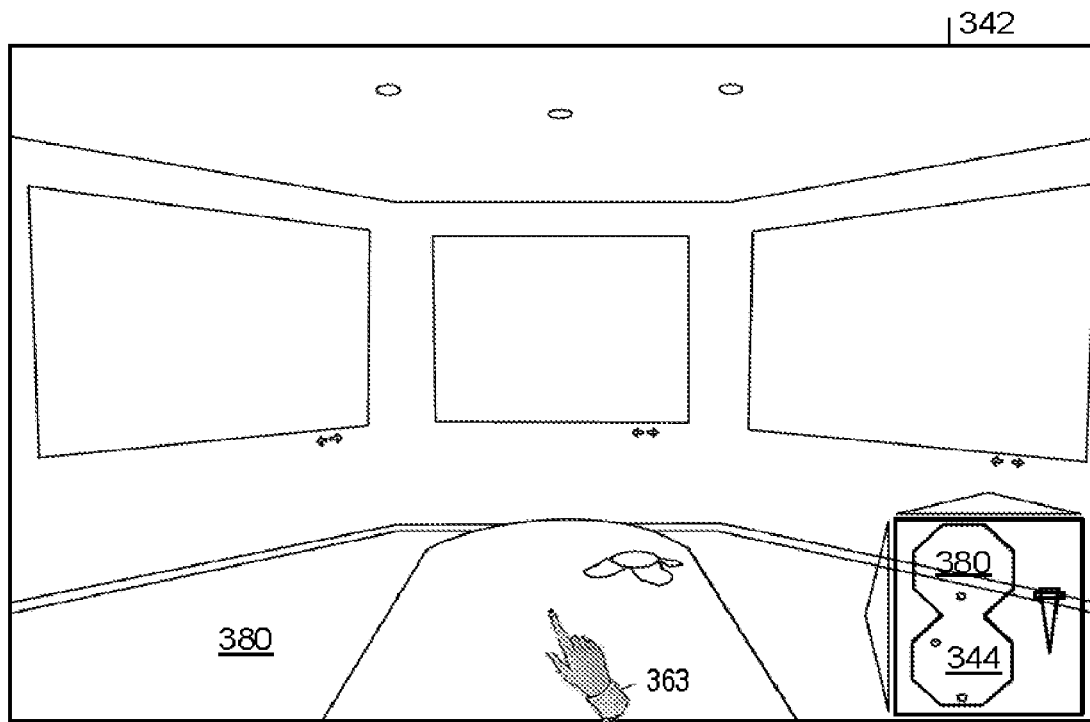
FIG. 32 shows the HUD graphical user interface of FIG. 31 after the user has entered the new room that the user has added the Sococo place.
Figure 33:
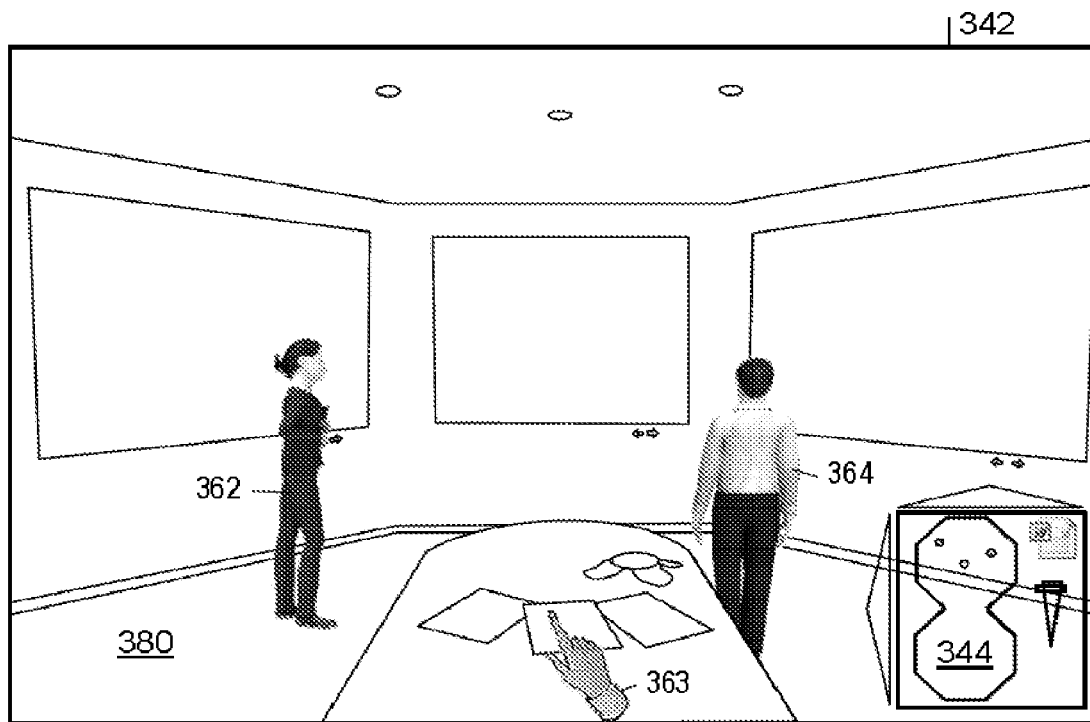
FIG. 33 shows the HUD graphical user interface of FIG. 32 after the avatars representing the other users in the Sococo place have entered the new room that is occupied by the user.

As shown in FIGS. 30-33, to create a dynamic place 380, the user clicks on a wall 382 of an existing place 344 (FIG. 30). Alternatively, the user may create a dynamic space by selecting a dynamic space creation command that is available through a traditional menu structure that is provided in some embodiments of the HUD 340. The options for geometry, size and default configurations of the dynamic spaces are up to the application developer. Typically a user will have a variety of options to choose from when creating a dynamic space. As shown in FIG. 31, in response to the user's selection of the wall 382, the system creates a dynamic place 380 that is an exact replica of the Sococo place he originally was in, except it has no external data (files) associated with the view screens, as evidenced by the blank view screens. The user can enter the new place (FIG. 32) and the other communicants 362, 364 can follow the user into the new place (FIG. 33).

8. Audible Zones

Realtime stream handling technologies in the Sococo platform allow for independent stream handling zones. The most common example of a stream handling zone is an audible zone. A typical audible zone in this embodiment of OfficeSpace is an area within which a user can hear any other user that is positioned in the same zone (i.e. the microphones and speakers of any user positioned in that space is multiplexed together so that all users can hear each other). Additional details regarding the specification of audible zones and other types of "zone meshes" are described in U.S. application Ser. Nos. 11/923,629 and 11/923,634, both of which were filed on Oct. 24, 2007.

FIG. 23 shows an embodiment of the OfficeSpace application in which each octagonal Sococo place represents an independent audible zone. In this embodiment, the user's avatar (which is represented by the light-colored sprite) is positioned in the Sococo place represented by the upper octagonal space in the HUD and therefore cannot hear the conversation occurring between the two users whose avatars are positioned in the Sococo place represented by the lower octagonal space in the HUD; these two users also cannot hear sounds that are associated with the room represented by the upper octagonal space.

I. 2.5-Dimensional Visualizations

Figure 34:
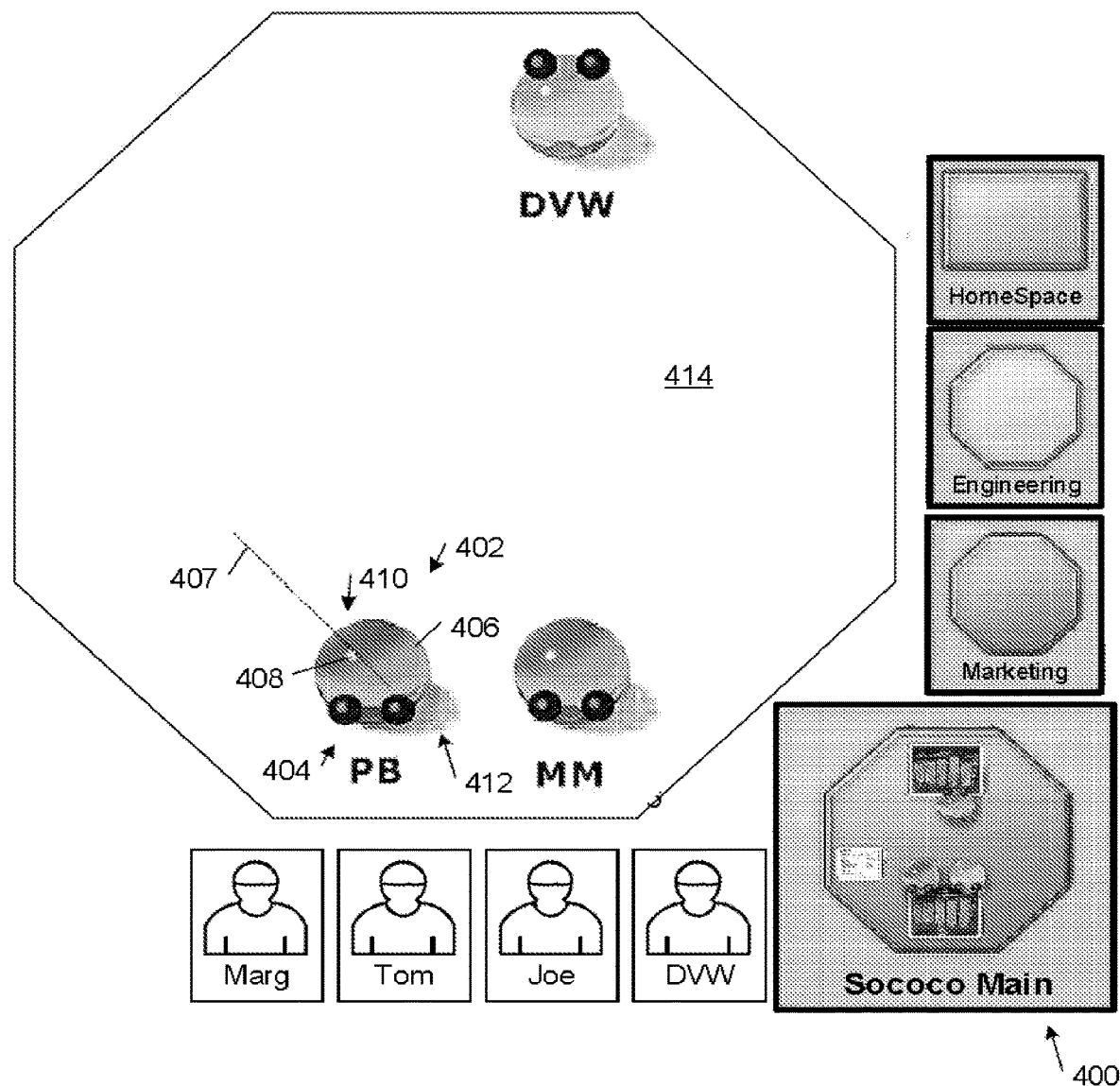
FIG. 34 shows an embodiment of a visualization of an OfficeSpace place.

FIG. 34 shows another embodiment 400 of the Heads-up Display (HUD) that shows virtual areas and communicants using a two-and-a-half dimensional (2.5D) visualization that uses two-dimensional graphics to simulate three-dimensional graphics. In the embodiment shown in FIG. 34, each of the communicants in a selected place (i.e., the Sococo Main room) is represented by a respective sprite 402 that depicts both a position in the virtual area and an orientation that reflects a focus of the associated user's attention. The position of the sprite typically refers to the center of the sprite in relation to the virtual area. The orientation of the sprite refers to the direction in which the "eyes" 404 of the sprite appear to be facing. In the illustrated embodiment, this direction corresponds to the vector 403 from the center of mass of the body 406 of the sprite 402 along a transverse path orthogonal to a line 409 connecting the eyes 404.

In the illustrated embodiment, each of the sprites 402 has a spherical at least partially translucent body 406 that interacts with light (indicated by the dashed line 407) from a virtual light source in a way that enhances the apparent orientation of the sprite 402. In particular, the rendering of each sprite body 406 involves showing a glint spot 408 on the body surface, showing a shadow region 410 on the body that results from the at least partial obstruction of the virtual light directed through the top part of the sprite body, and showing a second shadow region 412 that is cast onto the "floor" 414 of the Sococo Main room as a result of the at least partial obstruction of the virtual light directed through the sprite body 406. The positions of the glint spot 408, the first shadow region 410, and the second shadow region 412 gives the sprites 402 a three-dimensional appearance that allows the communicants to infer the attentional focus of the users within the virtual area in three dimensions (i.e., directions in the plane of the displayed interface and directions out of the plane of the interface).

Some embodiments include a social processor that responds to the positioning of a sprite 402 within a threshold distance from a view screen by automatically moving the sprite to a preset position in front of a selected one of the view screens 414, 416, 418 and orienting the sprite so that its "eyes" are directed toward the view screen.

VI. Data Handling in a Network Communications Environment

A. Communication Over Multiple Client Applications and Client Mixing for Others

Figure 35:
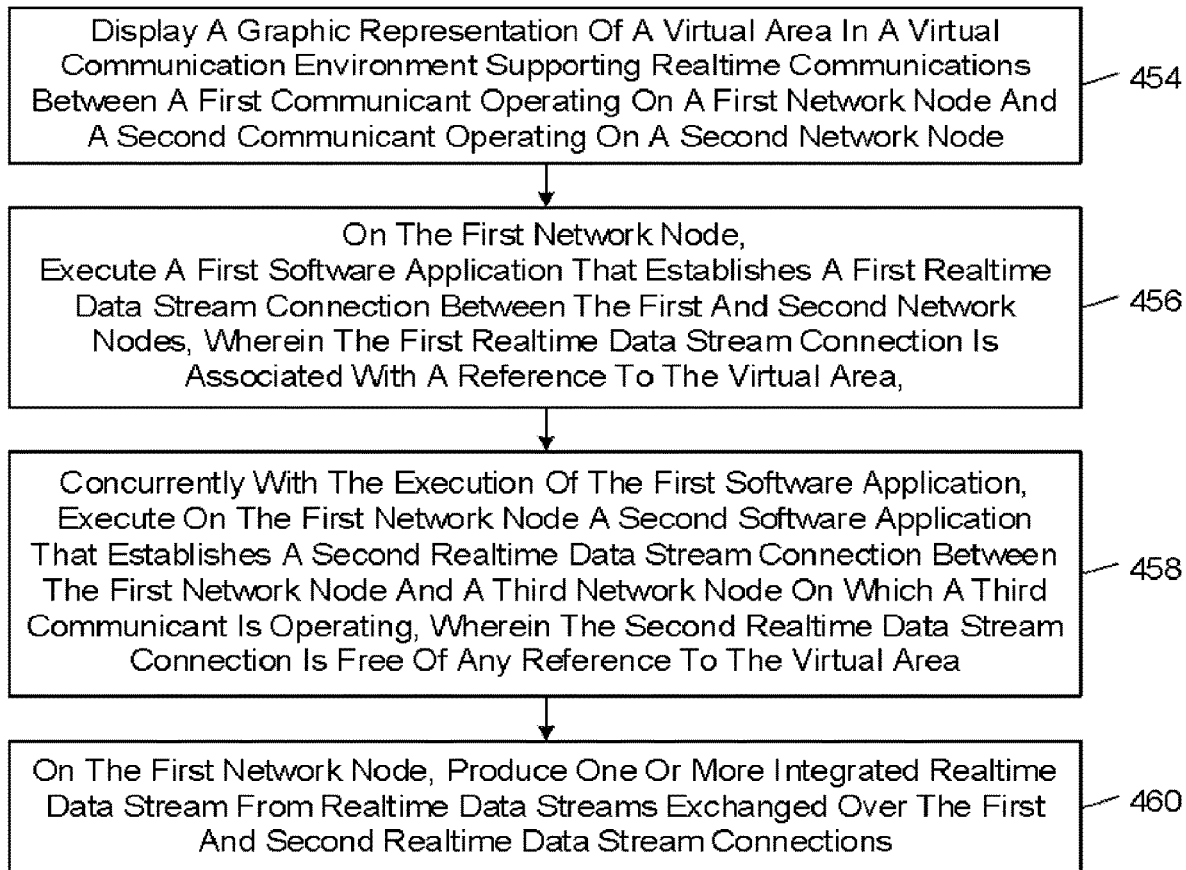
FIG. 35 is a flow diagram of an embodiment of a method of producing one or more integrated realtime data streams from realtime data streams exchanged over realtime data stream connections established by separate software applications executing on a client network node.

FIG. 35 shows an embodiment of a method by which the communications application 26 allows users to connect with the contacts they have through other communication applications (e.g., Skype contacts), but who are not necessarily Sococo users.

In accordance with the method of FIG. 35, the communications application 26 displays a graphic representation of a virtual area in a virtual communication environment supporting realtime communications between a first communicant operating on a first network node and a second communicant operating on a second network node (FIG. 35, block 454). On the first network node, the communications application 26 executes a first software application that establishes a first realtime data stream connection between the first and second network nodes, where the first realtime data stream connection is associated with a reference to the virtual area (FIG. 35, block 456). Concurrently with the execution of the first software application, the communications application 26 on the first network node executes a second software application that establishes a second realtime data stream connection between the first network node and a third network node on which a third communicant is operating, where the second realtime data stream connection is free of any reference to the virtual area (FIG. 35, block 458). On the first network node, the communications application 26 produces one or more integrated realtime data streams from realtime data streams that are exchanged over the first and second realtime data stream connections (FIG. 35, block 460).

At least one of the one or more integrated realtime data streams typically is rendered on the first network node. The communications application 26 typically transmits respective ones of the one or more integrated realtime data streams to the second and third network nodes.

A least two of the realtime data streams that respectively are exchanged over the first and second realtime data stream connections typically are of the same particular data type, and the communications application 26 mixes ones of the exchanged realtime data streams of the particular data type on the first network node. For example, in some embodiments, the communications application 26 generates a first realtime data stream of the particular data type; the communications application 26 receives a second realtime data stream of the particular data type from the second network node; and the communications application 26 receives a third realtime data stream of the particular data type from the third network node. In these embodiments, the process of producing the integrated realtime data streams involves mixing the second and third realtime data streams to produce a first integrated realtime data stream, mixing the first and third realtime data streams to produce a second integrated realtime data stream, and mixing the first and second realtime data streams to produce a third integrated realtime data stream. The communications application 26 renders the first integrated realtime data stream on the first network node, transmits the second integrated realtime data stream from the first network node to the second network node, and sends the third integrated realtime data stream from the first network node to the third network node. In some embodiments, the communications application 26 passes the third integrated realtime data stream to the second software application. In some embodiments, the first and second realtime data streams respectively are generated by first and second instances of the first software application respectively executing on the first and second network nodes, and the communications application 26 passes the second integrated realtime data stream from the first instance of the first software application to the second instance of the first software application.

In the example discussed above in connection with FIG. 17, Joe is a Skype contact of the user, but he is not a Sococo user. By integrating with the programmatic interfaces of Skype, the Sococo platform gets and displays a user's Skype contacts directly in the HUD 260. Clicking on the control 280 (labeled "Call on Skype) in the Skype history interface 281 initiates a call to Joe using Skype. The Sococo platform takes that audio stream and multiplexes it into the streams it is mixing with the other users in the room. Hence Joe can participate in a Sococo conversation albeit with only an audio experience as provided by Skype.

Figure 36:
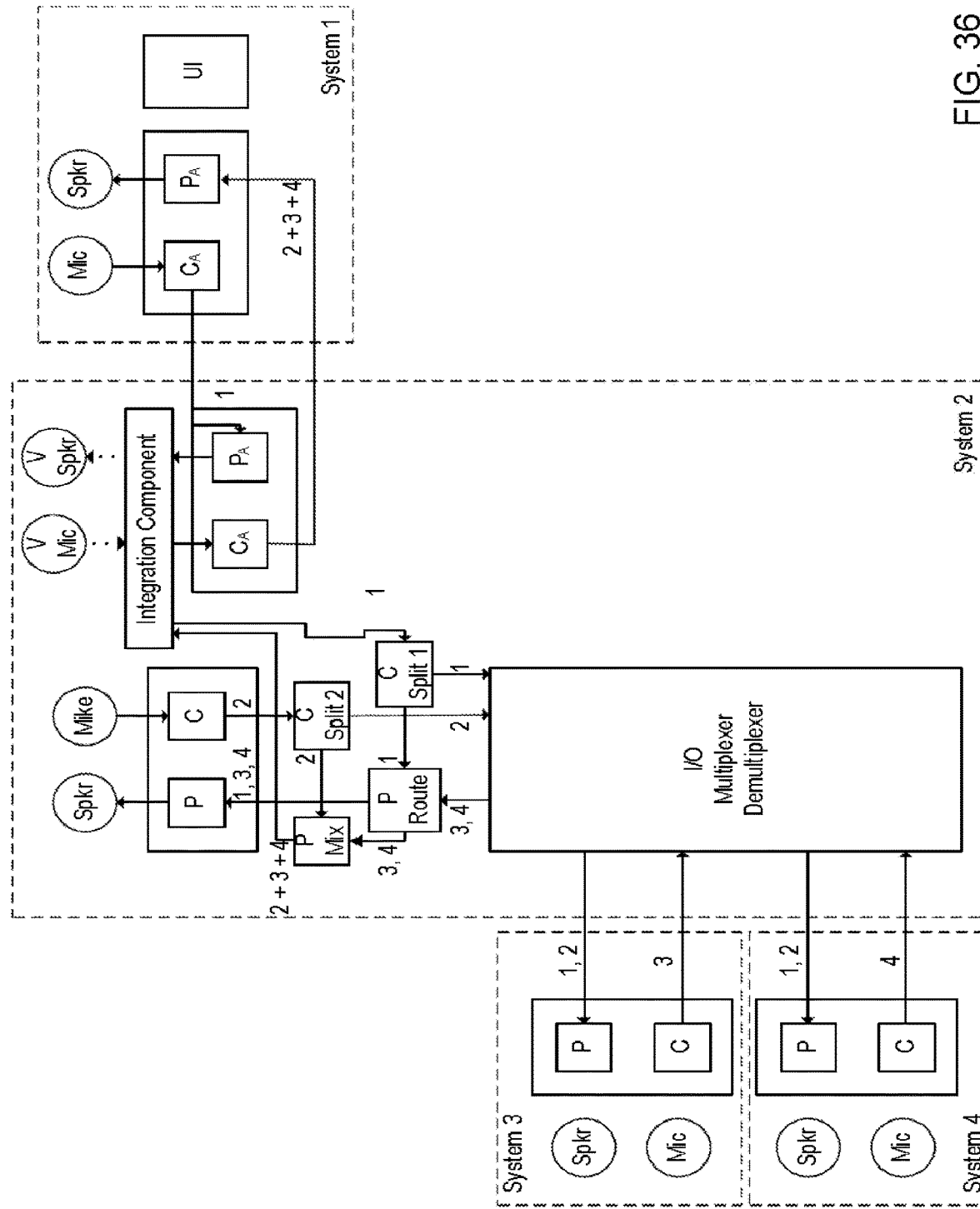
FIG. 36 is a block diagram of an embodiment of communication infrastructure that enables people to communicate with users of the Sococo platform to via different communication applications.

FIG. 36 is a block diagram of an embodiment of communication infrastructure that enables people to communicate with Sococo platform users via different communication applications (e.g., Skype). FIG. 36 shows the audio communication channels that are established between four network nodes (i.e., System 1, System 2, System 3, and System 4) sharing a virtual area. System 1 represents a client terminal that is not configured to run the Sococo communications platform; instead, System 1 is configured to operate an alternative communication system (e.g., Skype). System 2 represents a user's terminal that is running the Sococo communications platform, which includes an integration component that virtualizes the alternative communication system's playback and audio capture streams. Systems 3 and 4 represent two other client terminals that are running the Sococo communications platform. A summary of the system shown in FIG. 36 is provided in the following text block:

C: Audio Capture Component
P: Audio Playback Component
CA: Audio Capture, Alternate Audio System
PA: Audio Playback, Alternate Audio System
Integration Component: Virtualizes Alternate Playback and Capture streams. Sends Mike 1 to C Split 1 received from virtualized Alternate Playback, receives Mikes 2, 3 and 4 mix from P Mix and sends to virtualized Alternate Capture for transmission to System 1
V Mike: Virtual Mike associated with System 2 Alternate Audio
V Spkr: Virtual Speaker(s) associated with System 2 Alternate Audio
C Split 1: Receive Mike 1 from Integration Component, Sends Mike 1 to both P Route and I/O Mux/Demux
C Split 2: Receive Mike 1 from System 2 Capture, Sends Mike 2 to P Mix and I/O Mux/Demux
P Route: Receives Mike 1 from C Split 1, and Mikes 2 and 3 from I/O Mux/Demux, sends Mikes 1, 3 and 4 to System 2 Playback and Mikes 3 and 4 to P Mix
P Mix: Receives Mike 2 from C Split 2 and Mikes 3 and 4 from P Route, sends a mix of Mikes 2, 3 and 4 to Integration component (for transmission out virtualized In operation, the I/O Multiplexer Demultiplexer sends the audio signals 1 and 2 received from Systems 1 and 2 to both System 3 and System 4. The I/O Multiplexer Demultiplexer also sends the audio signals 3 and 4 received from Systems 3 and 4 to the P Route component of system 2. The P Route component sends the audio signals 1, 3, and 4 to the playback component of System 2 and passes the audio signals 3 and 4 to the P mix component of System 2. The P Mix component of System 2 mixes the audio signals 2, 3, 4 and passes the mixed signal to the integration component of System 2. The integration component passes the mixed signal to the audio capture component of an alternative communications application (e.g., Skype) that is running on System 2 and that corresponds to the communications application (e.g., Skype) used by System 1. The alternative audio capture system (CA) passes the captured mixed signal 2+3+4 to the playback component of the alternative communications application running on System 1.

In some implementations of the system shown in FIG. 36, P Mix also could subscribe to I/O Multiplexer/Demultiplexer directly. Then, the system is more symmetric. P Route becomes P Mix 1, and receives 3, 4 from I/O and 1 from C Split 1. Since these are sent as independent channels, the output of C Split 1 could be sent directly to the Playback Component, but that isn't quite as flexible (since P Mix could perform an actual mix instead of a pass through of independent channels, see 3 below). In this case, P Mix becomes P Mix 2 and receives 3, 4 from I/O and 2 from C Split 2. The output of this mixer is a true mix, since we assume that the Alternate Audio System is a single channel communication system (even if the channel is stereo, we assume that there is no multi-track mixer at the other end to combine signals from multiple sources).

FIG. 36 does not show the interaction between System 3 and System 4 with one another, only with System 2 and by extension, System 1. The interaction between System 3 and 4 could be either peer-to-peer or server mediated as described above.

In FIG. 36, any time two streams are delimited with a comma (meaning that it is a multichannel route), the system could also be sending mixed streams to conserve internal communication resources (e.g. out of the I/O Multiplexer/ Demultiplexer). The stream that must be mixed is indicated with plus signs (i.e. the virtualized microphone signal sent by the Integration Component to the Alternate Capture Component).

B. Multiplexing Client Software

As described above, in some embodiments, a document may be shared by viewing the document in the shared Sococo place, where the document is being presented by a server process running a shared application program (e.g., a Microsoft Office document processing application program, such as Word, Excel, PowerPoint) on the area server.

In some embodiments, the Sococo platform combines realtime streams from multiple users operating at different client nodes into a single stream. The Sococo platform sends the composite stream to a client application program (e.g., a Microsoft Office application program) running on the area server node. The Sococo platform routes the output data generated by the client software running on the area server into a view screen that is in a shared Sococo area. The Sococo platform multiplexes user input streams (e.g., keyboard and/or mouse command streams) to the client software running on server and vice versa. In this way, the Sococo platform processes a document in a client application running on the area server network node in accordance with the composite realtime data stream. The multiplexing client software feature of the Sococo platform enables users to collaborate on the same document. In these embodiments, the Sococo platform is taking a single terminal server session and multiplexing between multiple clients to enable collaboration on the same document. It also allows the Sococo platform to provide support for a variety of interactive sessions without having to create custom viewers for the native client software application.

Figure 37:
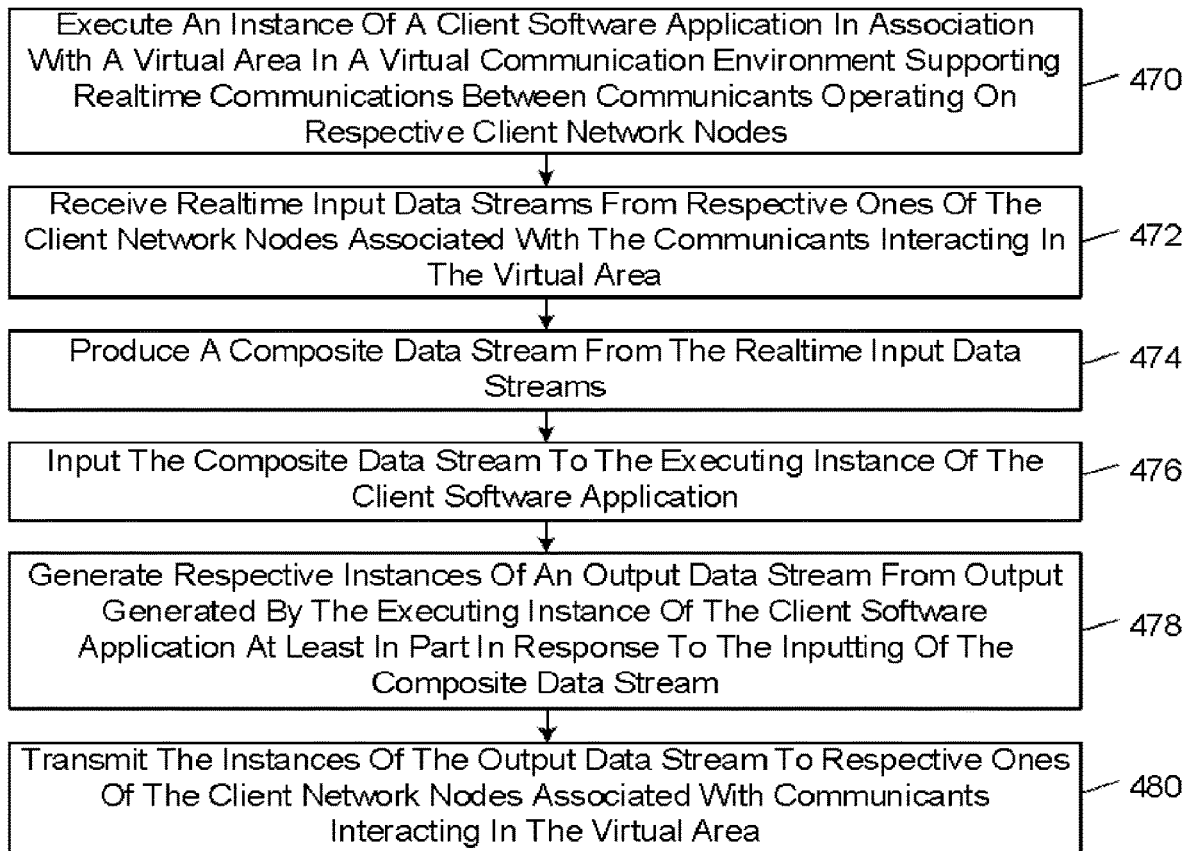
FIG. 37 is a flow diagram of an embodiment of a method by which the network infrastructure service environment 30 multiplexes client software for one or more communicants.

FIG. 37 shows an embodiment of a method by which the network infrastructure service environment 30 multiplexes client software for one or more communicants.

In accordance with the method of FIG. 37, the network infrastructure service environment 30 executes an instance of a client software application in association with a virtual area in a virtual communication environment supporting realtime communications between communicants operating on respective client network nodes (FIG. 37, block 470). The client software application may be any type of client software application. In some embodiments, the client software application is a document processing software application (e.g., a Microsoft® Office® desktop publishing software application). The network infrastructure service environment 30 receives realtime input data streams from respective ones of the client network nodes associated with the communicants interacting in the virtual area (FIG. 37, block 472). The realtime input data streams typically are derived from input device events (e.g., realtime computer keyboard events and realtime computer mouse events) on respective ones of the client network nodes. The network infrastructure service environment 30 produces a composite data stream from the realtime input data streams (FIG. 37, block 474). The network infrastructure service environment 30 inputs the composite data stream to the executing instance of the client software application (FIG. 37, block 476). The network infrastructure service environment 30 generates respective instances of an output data stream from output generated by the executing instance of the client software application at least in part in response to the inputting of the composite data stream (FIG. 37, block 478). The network infrastructure service environment 30 transmits the instances of the output data stream to respective ones of the client network nodes associated with communicants interacting in the virtual area (FIG. 37, block 480).

In some embodiments, the network infrastructure service environment 30 transmits the instances of the output data stream in association with a viewscreen object in the virtual area such that the communicants can interact with the client software application via a viewscreen in the virtual area. For example, in some of these embodiments, the Sococo platform runs a browser client on the area server and routes the output of the browser client to a view screen in a Sococo place. In some implementations, a remote access interface (e.g., terminal server) within the Windows operating system environment is used to keyboard input data and mouse input data and have these input data routed to the view screen being rendered in a shared Sococo place by the area server. The area server combines the input commands (e.g., mouse and keyboard inputs) from all the users into a single stream, and sends that single stream to the client software process running on the area server.

C. Realtime Wiki

Figure 38:
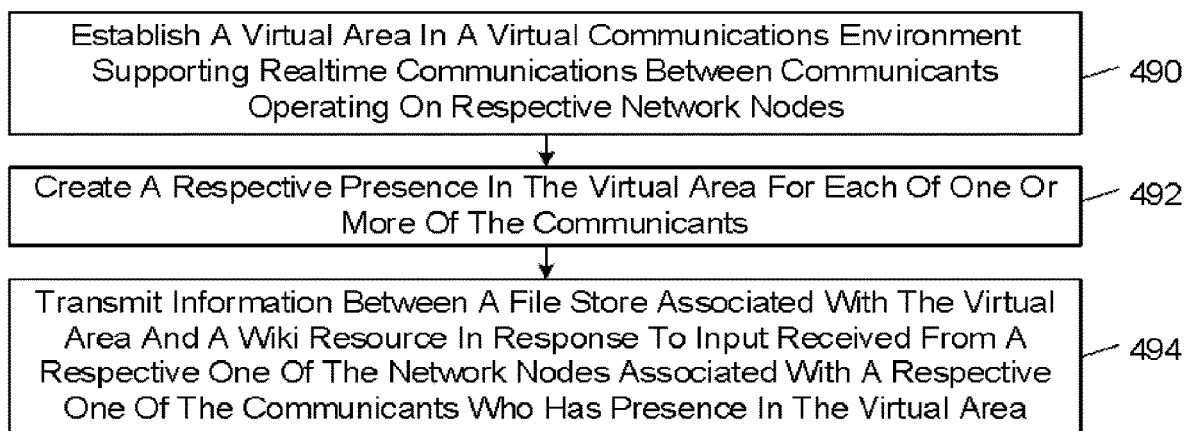
FIG. 38 is a method diagram of an embodiment of a method by which the Sococo platform integrated with a wiki resource

FIG. 38 shows an embodiment of a method by which the Sococo platform integrated with a wiki resource, which is a website or similar online resource that allows users to add and edit content collectively.

In accordance with the method of claim 38, the Sococo platform establishes a virtual area in a virtual communications environment supporting realtime communications between communicants operating on respective network nodes (FIG. 38, block 490). The Sococo platform creates a respective presence in the virtual area for each of one or more of the communicants (FIG. 38, block 492). The Sococo platform transmits information between a file store associated with the virtual area and a wiki resource in response to input received from a respective one of the network nodes associated with a respective one of the communicants who has presence in the virtual area (FIG. 38, block 494).

In some embodiments the process of transmitting information between the file store associated with the virtual area and the wiki resource involves transmitting the information through a web browser application.

In some embodiments, the process of transmitting information between the file store associated with the virtual area and the wiki resource involves importing information associated with the wiki resource to the file store. For example, in some cases, the Sococo platform imports to the file store at least one of a message thread associated with the wiki resource and a link to a data file associated with the wiki resource. In some cases, the Sococo platform associates the imported information with a display object in the virtual area. In some of these embodiments, the display object corresponds to a web browser window that displays the imported information in its native format. The Sococo platform selects at least a portion of the imported information designated by a respective one of the communicants who has presence in the virtual area, and associates the selected information to a viewscreen object in the virtual area. The Sococo platform transmits to each of the communicants who has presence in the virtual area the selected information in association with the viewscreen object. The Sococo platform also allows one or more of the communicants who has presence in the virtual area to have editorial control of the selected information. The editorial control typically allows the particular communicant to control rendering of the selected information in association with the viewscreen object and to modify the selected information using realtime input data streams transmitted from the network node associated with the particular communicant.

The Sococo platform typically generates an interaction record indexing the imported information with respective references to one or more of: a place attribute value that identifies the virtual area; and a respective identifier of each of the communicants who has presence in the virtual area.

In some embodiments, the process of transmitting information between the file store associated with the virtual area and the wiki resource involves exporting information from the file store to the wiki resource. This process typically involves exporting to the wiki resource information associated with the virtual area. The exported information may be associated with a viewscreen object in the virtual area. The exported information may correspond to a data file that transmitted in associated with the viewscreen object to each of the communicants who has presence in the virtual area. In the process of exporting the information to the wiki resource, the Sococo platform may export the information to a location in the wiki resource designated by a respective one of the communicants who has presence in the virtual area. In some exemplary embodiments, the designated location corresponds to a message thread of the wiki resource. In some cases, the exported information corresponds to at least one of: a data file associated with the virtual area; a reference to a data file associated with the virtual area; and a recording of one or more realtime data streams received from one or more of the communicants who has presence in the virtual area.

Figure 39:
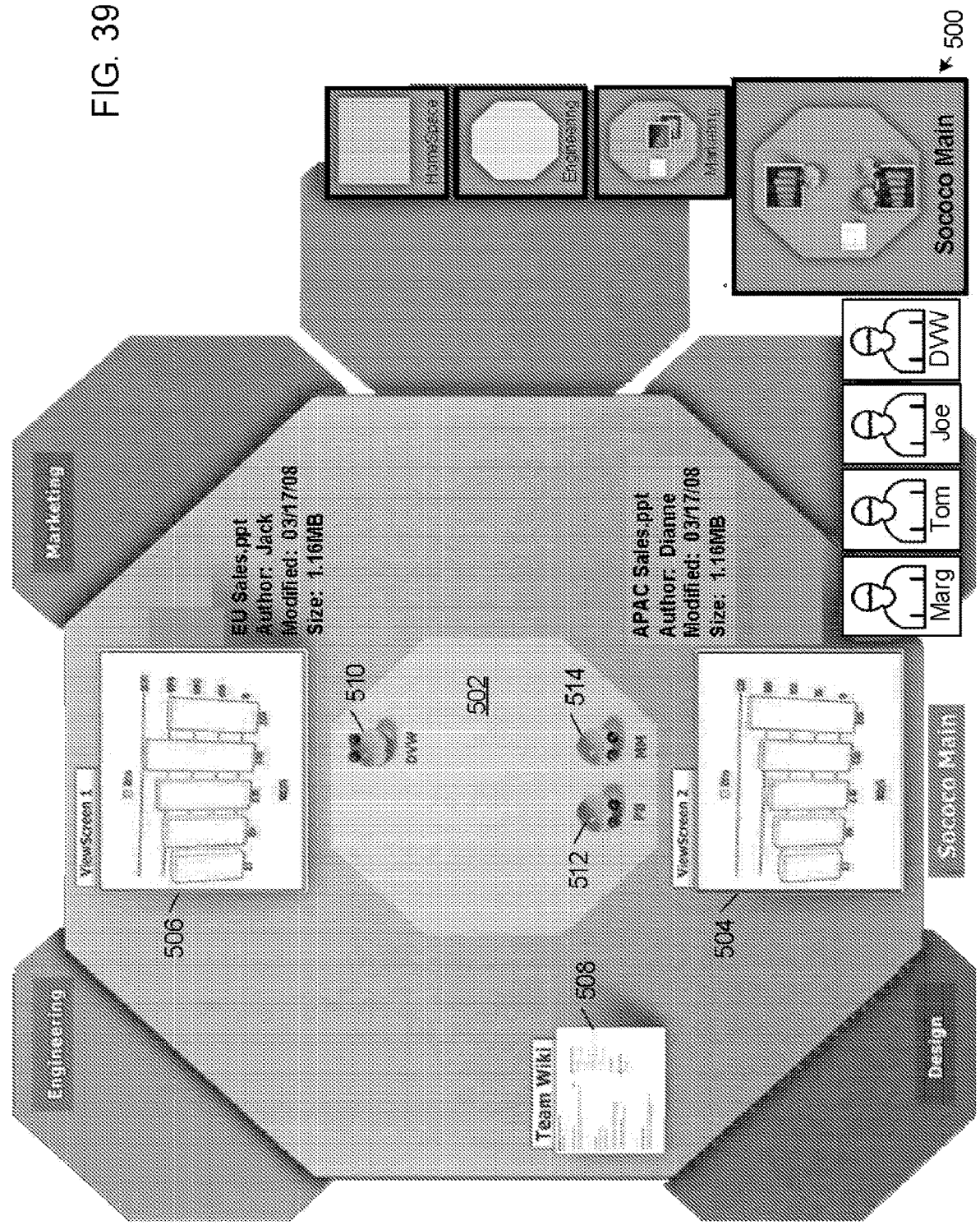
FIG. 39 shows an embodiment of a visualization of an OfficeSpace place in which information from a wiki is imported into a wiki board that allows realtime interaction with the wiki contents.

FIG. 39 shows another embodiment 500 of the Heads-up Display (HUD) 260 that presents an embodiment of a wiki realtime collaboration element or board 508. In this embodiment, the Sococo platform is able to import information (e.g., message threads and links to document files and other content) from a particular wiki into a virtual area 502 (e.g., the Sococo Main room in the illustrated embodiment) and export information (e.g., documents created or modified during collaboration) from the Sococo Main room 502 to the wiki. The particular wiki may be selected by one or more of the users or may be associated with the Sococo Main room 502 (e.g., by the virtual area specification for the Sococo Main room). In some embodiments, the wiki board is a web browser window that displays the content from the wiki in its native format. The Sococo platform typically accesses the wiki through a web browser application that allows users to import content from the wiki to the Sococo Main room 502 and to export content from the Sococo Main room 502 to the wiki.

In a first use scenario, the Sococo platform allows users to select content displayed or referenced (e.g., via a hyperlink) in the wiki board and direct the selected content to one of the view screens 504, 506 in the Sococo Main room 502. For example, in the embodiment shown in FIG. 38, the user is represented by the sprite 510 (labeled "DVW"). The user has selected the file EU Sales.ppt, which was referenced in the Team Wiki board 208. The user also has directed the Sococo platform to render the selected file on the viewscreen 506 (labeled "ViewScreen 1"). In response, the Sococo platform imported the selected file into storage associated with the Sococo Main room 502 and rendered the file on ViewScreen 1. In some embodiments, the Sococo platform indexes the imported file with respective references to one or more of the following attributes: the Sococo Main room 502; the users currently in the room; the current time; and other attributes relating to the communicants' interactions in the room. The user represented by the sprite 510 (i.e., DVW) then is able to move the sprite to a location adjacent to ViewScreen 1, which signals to the Sococo platform that the user wishes to have editorial control of the selected file by referencing switching rules in the associated area specification. When in this position in relation to the ViewScreen 1, the Sococo platform allows the user to have editorial control of the file being rendered on ViewScreen 1 using the functionality of the area application. At this point, the user represented by the sprite DVW may control the rendering of the contents of the selected file on the ViewScreen 1 (e.g., scroll to different areas of a page or change pages) and modify the contents of the selected file. In some embodiments, the file modifications are made using an interface that is provided by the document processing application (e.g., Microsoft PowerPoint) that is used to render the selected file on the ViewScreen 1. The interface is configured to receive realtime input data streams (e.g., computer keyboard and computer mouse data streams) from the communicants.

In a second use scenario, the Sococo platform allows users to export content from the HUD 500 to the wiki. In the example shown in FIG. 38, the users associated with the sprites 512, 514 (respectively labeled "PB" and "MM") are collaborating on a document entitled APAP Sales.ppt, which is being rendered on the viewscreen 504 (labeled "ViewScreen 2"). After these users have completed their modifications of the document, they may direct the application to export the document from the Sococo Main room 502 to the Team Wiki. In response, the Sococo platform either exports to the wiki the document APAP Sales.ppt itself or exports a reference (e.g., a URI or URL) to the document. The wiki in turn incorporates the exported information into the designed location (e.g., message thread) in accordance with the wiki collaborative software controlling the operation of the wiki. In some embodiments, the users may generate one or more other files relating to their collaboration on the document and export those files or references to those files to the wiki. For example, in some embodiments the users may direct the Sococo platform to create an audio recording of the users' discussions during their collaboration on the document APAP Sales.ppt and to upload a reference (e.g., a URL) to the audio file into the Team Wiki. In addition to documents, users also may enter comments directly into the wiki.

VII. Features

Among the features described herein are the following:

| Feature | Highlights |
|---|---|
| HUD | 1. Displaying communication space<br>   a. user's current location<br>      i. place (i.e., virtual area) in Sococo space currently occupied by the user (e.g., HomeSpace)<br>      ii. user's current location and user interface presented in lower right-hand corner of display<br>   b. realtime contacts<br>      i. realtime contacts that have interacted with user in user's current location<br>      ii. contacts presented as a horizontal extension of user's current location |

| Feature | Highlights |
|---|---|
| |     c.  places<br>        i.  realtime contacts that currently are in each place<br>            1.  contacts represented by "sprites" in 2D view<br>            2.  contacts represented by avatars in 3D view<br>        ii.  each represented by a hexagonal tile in 2D view<br>        iii.  other places are presented as a vertical extension of user's current location<br>        iv.  exported presence: presentation of application-specific realtime data into a graphical representation of a virtual place<br>    d.  sorted by interaction frequency<br>    e.  sorted by most recent interactions<br>2.  Progressive immersion into places<br>    a.  voice-only<br>    b.  two-dimensional overhead view of virtual area<br>    c.  three-dimensional view of virtual area<br>    d.  slider control<br>        i.  vertically oriented tapered shape (e.g., triangle) with wider taper associated with greater immersion (e.g., 3D view associated with wider taper than 2D view)<br>        ii.  movable crossbar controller that sets immersion level<br>3.  Navigation<br>    a.  navigate through areas via locations of people<br>    b.  navigate through areas via views into places<br>4.  User interface overlay<br>    a.  provides persistent interface and access to controls<br>    b.  transparent except for limited set of one or more of the following elements:<br>        i.  outline of progressive immersion control<br>        ii.  outline of user's current location<br>        iii.  sprites representing realtime contacts in place<br>        iv.  border of control |
| Desktop Integration | 1.  Integration of the Sococo platform into the desktop operating system environment in a way that allows users to treat presence and position within an area as an aspect of their operating environment analogous to operating system functions rather than one of several applications. For example,<br>    a.  an integration that allows a user to drag and drop files from the desktop environment into a Sococo place, where the files can be shared with other users; and<br>    b.  an integration that allows a user to run files stored in association with a Sococo place using the native software applications running on the user's desktop, where the files run independently of the Sococo place. |
| Social Processors | 1.  Process realtime differential motion streams, and based on avatar position in a Sococo place or proximity of avatar to other objects (e.g., other avatars) automatically move the avatar (e.g., center avatar in front of view screen, simulate social interactions, such as automatically turn head or body of avatar to face another avatar, automatic context based facial expression changes).<br>2.  Also translate high level realtime differential motion tags into automatic complex motions involving multi-state transitions (e.g., dancing, laughing)<br>3.  Trigger automatic avatar motions in response to events (e.g., another avatar enters place, another avatar speaks, object offered to user's avatar, user speaks). |
| Dynamic Spaces | 1.  User-initiated modification of a place on-demand, where definition of geometry of area is changed in response to user command to add or remove regions. The added geometry includes its own zones and associated stream handling characteristics.<br>2.  One mode of initiating dynamic modification is to click on a wall of an existing place. |
| Pseudo File System | 1.  Database system for locating a file (e.g., documents and recordings) that is associated with an area, where the database system supports queries by place, persons, and time.<br>2.  The database records include references to virtual places, persons occupying the places, timestamp information, and a location of the associated file. |
| Recordings | 1.  Multi-track recording of realtime streams and shared files that occur in connection with an area during a period of time.<br>2.  The recording is stored in association with the area or a region within the area and serves as an archive of the interactions that occurred in the associated area during the recording period. |

| Feature | Highlights |
|---|---|
| Relationship Database | 1. Automatic generation of relationship record for every interaction of a user with a realtime contact in a Sococo place, where the relationship record contains a description of the context of the interaction including a description of the place of interaction (e.g., a room of HomeSpace) and one or more of an identifier for the user, an identifier for the contact, a description of the hierarchy of the interaction place (e.g., a description of how the interaction room relates to the larger area), start and end times of the interaction, and a list of all files shared during the interaction.<br>2. Present results of queries on the relationship database in sorted order (e.g., frequency of interaction or most recent interaction) |
| Multiplexing Client Software | 1. Multiplexing between multiple clients to enable collaboration on the same document running as a single terminal server session.<br>2. Combines realtime streams from multiple users operating at different client nodes into a single stream, sends the composite stream to a client application program (e.g., a Microsoft Office application program) running on the area server node, and routes the output data generated by the client software running on the area server into a view screen that is in a shared Sococo area. |

VIII. Conclusion

The embodiments that are described herein provide improved systems and methods for navigating and interacting in virtual communication environments. These embodiments provide an interface that includes navigation controls that enable a user to navigate virtual areas and interaction controls that enable the user to interact with other communicants in the virtual areas.

Other embodiments are within the scope of the claims.

The invention claimed is:

1. A computer-implemented method in a network communications environment comprising a network service implemented by at least one server network node and supporting realtime communications between respective client network nodes of a first communicant and one or more other communicants, collectively referred to as "the communicants," the method comprising:
    performing by the network service of the at least one server network node:
        establishing a respective presence of the communicants in a virtual environment, and administering realtime communications between the client network nodes of ones of the communicants who are present in the virtual environment;
        responsive to receipt of an input from the client network node of the first communicant in connection with a persistent viewscreen object in the virtual environment, associating a document with a persistent viewscreen object in the virtual environment;
        transmitting a visualization of the document to the client network nodes of the communicants who are present in the virtual environment to display on the client network nodes of the communicants via distinct viewscreens located in and distributed in multiple locations in the virtual environment, wherein the viewscreens render data for viewing by the communicants;
        managing realtime collaboration on the document by the communicants who are present in the virtual environment, wherein the managing comprises:
            multiplexing respective communicant input data streams received from respective ones of the client network nodes of the communicants who are present in the virtual environment into a composite user input data stream;
            inputting the composite user input data stream to an executing instance of a document processing application to generate an output data stream; and
            sending respective instances of the output data stream corresponding to respective concurrent views of the document on the client network nodes of the communicants who are present in the virtual environment, wherein the network service runs a browser client on at least one of the server network nodes and routes the output data stream of the browser client to at least one of the view screens in the virtual environment to provide an interface through which communicants who are present in the particular virtual environment interact with the document processing application;
        maintaining records of communicant actions in the virtual environment; and
        upon request for one or more of the records, transmitting the one or more records to each of one or more of client network nodes of the communicants who are present in the virtual environment.

2. The method of claim 1, wherein the managing comprises executing a shared instance of the document processing application program on the document.

3. The method of claim 2, wherein the document processing application program is one of a text document processing application program, a spreadsheet document processing application program, and a presentation document processing application program.

4. The method of claim 2, wherein the managing comprises multiplexing the input data streams to the executing document processing application program to produce output data, and generating the client data streams from the output data produced by the document processing application program.

5. The method of claim 4, wherein the multiplexing comprises multiplexing the received realtime input data streams into a composite input data stream, and inputting the composite input data stream to the shared instance of the document processing application.

6. The method of claim 4, wherein the managing comprises transmitting the respective client data streams to the client network nodes of respective ones of the communicants who are copresent in the virtual area.

7. The method of claim 1, wherein the managing comprises configuring the client network nodes of the communicants to generate respective concurrent views of the document while configuring real time communications between the communicants.

8. The method of claim 1, wherein the administering comprises administering real time text chat communications between the network nodes of the present ones of the communicants.

9. The method of claim 1, wherein the administering comprises administering real time audio communications between the network nodes of the communicants.

10. The method of claim 1, wherein the administering comprises administering real time video communications between the network nodes of the communicants.

11. The method of claim 1, wherein the providing comprises transmitting to each of respective ones of client network nodes of the communicants who are present in the virtual area a respective document interface for interacting with the document and a respective communications interface for communicating with the communicants who are present in the virtual area.

12. The method of claim 11, wherein each document interface is associated with a respective one of the input data streams.

13. The method of claim 11, wherein each communications interface supports realtime text chat communications with the communicants who are present in the virtual area.

14. The method of claim 1, wherein the input data streams comprise data generated based on input device events occurring on respective ones of the client network nodes.

15. The method of claim 14, wherein at least some of the input device events correspond to realtime computer keyboard events.

16. The method of claim 14, wherein at least some of the input device events correspond to realtime computer mouse events.

* * * * *